United States Patent
Okamoto et al.

(10) Patent No.: US 8,802,779 B2
(45) Date of Patent: Aug. 12, 2014

(54) PROPYLENE-BASED POLYMER COMPOSITION, USE THEREOF, AND METHOD FOR PRODUCING THERMOPLASTIC POLYMER COMPOSITION

(75) Inventors: Masahiko Okamoto, Chiba (JP); Ryoji Mori, Ichihara (JP); Takashi Nakagawa, Ichihara (JP); Hiromasa Marubayashi, Chigasaki (JP); Shigenobu Ikenaga, Ichihara (JP); Yasushi Tohi, Ichihara (JP); Kouji Nagahashi, Kuga-gun (JP)

(73) Assignee: Mitsui Chemicals, Inc., Tokyo (JP)

( * ) Notice: Subject to any disclaimer, the term of this patent is extended or adjusted under 35 U.S.C. 154(b) by 212 days.

(21) Appl. No.: 11/643,944

(22) Filed: Dec. 22, 2006

(65) Prior Publication Data
US 2008/0085977 A1    Apr. 10, 2008

Related U.S. Application Data

(63) Continuation of application No. PCT/JP2006/305458, filed on Mar. 17, 2006.

(30) Foreign Application Priority Data

| Mar. 18, 2005 | (JP) | 2005-078605 |
| Mar. 18, 2005 | (JP) | 2005-078606 |
| Sep. 15, 2005 | (JP) | 2005-268570 |
| Dec. 14, 2005 | (JP) | 2005-361048 |
| Dec. 14, 2005 | (JP) | 2005-361049 |

(51) Int. Cl.
*C08L 23/00*    (2006.01)
*C08L 23/04*    (2006.01)

(52) U.S. Cl.
USPC .......................................... 525/240; 525/191

(58) Field of Classification Search
USPC .......................................................... 525/240
See application file for complete search history.

(56) References Cited

U.S. PATENT DOCUMENTS

| 4,161,574 | A | | 7/1979 | Strametz et al. | |
| 4,351,930 | A | | 9/1982 | Patnaik | |
| 5,115,030 | A | * | 5/1992 | Tanaka et al. | 525/240 |
| 5,500,284 | A | * | 3/1996 | Burgin et al. | 428/349 |
| 5,567,759 | A | * | 10/1996 | Taniguchi et al. | 524/451 |
| 5,998,039 | A | | 12/1999 | Tanizaki et al. | |
| 6,121,401 | A | | 9/2000 | Yamamoto et al. | |
| 6,191,219 | B1 | | 2/2001 | Tanaka et al. | |
| 6,242,535 | B1 | | 6/2001 | Kagami et al. | |
| 6,342,566 | B2 | * | 1/2002 | Burkhardt et al. | 525/191 |
| 6,436,494 | B2 | * | 8/2002 | Tanaka et al. | 428/34.3 |
| 6,562,907 | B2 | | 5/2003 | Johoji et al. | |
| 6,642,316 | B1 | * | 11/2003 | Datta et al. | 525/240 |
| 6,764,985 | B2 | | 7/2004 | Okada et al. | |
| 6,893,715 | B2 | * | 5/2005 | Inoue et al. | 428/332 |
| 7,488,789 | B2 | * | 2/2009 | Ikenaga et al. | 526/348.6 |
| 2001/0000254 | A1 | | 4/2001 | Tanaka et al. | |
| 2002/0013397 | A1 | | 1/2002 | Kawamura et al. | |
| 2004/0249084 | A1 | * | 12/2004 | Stevens et al. | 525/240 |
| 2006/0247381 | A1 | | 11/2006 | Mori et al. | |
| 2006/0276607 | A1 | | 12/2006 | Ikenaga et al. | |
| 2007/0172649 | A1 | | 7/2007 | Aihara et al. | |
| 2007/0225431 | A1 | * | 9/2007 | Mori et al. | 524/584 |
| 2007/0251572 | A1 | | 11/2007 | Hoya et al. | |

FOREIGN PATENT DOCUMENTS

| EP | 1 734 094 A1 | 12/2006 |
| JP | 51-79195 | 7/1976 |
| JP | 53-26882 | 3/1978 |
| JP | 53-26883 | 3/1978 |
| JP | 55-006643 | 1/1980 |
| JP | 57-125207 | 8/1982 |
| JP | 57-147506 | 9/1982 |
| JP | 62-119215 | 5/1987 |
| JP | 8-208909 | 8/1996 |
| JP | 08-283491 | 10/1996 |
| JP | 8-301934 | 11/1996 |
| JP | 08-301934 | 11/1996 |
| JP | 08-302093 | 11/1996 |
| JP | 9-12635 | 1/1997 |
| JP | 09-268241 | 10/1997 |
| JP | 09268241 | * 10/1997 |
| JP | 11-80233 | 3/1999 |

(Continued)

OTHER PUBLICATIONS

Search Report dated Oct. 8, 2008 cited in corresponding Singapore patent application. (4 pgs.)

(Continued)

*Primary Examiner* — Irina Krylova
(74) *Attorney, Agent, or Firm* — Foley & Lardner LLP

(57) ABSTRACT

The propylene-based polymer composition of the present invention includes 41 to 95 parts by weight of a propylene-based polymer (A) having a Tm measured by DSC of not less than 120° C. and not more than 170° C., and 59 to 5 parts by weight (provided that the total of (A) and (B) is 100 parts by weight) of a propylene/ethylene/α-olefin copolymer (B) that contains 84.0 to 60.0 mol % of constitutional units derived from propylene, 15.0 to 30.0 mol % of constitutional units derived from ethylene, and 1.0 to 10.0 mol % of constitutional units derived from an α-olefin having 4 to 20 carbon atoms and has a B-value of not less than 0.9 and not more than 1.5.

This polymer composition is excellent in transparency, low-temperature impact resistance, and mechanical properties (flexibility or rigidity, etc.) and also excellent in heat resistance.

10 Claims, 2 Drawing Sheets

(56) References Cited

FOREIGN PATENT DOCUMENTS

| | | |
|---|---|---|
| JP | 11-080233 | 3/1999 |
| JP | 11-286584 | 10/1999 |
| JP | 11-291279 | 10/1999 |
| JP | 11-293062 A | 10/1999 |
| JP | 2000/0191857 | 7/2000 |
| JP | 2000-198892 | 7/2000 |
| JP | 2000/0198893 | 7/2000 |
| JP | 2000-230088 A | 8/2000 |
| JP | 2000-516665 | 12/2000 |
| JP | 2001-064335 | 3/2001 |
| JP | 2001-172451 | 6/2001 |
| JP | 2002-348417 | 12/2002 |
| KR | 1999-013710 | 2/1999 |
| WO | WO 01/85880 A1 | 11/2001 |
| WO | WO 2006/057361 A1 | 6/2006 |
| WO | WO 2006/057369 | 6/2006 |

OTHER PUBLICATIONS

Office Action issued by Korean Intellectual Property Office dated May 14, 2008 for Korean patent application 2007-7020387.

Office Action Japanese Application No. 2006-077308 dated Nov. 20, 2012.

Japanese Office Action issued in connection with the corresponding application No. 2006-077307 dated Jun. 14, 2011.

* cited by examiner

PROPYLENE-BASED POLYMER COMPOSITION, USE THEREOF, AND METHOD FOR PRODUCING THERMOPLASTIC POLYMER COMPOSITION

TECHNICAL FIELD

The present invention relates to a propylene-based polymer composition, use thereof, and a method for producing a thermoplastic polymer composition.

BACKGROUND ART

For articles made of polypropylene, there has been demanded good balance between excellence in transparency, impact resistance, and mechanical properties (flexibility or rigidity, etc.) and absence of deterioration in these properties at high temperatures (hereinafter, may be called "heat resistance"). So far, there has never existed a material with these properties in a well-balanced manner.

For example, articles made of polypropylene are excellent in rigidity, heat resistance, surface gloss, scratch resistance, and the like, and hence they are widely used. However, there has been a problem that their poor low-temperature impact resistance imposes limitation on the application. As a measure to improve low-temperature impact resistance of such polypropylene, there has been widely known block PP, which is produced by sequential polymerizations to yield polypropylene moiety and ethylene/propylene copolymer moiety. Such block PP has rigidity, excellent heat resistance, which means retention of the shape even at high temperatures, and improved low-temperature impact resistance, but its transparency is unsatisfactory.

On the other hand, it is known that propylene/α-olefin copolymer, so-called random PP, in which propylene is copolymerized with at least one or more α-olefins having 2 to 20 carbon atoms (excluding propylene), is inferior in low-temperature impact resistance, although random PP has improved transparency by adding a nucleating agent or the like.

Food containers such as containers for frozen storage are required to superior heat resistance such as the shape retention in heating with a microwave oven as well as transparency, rigidity, and low-temperature impact resistance in frozen storage.

Retort pouches used for retort foods and the like are required to have excellent transparency, low-temperature impact resistance, and flexibility, and at the same time, excellent heat resistance such that those properties are not deteriorated even in sterilization at high temperatures.

Generally, polyethylene and propylene random copolymer are used as polymers to form industrial materials such as food containers and as polymers to form packaging materials such as retort pouches.

Various proposals for propylene random copolymer have already been made. For example, there has been proposed a propylene-based ternary copolymer obtained by copolymerizing propylene with a small amount of ethylene and butene (see Patent Documents 1, 2, and 3). The propylene-based ternary copolymer is crystalline and excellent in heat resistance, but it is insufficient in balance between transparency and low-temperature impact resistance for using as an industrial material and insufficient in flexibility for using as a packaging material.

There has been proposed a method for producing a propylene-based ternary copolymer capable forming films that is excellent in rigidity, transparency, and easiness to open and also superior in heat-sealing properties. This copolymer contains 1.3 to 2.4 wt % of ethylene units and 6.5 to 12.1 wt % of butene units together with propylene units (Patent Document 4).

As a propylene-based ternary copolymer excellent in low-temperature heat-sealing properties, there has been proposed a propylene-based ternary copolymer that is obtained by solution polymerization and contains 1 mol % or more of ethylene units, 1 mol % or more of butene units, and less than 90 mol % of propylene units (Patent Document 5).

It is proposed that a propylene-based ternary copolymer consisting of 80 to 96.5 wt % of propylene units, 3 to 17 wt % of ethylene units, and 0.5 to 5 wt % of butene units is formed into injection-molded rigid product or blow-molded bottles (Patent Document 6).

It was found that, however, food containers, retort pouches, and the like obtained from conventional polyethylene or propylene-based ternary copolymer described above are sometimes whitened to decrease transparency or sometimes become less flexible when heated at temperatures high enough for sterilization for a given time.

The present applicants have already proposed, for example, a polyolefin composition that obtained from 50 to 95 parts by weigh of propylene-based polymer (A) containing 0 to 10 mol % of ethylene units (a), 100 to 80 mol % of propylene units (b), and 0 to 15 mol % of units (c) of an α-olefin having 4 to 12 carbon atoms; and 5 to 50 parts by weight of propylene-based random copolymer (B) containing 2 to 20 mol % of ethylene units (a), 80 to 30 mol % of propylene units (b), and 10 to 50 mol % of units (c) of an α-olefin having 4 to 12 carbon atoms (Patent Document 7). However, according to the study of the present applicants, it was found that there was room for improvement in balance among transparency, low-temperature impact resistance, and heat resistance.

Propylene/ethylene/1-butene copolymer was also used in Patent Document 8, but used as a thermoplastic elastomer, and it was found that heat resistance and low-temperature impact strength thereof were still to be increased.

Patent Document 9 discloses a block copolymer composed of polypropylene block and propylene/ethylene/1-butene copolymer block, which was also used as an elastomer, and it was found that room still remained for improvement in the heat resistance and low-temperature impact strength.

[Patent Document 1] Japanese Patent Laid-Open Publication No. S51-79195
[Patent Document 2] Japanese Patent Laid-Open Publication No. S53-26882
[Patent Document 3] Japanese Patent Laid-Open Publication No. S53-26883
[Patent Document 4] Japanese Patent Application Publication No. S55-6643
[Patent Document 5] Japanese Patent Laid-Open Publication No. S57-125207
[Patent Document 6] Japanese Patent Laid-Open Publication No. S57-147506
[Patent Document 7] Japanese Patent Laid-Open Publication No. H08-283491
[Patent Document 8] Japanese Patent Laid-Open Publication No. H08-301934
[Patent Document 9] Japanese Patent Laid-Open Publication No. 2001-064335

DISCLOSURE OF THE INVENTION

Problems to be Solved by the Invention

The problem to be solved by the present invention is to overcome the above shortcomings and to provide a polymer composition excellent in transparency, low-temperature impact resistance, mechanical properties (flexibility, rigidity, or the like), and also heat resistance; and a molded article obtained by using said composition.

Another problem to be solved by the present invention is to provide a polymer composition pellet that enables to obtain a polymer composition excellent in transparency, low-temperature impact resistance, mechanical properties (flexibility or rigidity, etc.), and also heat resistance; a modifier for thermoplastic polymers that is said pellet; and a method for producing thermoplastic polymer compositions using said modifier.

Means for Solving the Problems

A propylene-based polymer composition of the present invention is a propylene-based polymer composition (X) containing:

41 to 95 parts by weight of a propylene-based polymer (A) having a Tm measured by DSC of not less than 120° C. and not more than 170° C., and 59 to 5 parts by weight (provided that the total of the component (A) and the component (B) is 100 parts by weight) of a propylene/ethylene/α-olefin copolymer (B) that contains 84.0 to 60.0 mol % of constitutional units derived from propylene, 15.0 to 30.0 mol % of constitutional units derived from ethylene, and 1.0 to 10.0 mol % of constitutional units derived from an α-olefin having 4 to 20 carbon atoms and has a B-value, which is defined below, of not less than 0.9 and not more than 1.5;

$$B = M_{OE}/(2M_O \cdot M_E)$$

wherein $M_{OE}$ is the molar fraction of the total of propylene-ethylene dyad sequences and α-olefin having 4 or more carbon atoms-ethylene dyad sequences to all the dyad sequences, $M_O$ is the total of the molar fractions of propylene and the α-olefin having 4 or more carbon atoms, and $M_E$ is the molar fraction of ethylene.

Another propylene-based polymer composition of the present invention is a propylene-based polymer composition (P) containing:

41 to 95 parts by weight of a propylene-based polymer (A) having a Tm measured by DSC of not less than 120° C. and not more than 170° C., 59 to 5 parts by weight (provided that the total of the component (A) and the component (B) is 100 parts by weight) of a propylene/ethylene/α-olefin copolymer (B) that contains 84.0 to 60.0 mol % of constitutional units derived from propylene, 15.0 to 30.0 mol % of constitutional units derived from ethylene, and 1.0 to 10.0 mol % of constitutional units derived from an α-olefin having 4 to 20 carbon atoms and has a B-value, which is defined below, of not less than 0.9 and not more than 1.5, and an ethylene/α-olefin copolymer (C) that contains 50 to 99 mol % of constitutional units derived from ethylene and 1 to 50 mol % of constitutional units derived from an α-olefin having 3 to 20 carbon atoms (provided that the total of ethylene units and the α-olefin units is 100%) in an amount of 5 to 95 parts by weight relative to 100 parts by weight of the total of (A) and (B):

$$B = M_{OE}/(2M_O \cdot M_E)$$

wherein, $M_{OE}$ is the molar fraction of the total of propylene-ethylene dyad sequences and α-olefin having 4 or more carbon atoms-ethylene dyad sequences to all the dyad sequences, $M_O$ is the total of the molar fractions of propylene and the α-olefin having 4 or more carbon atoms, and $M_E$ is the molar fraction of ethylene).

The propylene/ethylene/α-olefin copolymer (B) is preferably a propylene/ethylene/α-olefin copolymer that contains 84.0 to 63.0 mol % of constitutional units derived from propylene, 15.0 to 30.0 mol % of constitutional units derived from ethylene, and 1.0 to 7.0 mol % of constitutional units derived from an α-olefin having 4 to 20 carbon atoms and has a B-value, which is defined above, of not less than 0.9 and not more than 1.5.

In the propylene-based polymer composition (X) of the present invention, it is preferred that the propylene-based polymer (A) is an isotactic propylene-based polymer, and it is also preferred that the MFR (ASTM D1238, 230° C., load of 2.16 kg) of the propylene polymer (A) is in the range of 0.01 to 400 g/10 min.

In one preferred embodiment of the propylene-based polymer composition of the present invention, the propylene/ethylene/α-olefin copolymer (B) is a copolymer having a molecular weight distribution (Mw/Mn, Mw: weight-average molecular weight, Mn: number-average molecular weight, both relative to polystyrene) measured by GPC of not more than 3.5 and an isotactic triad fraction (mm) determined from $^{13}$C-NMR of not less than 85%. In another preferred embodiment, the propylene/ethylene/α-olefin copolymer (B) has a glass transition temperature (Tg) measured by DSC of 0° C. or higher, and in still another preferred embodiment, the propylene/ethylene/α-olefin copolymer (B) is a copolymer of which the melting point of copolymer (B) is not higher than 100° C. or not observed when measured by DSC.

In one preferred embodiment of the propylene-based polymer composition of the present invention, the tensile modulus is not less than 700 MPa, the internal haze is not more than 70%, the Izod impact strength at 0° C. is not less than 30 J/m, and the softening point determined by TMA is 140° C. or higher.

In another preferred embodiment, the tensile modulus is not less than 50 MPa and less than 700 MPa, the internal haze is not more than 70%, the Izod impact strength at 0° C. is not less than 500 J/m, and the softening point determined by TMA is 135° C. or higher.

The propylene-based polymer composition (X) of the present invention preferably exhibits a phase-separated structure when a slice is obtained from the core portion of a 1 mm-thick press-molded sheet prepared from said propylene polymer composition, stained with ruthenic acid, and observed on a transmission electron microscope (TEM).

In the propylene-based polymer composition (P) of the present invention, the ethylene/α-olefin copolymer (C) is preferably a copolymer that contains 55 to 99 mol % of constitutional units derived from ethylene and 1 to 45 mol % of constitutional units derived from an α-olefin having 3 to 20 carbon atoms (provided that the total of ethylene and the α-olefin is 100 mol %) and has a density of 850 to 920 kg/m$^3$ and an MFR (ASTM D 1238, 190° C., load of 2.16 kg) of 0.1 to 20 g/10 min.

The pellet of the present invention comprises a propylene-based polymer composition (Y) that comprises:

1 to 70 parts by weight of a propylene-based polymer (A) having a Tm measured by DSC of not less than 120° C. and not more than 170° C. and 99 to 30 parts by weight (provided that the total of the component (A) and the component (B) is 100 parts by weight) of a propylene/ethylene/α-olefin copolymer (B) that contains 84.0 to 60.0 mol % of constitutional units derived from propylene, 15.0 to 30.0 mol % of constitutional units derived from ethylene, and 1.0 to 10.0 mol % of constitutional units derived from an α-olefin having 4 to 20 carbon atoms and has a B-value, which is defined below, of not less than 0.9 and not more than 1.5;

$$B = M_{OE}/(2M_O \cdot M_E)$$

wherein $M_{OE}$ is the molar fraction of the total of propylene-ethylene dyad sequences and α-olefin having 4 or more carbon atoms-ethylene dyad sequences to all the dyad sequences, $M_O$ is the total of the molar fractions of propylene and the α-olefin having 4 or more carbon atoms, and $M_E$ is the molar fraction of ethylene).

In the pellet of the present invention, the propylene/ethylene/α-olefin copolymer (B) is preferably a copolymer that contains 84.0 to 63.0 mol % of constitutional units derived from propylene, 15.0 to 30.0 mol % of constitutional units derived from ethylene, and 1.0 to 7.0 mol % of constitutional units derived from an α-olefin having 4 to 20 carbon atoms and has a B-value, which is defined above, of not less than 0.9 and not more than 1.5.

The modifier for thermoplastic polymers of the present invention is the above pellet.

The method for producing thermoplastic polymer compositions of the present invention comprises kneading the above modifier for thermoplastic polymers and a thermoplastic polymer, preferably an olefin-based polymer.

In one preferred embodiment of the method for producing thermoplastic polymer compositions of the present invention comprises melt-kneading the above modifier for thermoplastic polymers and a required amount of the propylene-based polymer (A), and an optional another polymer (excluding the propylene-based polymers (A) and the propylene/ethylene/α-olefin copolymer (B)) and an optional additive, to produce a propylene-based polymer composition (X) comprising:

41 to 95 parts by weight of a propylene-based polymer (A) having a Tm measured by DSC of not less than 120° C. and not more than 170° C. and 59 to 5 parts by weight (provided that the total of (A) and (B) is 100 parts by weight) of a propylene/ethylene/α-olefin copolymer (B) that contains 84.0 to 60.0 mol % of constitutional units derived from propylene, 15.0 to 30.0 mol % of constitutional units derived from ethylene, and 1.0 to 10.0 mol % of constitutional units derived from an α-olefin having 4 to 20 carbon atoms and has a B-value, which is defined above, of not less than 0.9 and not more than 1.5.

In another preferred embodiment of the method for producing thermoplastic polymer compositions of the present invention comprises melt-kneading the above modifier for thermoplastic polymers, a required amount of the propylene-based polymer (A), and a required amount of the ethylene/α-olefin copolymer (C), and an optional another polymer (excluding the propylene-based polymer (A), the propylene/ethylene/α-olefin copolymer (B), and the ethylene/α-olefin copolymer (C)), and an optional additive, to produce a propylene-based polymer composition (P) containing:

41 to 95 parts by weight of a propylene-based polymer (A) having a Tm measured by DSC of not less than 120° C. and not more than 170° C., 59 to 5 parts by weight (provided that the total of (A) and (B) is 100 parts by weight) of a propylene/ethylene/α-olefin copolymer (B) that contains 84.0 to 60.0 mol % of constitutional units derived from propylene, 15.0 to 30.0 mol % of constitutional units derived from ethylene, and 1.0 to 10.0 mol % of constitutional units derived from an α-olefin having 4 to 20 carbon atoms and has a B-value, which is defined above, of not less than 0.9 and not more than 1.5, and an ethylene/α-olefin copolymer (C) that contains 50 to 99 mol % of constitutional units derived from ethylene and 1 to 50 mol % of constitutional units derived from an α-olefin having 3 to 20 carbon atoms (provided that the total of ethylene and the α-olefin is 100 mol %) in an amount of 5 to 95 parts by weight relative to 100 parts by weight of the total of (A) and (B).

The molded article of the present invention is obtained by using the above propylene-based polymer composition.

Effects of the Invention

The propylene-based polymer composition (X) of the present invention is excellent in transparency, impact resistance, mechanical properties (flexibility or rigidity, etc.), and also heat resistance.

The molded article obtained by using the propylene-based polymer composition (X) of the present invention is excellent in transparency, impact resistance, mechanical properties, and also heat resistance.

The propylene-based polymer composition (P) of the present invention is excellent in transparency, low-temperature impact resistance, mechanical properties (flexibility or rigidity, etc.), and also heat resistance.

The molded article obtained by using propylene-based polymer composition (P) of the present invention is excellent in transparency, low-temperature impact resistance, mechanical properties, and also heat resistance.

The pellet of the present invention has superior handleability, since it comprises the specific propylene-based polymer composition, and when used as a modifier for thermoplastic polymers, there can be produced resin compositions excellent in transparency, impact resistance, mechanical properties (flexibility or rigidity, etc.), and also heat resistance.

According to the method for producing thermoplastic polymer compositions of the present invention, there can be produced, with high productivity, thermoplastic polymer compositions excellent in transparency, impact resistance, mechanical properties (flexibility or rigidity, etc.), and also heat resistance.

According to the method for producing propylene-based polymer composition (P) of the present invention, because pellets comprising the specific propylene-based polymer composition are used therein, there can be produced, with high productivity, a resin composition excellent in handleability, transparency, low-temperature impact resistance, mechanical properties (flexibility or rigidity, etc.), and also heat resistance.

BEST MODE FOR CARRYING OUT THE INVENTION

Figure 1:
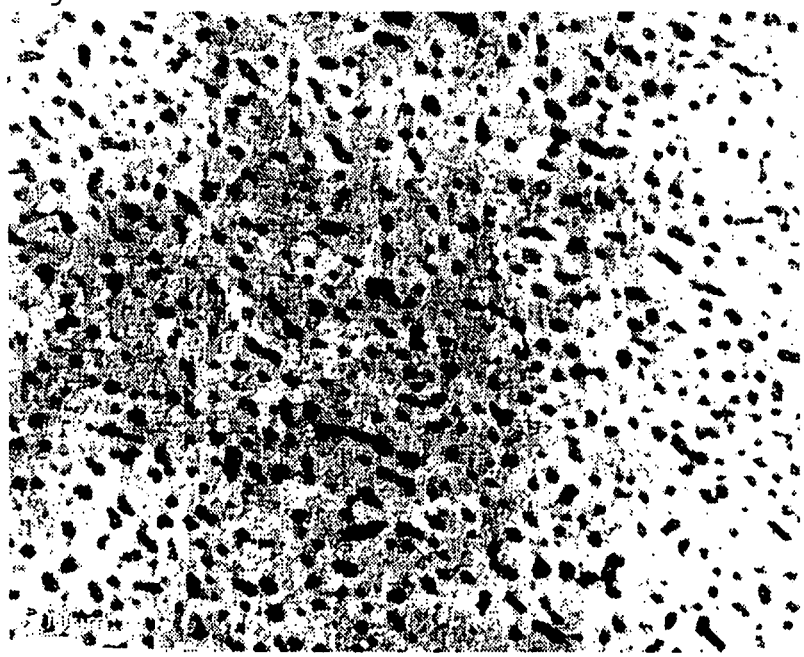
FIG. 1 is a TEM image of the composition of Example X2 magnified by 20,000.

Hereinafter, the present invention is explained in detail.

The propylene-based polymer composition (X) of the present invention comprises a propylene-based polymer (A) and a specific propylene/ethylene/α-olefin copolymer (B).

The propylene-based polymer composition (P) of the present invention comprises a propylene-based polymer (A), a specific propylene/ethylene/α-olefin having 4 to 20 carbon atoms copolymer (B), and a specific ethylene/α-olefin copolymer (C).

In the present specification, the propylene-based polymer composition (X) and the propylene-based polymer composition (P) may be collectively and simply called "propylene-based polymer composition" without discriminating them.

(A) Propylene-Based Polymer

The propylene-based polymer (A) used in the present invention may be homopolypropylene, propylene/α-olefin having 2 to 20 carbon atoms (excluding propylene) random copolymer, or propylene block copolymer. It is preferably homopolypropylene or propylene/α-olefin having 2 to 20 carbon atoms random copolymer.

In the propylene-based polymer composition (X) of the present invention, homopolypropylene is especially preferable in terms of the heat resistance and rigidity of resulting composition, and propylene/α-olefin having 2 to 20 carbon atoms random copolymer is especially preferable in terms of obtaining a composition excellent in flexibility and transparency.

In the propylene-based polymer composition (P) of the present invention, homopolypropylene is especially preferable in terms of the heat resistance of resulting composition, and propylene/α-olefin having 2 to 20 carbon atoms random copolymer is especially preferable in terms of obtaining a composition excellent in low-temperature impact resistance and transparency.

In both the propylene-based polymer composition (X) and the propylene-based polymer composition (P) of the present invention, examples of the α-olefin having 2 to 20 carbon atoms except propylene include ethylene, 1-butene, 1-pentene, 3-methyl-1-butene, 1-hexene, 4-methyl-1-pentene, 1-octene, 1-decene, 1-dodecene, 1-tetradecene, 1-hexadecene, 1-octadecene, 1-eicosene, and the like. As the propylene/α-olefin having 2 to 20 carbon atoms random copolymer, preferable are propylene/ethylene copolymer, propylene/α-olefin having 4 to 10 carbon atoms copolymer, and propylene/ethylene/α-olefin having 4 to 10 carbon atoms copolymer. Generally, such copolymers contain 90 mol % or more of constitutional units derived from propylene with respect to 100 mol % of the total amount of constitutional units derived from propylene and constitutional units derived from the α-olefin having 2 to 20 carbon atoms (except propylene).

The propylene-based polymer (A) used in the present invention is preferably an isotactic propylene-based polymer.

The isotactic propylene-based polymer refers to a propylene-based polymer whose isotactic pentad fraction determined by NMR is 0.9 or more, preferably 0.95 or more. The isotactic pentad fraction of the isotactic propylene polymer is 90% or more, preferably 95% or more as expressed in percentage. The isotactic pentad fraction is expressed in percentage in the present invention.

The isotactic pentad fraction (mmmm fraction) represents the existence ratio, which is determined with $^{13}$C-NMR, of isotactic sequences as pentad units in a molecular chain and refers to the fraction of propylene monomer units occupying the center of sequence in which five propylene monomer units are continuously bonded in meso relation. Specifically, the isotactic pentad fraction (mmmm fraction) is calculated as the fraction of mmmm peak in all the absorption peaks observed in methyl carbon region in the $^{13}$C-NMR spectrum, which is obtained as follows.

The mmmm fraction is determined from Pmmmm (the intensity of signal assigned to the methyl group of the third unit in the site where five continuous propylene units are isotactically bonded) and $P_w$ (the total intensity of signals assigned to methyl groups of all the propylene units) using the following equation.

mmmm fraction=$P_{mmmm}/P_W$

The NMR spectrum is measured, for example, as follows: 0.35 g of a sample is dissolved in 2.0 ml of hexachlorobutadiene with heating; the resultant solution is filtered though a glass filter (G2), supplied with 0.5 ml of deuterated benzene, and put in a NMR tube of 10 mm in internal diameter; and the $^{13}$C-NMR spectrum is recorded at 120° C. on a GX-500 NMR spectrometer manufactured by JEOL Ltd. with an accumulation times of 10,000 or more.

The melting point (Tm) of the propylene-based polymer (A) used in the present invention is preferably not less than 120° C. and not more than 170° C., and preferably not less than 125° C. and not more than 168° C., as measured with a differential scanning calorimeter (DSC). In addition, the heat of fusion (ΔH), which is obtained from the same measurement, is preferably 50 mJ/mg or more. The propylene-based polymer within the above ranges is preferred in terms of being excellent in formability, heat resistance, and transparency, and it has good characteristics as crystalline polypropylene.

The melting point (Tm) and heat of fusion (ΔH) are, for example, measured as follows using a DSC Pyris 1 or DSC 7 manufactured by Perkin-Elmer, Inc.: approximately 5.00 mg of a sample is put in a dedicated aluminum pan; and the sample temperature is raised from 30° C. to 200° C. at 320° C./min, kept at 200° C. for 5 minutes, lowered from 200° C. to 30° C. at 10° C./min, kept at 30° C. for 5 minutes. The temperature is then raised to 200° C. at a 10° C./min to obtain the endothermic curve, from which Tm and ΔH is determined.

The melt flow rate (MFR; ASTM D1238, 230° C., load of 2.16 kg) of the propylene-based polymer (A) is preferably 0.01 to 400 g/10 min, and more preferably 0.1 to 100 g/10 min. For example, in the case of the propylene-based polymer composition (X) or the propylene-based polymer composition (P) each having a tensile modulus of not less than 700 MPa as described later, the MFR of the propylene-based polymer (A) is preferably 0.1 to 100 g/10 min. and more preferably 0.5 to 80 g/10 min. In the case of the propylene-based polymer composition (X) or the propylene-based polymer composition (P) each having a tensile modulus of not less than 50 and less than 700 MPa, the MFR of the propylene-based polymer (A) is preferably 0.1 to 50 g/10 min, and more preferably 0.5 to 20 g/10 min.

The propylene-based polymer (A) having such an MFR value provides propylene polymer compositions with excellent flowability that may be molded into large articles.

When the propylene-based polymer (A) is a propylene/α-olefin random copolymer, it is preferred that the α-olefin is selected from ethylene and α-olefins having 4 to 20 carbon atoms and that the α-olefin content is 0.1 to 8 mol %, preferably 0.2 to 7.5 mol %, and more preferably 0.3 to 7 mol %.

The propylene-based polymer (A) used in the present invention preferably has a tensile modulus of not less than 500 MPa. The tensile modulus refers to a value measured in accordance with JIS K6301 at a span distance of 30 mm and a tensile speed of 30 mm/min with a JIS No. 3 dumbbell at 23° C.

The propylene-based polymer (A) used in the present invention described above, for example, the isotactic propylene-based polymer can be produced by various methods such as methods using a stereospecific catalyst. Specifically, the propylene-based polymer (A) can be produced using a catalyst formed from a solid titanium catalyst component, an organometallic catalyst component, and when needed, an electron donor. Specific examples of the solid titanium catalyst component include a solid titanium catalyst component in which trichlorotitanium or a trichlorotitanium-containing composition is supported on a carrier with a specific surface area of not less than 100 m²/g or a solid titanium catalyst component containing magnesium, halogen, an electron donor (preferably aromatic carboxylic ester or alkyl group-containing ether), and titanium as essential components in which these essential components are supported on a carrier with a specific surface area of not less than 100 m²/g. The propylene-based polymer (A) can be also produced using a metallocene catalyst.

The organometallic catalyst component is preferably an organoaluminum compound, which is exemplified by, specifically, trialkylaluminum, dialkylaluminum halide, alkylaluminum sesquihalide, alkylaluminum dihalide, and the like. The organoaluminum compound may be selected accordingly depending on the type of titanium catalyst component to be used.

As the electron donor, there may be used an organic compound containing a nitrogen atom, a phosphorus atom, a sulfur atom, a silicon atom, a boron atom, or the like. Preferred are esters, ethers, and the like that contain such an atom described above.

The catalyst may be activated by an additional treatment such as copulverization, and such olefins as described above may be prepolymerized thereon.

(B) Propylene/Ethylene/α-Olefin Copolymer

In the propylene-based polymer composition (X) of the present invention, the propylene/ethylene/α-olefin copolymer (B) is typically a random copolymer and contains 84 to 50 mol % of constitutional units derived from propylene, 15 to 30 mol % of constitutional units derived from ethylene, and 1 to 20 mol % of constitutional units derived from the α-olefin having 4 to 20 carbon atoms. Here, the total of constitutional units derived from constitutional units derived from ethylene and constitutional units derived from the α-olefin having 4 to 20 carbon atoms is 16 mol % to 50 mol %, and the total of constitutional units derived from propylene, constitutional units derived from ethylene, and constitutional units derived from the α-olefin having 4 to 20 carbon atoms is 100 mol %.

In propylene-based polymer composition (P) of the present invention, the propylene/ethylene/α-olefin copolymer (B) is typically a random copolymer and contains 89 to 50 mol % of constitutional units derived from (B) propylene, 10 to 30 mol % of constitutional units derived from ethylene, and 1 to 20 mol % of constitutional units derived from the α-olefin having 4 to 20 carbon atoms. Here, the total of constitutional units derived from ethylene and constitutional units derived from the α-olefin having 4 to 20 carbon atoms is 11 mol % to 50 mol %, and the total of constitutional units derived from propylene, constitutional units derived from ethylene, and constitutional units derived from the α-olefin having 4 to 20 carbon atoms is 100 mol %.

In both the propylene-based polymer composition (X) of the present invention and the propylene-based polymer composition (P) of the present invention, it is more preferred that the copolymer (B) contains 60.0 to 84.0 mol % of constitutional units derived from propylene, 15.0 to 30.0 mol % of constitutional units derived from ethylene, and 1.0 to 10.0 mol % of constitutional units derived from the α-olefin having 4 to 20-carbon atoms. Here, the total of constitutional units derived from ethylene and constitutional units derived from the α-olefin having 4 to 20 carbon atoms is 16.0 mol % to 40.0 mol %, and the total of constitutional units derived from propylene, constitutional units derived from ethylene, and constitutional units derived from the α-olefin having 4 to 20 carbon atoms is 100 mol %.

Further preferably, the copolymer (B) contains 63.0 to 84.0 mol % of constitutional units derived from propylene, 15.0 to 30.0 mol % of constitutional units derived from ethylene, and 1.0 to 7.0 mol % of constitutional units derived from the α-olefin having 4 to 20 carbon atoms. Here, the total of constitutional units derived from ethylene and constitutional units derived from the α-olefin having 4 to 20 carbon atoms is 16.0 mol % to 37.0 mol %, and the total of constitutional units derived from propylene, constitutional units derived from ethylene, and constitutional units derived from the α-olefin having 4 to 20 carbon atoms is 100 mol %.

Still more preferably, the copolymer (B) contains 65.0 to 83.5 mol % of constitutional units derived from propylene, 15.5 to 28.0 mol % of constitutional units derived from ethylene, and 1.0 to 7.0 mol % of constitutional units derived from the α-olefin having 4 to 20 carbon atoms. Here, the total of constitutional units derived from ethylene and constitutional units derived from the α-olefin having 4 to 20 carbon atoms is 16.5 mol % to 35.0 mol %, and the total of constitutional units derived from propylene, constitutional units derived from ethylene, and constitutional units derived from the α-olefin having 4 to 20 carbon atoms is 100 mol %.

Still more preferably, the copolymer (B) contains 68.0 to 81.0 mol % of constitutional units derived from propylene, 16.0 to 25.0 mol % of constitutional units derived from ethylene, and 3.0 to 7.0 mol % of constitutional units derived from the α-olefin having 4 to 20 carbon atoms. Here, the total of constitutional units derived from ethylene and constitutional units derived from the α-olefin having 4 to 20 carbon atoms is 19.0 mol % to 32.0 mol %, and the total of constitutional units derived from propylene, constitutional units derived from ethylene, and constitutional units derived from the α-olefin having 4 to 20 carbon atoms is 100 mol %.

Examples of the α-olefin having 4 to 20 carbon atoms include 1-butene, 1-pentene, 1-hexene, 4-methyl-1-pentene, 1-octene, 1-decene, 1-dodecene, 1-tetradecene, 1-hexadecene, 1-octadecene, 1-eicosene, and the like. Especially preferable are 1-butene, 4-methyl-1-pentene, 1-hexene, and 1-octene.

The propylene/ethylene/α-olefin copolymer (B), which contains constitutional units derived from propylene, constitutional units derived from ethylene, and constitutional units derived from the α-olefin having 4 to 20 carbon atoms in the above ratio, has good compatibility with the propylene-based polymer (A) and tends to provide a propylene-based polymer composition with sufficient transparency, flexibility, mechanical strength, heat resistance, and impact resistance.

The B-value, which is specified below, of the propylene/ethylene/α-olefin copolymer (B) used in the present invention is preferably not less than 0.9 and not more than 1.5:

$$B = M_{OE}/(2M_O \cdot M_E)$$

wherein $M_{OE}$ is the molar fraction of the total of propylene-ethylene dyad sequences and α-olefin having 4 or more carbon atoms-ethylene dyad sequences to all the dyad sequences, $M_O$ is the total of molar fractions of propylene and the α-olefin having 4 or more carbon atoms, and $M_E$ is the molar fraction of ethylene.

In the present invention, in particular, the B-value is more preferably not less than 0.9 and not more than 1.3, still more preferably not less than 0.9 and not more than 1.2. If the B-value is within this range, the resulting composition is particularly excellent in balance between low-temperature impact strength and transparency.

When the B-value is larger, the blocked sequence of ethylene units is shorter and the distribution of ethylene units is more uniform. Contrary, when the B-value is smaller, the distribution of ethylene units is less uniform and the blocked sequence of ethylene is longer.

Specifically, for example, in case of a propylene/ethylene/1-butene copolymer, the B-value is determined by $^{13}$C-NMR measurement according to reports such as G. J. Ray (Macromolecules, 10, 773 (1977)), J. C. Randall (Macromolecules, 15, 353 (1982); J. Polymer Science, Polymer Physics Ed., 11, 275 (1973)), and K. Kimura (Polymer, 25, 441 (1984)) as follows.

PP [($\alpha\alpha$)PP] was determined by assidning peaks, which is observed in 45.0 to 48.0 ppm, to the methylene carbons at $\alpha\alpha$-position in propylene-propylene dyad sequence.

PB [($\alpha\alpha$)PB] was determined by assidning peaks, which is observed in 42.0 to 44.5 ppm, to the methylene carbons of $\alpha\alpha$-position in propylene-butene dyad sequence.

BB [($\alpha\alpha$)BB] was determined by assidning peaks, which is observed in 40.0 to 41.0 ppm, to the methylene carbons at $\alpha\alpha$-position in butene-butene dyad sequence.

PE [($\alpha\gamma+\alpha\delta^+$)PE] was determined by assidning peaks, which is observed in 37.5 to 39.0 ppm, to the methylene carbons at $\alpha\gamma$-position and $\alpha\delta^+$-position in propylene-ethylene dyad sequence.

BE [($\alpha\gamma+\alpha\delta^+$)BE] was determined by assidning peaks, which is observed in 34.0 to 34.5 ppm, to the methylene carbons at $\alpha\gamma$-position and $\alpha\delta^+$-position in butene-ethylene dyad sequence.

EE [[($\beta\delta^++\delta\delta^+$)/2+$\gamma\delta^+$/4]EE] was determined by assidning peaks, which is observed in 26.0 to 28.3 ppm, 29.5 to 30.0 ppm, and 30.1 to 30.5 ppm, to $\beta\delta^+$-, $\delta\delta^+$-, and $\delta\gamma$-carbons, respectively, in ethylene-ethylene dyad sequence.

Since the peaks assigned to $\beta\delta^+$-carbon overlapped with undesired peaks (peaks derived from constitutional units derived from butene: hereinafter, may be called "peaks derived from branch-(B)"), the following correction was applied.

Integration value of $\beta\delta+(P-E,B-E)$peak=(Integration value of the peaks in 26.0 to 28.3 ppm)−(Integration value of the peaks derived from branch−($B$))

Integration value of the peaks derived from branch−($B$)=[CH(EBE)+CH(EBB)+CH(BBB)+B—CH3]/2

CH(EBE) represents the integration value of the peaks of the methine carbons in ethylene-butene-ethylene triad sequence, which is obtained from the integration value of the peaks in 39.5 to 39.9 ppm.

CH(EBB) represents the integration value of the peak of the methine carbons in ethylene-butene-butene triad sequence, which is obtained from the integration value of the peaks in 36.5 to 37.4 ppm.

CH(BBB) represents the integration value of the peaks of the methine carbons in butene-butene-butene triad sequence, which is determined from the integration value of the peaks in 33.5 to 34.8 ppm.

B—CH$_3$ represents the integration value of the peaks of the methyl carbon of butane-derived constitutional units, which is obtained from the integration value of the peaks in 9.5 to 11.9 ppm.

$M_E$, $M_O$, and $M_{OE}$ in the above equation defining B-value are determined from the following equations.

$O=PP+PB+BB+PE/2+BE/2$ $E=EE+PE/2+BE/2$ $M_O=O/(O+E)$ $M_E=E/(O+E)$ $M_{OE}=(PE+BE)/(PP+PB+BB+PE+BE+EE)$

<Description of Symbols>

In the above description, PP represents the relative amount of propylene-propylene dyad sequences and equals to ($\alpha\alpha$) PP, which is the peak area of methylene carbons at $\alpha\alpha$-position in propylene-propylene dyad sequences.

PB represents the relative amount of propylene-butene dyad sequences and equals to the ($\alpha\alpha$)PB, which is the integration value of the peaks of methylene carbons at $\alpha\alpha$-position in propylene-butene dyad sequences.

BB represents the relative amount of butene-butene dyads and equals to the ($\alpha\alpha$)BB, which is the integration value of the peaks of methylene carbons at $\alpha\alpha$-position in butene-butene dyad sequences.

PE represents the relative amount of propylene-ethylene dyad sequences and equals to the ($\alpha\gamma+\alpha\delta^+$)PE, which is the total integration value of the peaks of methylene carbons at $\alpha\gamma$-position and $\alpha\delta^+$-position in propylene-ethylene dyad sequences.

BE represents the relative amount of butene-ethylene dyads and equals to the ($\alpha\gamma+\alpha\delta^+$)BE, which is the total integration value of the peaks of methylene carbons at $\alpha\gamma$-position and $\alpha\delta^+$-position in butene-ethylene dyad sequences.

EE represents the relative amount of ethylene-ethylene dyads and equals to the [($\beta\delta^++\delta\delta^+$)/2+$\gamma\delta^+$/4]EE, which is obtained from the integration value of the peaks of methylene carbons at $\beta\delta^+$-position, $\delta\delta^+$-position, and $\gamma\delta^+$-position in ethylene-ethylene dyad sequences following the equation, ($\beta\delta^++\delta\delta^+$)/2+$\gamma\delta^+$/4.

O means the integration value of the peaks representing the relative amounts of the total of propylene units and butene units, and E means the integration value of the peaks representing the relative amount of ethylene units.

The $^{13}$CNMR measurement may be conducted by the same method as that for "Contents of ethylene, propylene, and $\alpha$-olefin in polymer" in Examples described later.

The propylene/ethylene/$\alpha$-olefin copolymer (B) used in the present invention preferably has a practically isotactic structure in terms of mechanical strength and the like.

The "propylene/ethylene/$\alpha$-olefin copolymer (B) having a substantially isotactic structure" refers to a propylene-based copolymer whose isotactic triad fraction (mm fraction) measured by NMR is not less than 0.85, preferably not less than 0.88. The isotactic triad fraction of the propylene-based copolymer is not less than 85%, preferably not less than 88% as expressed in percentage.

The isotactic triad fraction (mm fraction) is the existence ratio, which is determined by $^{13}$C-NMR, of isotactic sequences as triad units in a molecular chain and refers to the fraction of propylene monomer unit occupying the center of triad sequence in which three propylene monomer units are continuously meso-bonded. Specifically, the isotactic triad fraction (mm fraction) is calculated as the fraction of mm peaks in all absorption peaks observed in the methyl carbon region in the $^{13}$C-NMR spectrum as follows.

The mm fraction is determined from Pmm (absorption intensity assigned to the methyl group of the second unit in the site where three continuous propylene units are isotactically bonded) and $P_w$ (total of absorption intensities assigned to all the methyl group in the propylene units) using the following equation.

mm fraction=$Pmm/P_W$

The NMR measurement is, for example, carried out as follows: 0.35 g of a sample is dissolved in 2.0 ml of hexachlorobutadiene with heating; the resultant solution is filtered though a glass filter (G2), supplied with 0.5 ml of deuterated benzene, and is put into an NMR tube having an inner diameter of 10 mm; and the $^{13}$C-NMR spectrum is recorded at 120° C. with accumulation times of not less than 10,000. The spectrometer to be used is, although not particularly limited to, for example, GX-500 NMR spectrometer manufactured by JEOL Ltd.

The assignment can be specifically performed by the method described in Pamphlet of WO 2004/087775, page 21, line 7 to page 26, line 6.

The MFR (ASTM D1238, 230° C., load of 2.16 kg) of the propylene/ethylene/α-olefin copolymer (B) is, although not particularly limited to, preferably 0.01 to 50 g/10 min, more preferably 0.05 to 10 g/10 min, and still more preferably 0.1 to 4 g/10 min. When the MFR of the copolymer (B) is within this range, the impact resistance of the resulting composition is improved.

The intrinsic viscosity [η] at 135° C. in decalin of the propylene/ethylene/α-olefin copolymer (B) is typically 0.01 to 10 dl/g and preferably 0.05 to 10 dl/g. When the intrinsic viscosity [η] at 135° C. in decalin is within this range, the propylene/ethylene/α-olefin copolymer (B) is excellent in weatherability, ozone resistance, thermal aging resistance, low-temperature properties, dynamic fatigue resistance, mechanical strength, and the like.

The internal haze (%) (medium: benzyl alcohol) of the propylene/ethylene/α-olefin random copolymer (B) is not more than 5%, preferably not more than 3% as measured with a specimen of 1-mm thick pressed sheet in accordance with JIS K7105. The propylene/ethylene/α-olefin copolymer (B) with such range of internal haze contains almost no crystalline components, which may influence transparency, is random copolymer of propylene, ethylene, and an α-olefin, and is excellent in flexibility, transparency, and rubber elasticity.

The pressed sheet is prepared as follows: the copolymer is preheated for 4 minutes and molded into a sheet in 1 minute under 10 MPa using a hydraulic hot press molding machine whose temperature has been set at 200° C., and the resultant sheet was cooled at 20° C. under 10 MPa for 3 minutes to prepare a sheet-shaped specimen with a predetermined thickness.

The modulus at 100% strain ($M_{100}$) of the propylene/ethylene/α-olefin copolymer (B) is preferably not more than 4.0 MPa, more preferably not more than 3.0 MPa, and still more preferably not more than 2.0 MPa, as measured using a JIS No. 3 dumbbell specimen prepared from a 1-mm thick pressed sheet at a span distance of 30 mm and a tensile speed of 30 mm/min at 23° C. in accordance with JIS K6301. Typically, $M_{100}$ of the propylene/ethylene/α-olefin copolymer (B) is not less than 0.1 MPa. The pressed sheet is prepared as follows: the copolymer is preheated for 4 minutes and molded into a sheet in 1 minute under 10 MPa using a hydraulic hot press molding machine whose temperature has been set at 200° C., followed by cooling at 20° C. under 10 MPa for 3 minutes to prepare a sheet-shaped specimen with a predetermined thickness.

The tensile strength at break (TS) of the propylene/ethylene/α-olefin copolymer (B) is preferably not more than 25 MPa, more preferably not more than 15 MPa, and still more preferably not more than 10 MPa, as measured using a JIS No. 3 dumbbell specimen prepared from a 1-mm thick pressed sheet at a span distance of 30 mm and a tensile speed of 30 mm/min at 23° C. in accordance with JIS K6301. Typically, TS of the propylene/ethylene/α-olefin copolymer (B) is not less than 0.1 MPa. The propylene/ethylene/α-olefin random copolymer (B) with such a range of TS is excellent in flexibility, transparency, rubber elasticity, and mechanical strength, and the resulting composition is also excellent in flexibility, transparency, impact resistance, and mechanical strength.

The crystallinity (measured by X-ray diffractometry) of the propylene/ethylene/α-olefin random copolymer (B) is preferably not more than 20%, more preferably 0 to 15%.

It is preferred that the propylene/ethylene/α-olefin random copolymer (B) has a single glass transition temperature and that the glass transition temperature, Tg, measured with a differential scanning calorimeter (DSC) is typically not more than 0° C., preferably not more than −10° C., and more preferably not more than −20° C. The propylene/ethylene/α-olefin random copolymer (B) with such a range of glass transition temperature, Tg, is excellent in cold resistance and low-temperature properties.

It is also preferred that the melting point of the propylene/ethylene/α-olefin random copolymer (B) is not higher than 100° C. or not observed as measured with DSC. If copolymer (B) has a melting point within said range, the resulting composition is excellent in flexibility and low-temperature impact resistance.

"Melting point is not observed" means that any crystal fusion peak having heat of crystal fusion of 1 J/g or more is not observed in the range of −150 to 200° C. The measurement method is the same as "method for measuring glass transition temperature (Tg) and melting point (Tm) of the component (B)" in Examples described later. That is, approximately 5 mg of a weighed sample is put in a dedicated aluminum pan for measurement, and the sample temperature is raised to 200° C. at 100° C./min, kept at 200° C. for 5 minutes, lowered to −150° C. at 10° C./min, and raised to 200° C. at 10° C./min, during which the endothermic curve is recorded to determine these values.

The molecular weight distribution (Mw/Mn, Mw: weight-average molecular weight, Mn: number-average molecular weight, both relative to polystyrene) of the propylene/ethylene/α-olefin random copolymer (B) is preferably not more than 3.5, more preferably not more than 3.0, and still more preferably not more than 2.5.

Method for Producing the Propylene/Ethylene/α-Olefin Random Copolymer (B)

Preferably, the propylene/ethylene/α-olefin random copolymer (B) used in the present invention is obtained by copolymerizing propylene, ethylene, and an α-olefin in the presence of a catalyst for olefin polymerization comprising (a1) a transition metal compound represented by general formula (a1) below:

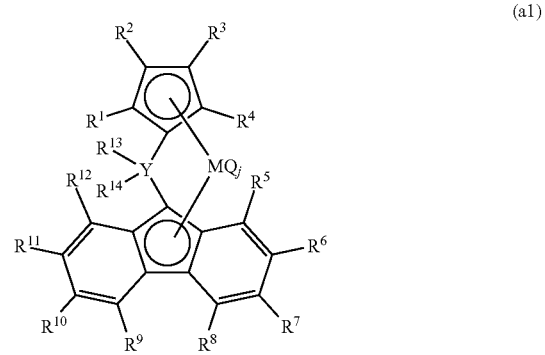

(a1)

wherein $R^3$ is a hydrogen atom; $R^1$, $R^2$, and $R^4$ are each selected from a hydrocarbon group and a silicon-containing group, which may be the same or different from one another; $R^5$, $R^6$, $R^7$, $R^8$, $R^9$, $R^{10}$, $R^{11}$, $R^{12}$, $R^{13}$, and $R^{14}$ are each selected from a hydrogen atom, a hydrocarbon group, and a silicon-containing group, which may be the same or different from one another; any adjacent substituents among $R^5$ to $R^2$ may bond to each other to form a ring; $R^{13}$ and $R^{14}$ may be the same or different from each other and may bond to each other to form a ring; M is a transition metal of Group 4 of the periodic table; Y is a carbon atom; Q is/are each selected from a halogen atom, a hydrocarbon group, an anionic ligand, or a neutral ligand capable of coordinating with a lone pair, which may be the same or different from one another; and j is an integer of 1 to 4 and (b-1) an organoaluminoxy compound and/or (b-2) a compound that reacts with the transition metal compound (a1) to form an ion-pair, and if desired, (b-3) an organoaluminum compound.

Examples of such transition metal compound include the compound described in Pamphlet of WO 2004/087775.

There may be also adopted the organoaluminoxy compound (b-1), the compound (b-2) that reacts with the transition metal compound (a1) to form an ion-pair, the organoaluminum compound (b-3), and specific polymerization procedures described in Pamphlet of WO 2004/087775.

In terms of production of a copolymer with a high molecular weight (MFR or the like), it is more preferable to polymerize propylene, ethylene, and an α-olefin having 4 to 20 carbon atoms in the presence of a catalyst for olefin polymerization comprising (a2) a bridged metallocene compound represented by general formula (a2) below and (b) one or more compound(s) selected from (b-1) an organoaluminoxy compound, (b-2) a compound that reacts with the bridged metallocene compound (a2) to form an ion-pair, and (b-3) an organoaluminum compound.

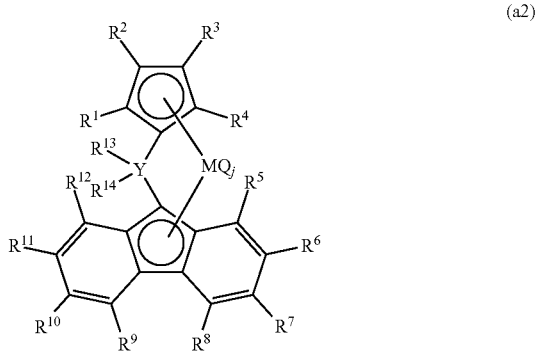

(a2)

In the general formula (a2), $R^1$ and $R^3$ are hydrogen atoms, $R^2$ and $R^4$ are groups each selected from a hydrocarbon group having 1 to 20 carbon atom(s) and a silicon-containing group having 1 to 20 carbon atom(s). $R^4$ is preferably an alkyl group having 1 to 4 carbon atom(s). $R^5$, $R^6$, $R^7$, $R^8$, $R^9$, $R^{10}$, $R^{11}$, and $R^{12}$ are each selected from a hydrogen atom, a hydrocarbon group, and a silicon-containing group, which may be the same or different from one another, and any adjacent substituents among them may bond together to form a ring. $R^{13}$ and $R^{14}$ are each selected from a hydrocarbon group and a silicon-containing group, which may be the same or different from each other and may bond together to form a ring. M is Ti, Zr, or Hf. Y is a carbon atom or a silicon atom, Q may be the same or different from one another and each is selected from a halogen atom, a hydrocarbon group, an anionic ligand, and a neutral ligand capable of coordinating with a lone pair, and j is an integer of 1 to 4.

Bridged Metallocene Compound (a2)

The bridged metallocene compound (a2) represented by above general formula (a2) has a chemical structure specified by features [m1] and [m2] below.

[m1] Of the two ligands, one is a cyclopentadienyl group having a substituent (hereinafter, referred to as "substituted cyclopentadienyl group") and the other is a fluorenyl group.

[m2] The transition metal constituting a metallocene compound (M in general formula (a2)) is titanium, zirconium, or hafnium.

Hereinafter, the structural features of the bridged metallocene compound (a2), that is, substituted cyclopentadienyl group, fluorenyl group, bridged part, and other characteristics, will be explained sequentially and then preferred bridged metallocene compound with the above structural features will be listed as examples.

[1] Substituted Cyclopentadienyl Group

In the substituted cyclopentadienyl group in the structural formula represented by general formula (a2), $R^1$ and $R^3$ are hydrogen atoms, and $R^2$ and $R^4$ are each a hydrocarbon group (f1) having 1 to 20 carbon atom(s) or a silicon-containing group (f2) having 1 to 20 carbon atom(s).

Examples of the hydrocarbon group (f1) having 1 to 20 carbon atom(s) include, alkyl groups, alkenyl groups, alkynyl groups, and aryl groups, these groups comprising only carbon atoms and hydrogen atoms; heteroatom-containing hydrocarbon groups in which some of hydrogen atoms directly bonded to a carbon atom in such a hydrocarbon group is replaced by a halogen atom, an oxygen-containing group, a nitrogen-containing group, or a silicon-containing group; and groups in which the two arbitrary hydrogen atoms adjacent to each other are substituted to form an aliphatic ring. Examples of the hydrocarbon group (f1) include linear hydrocarbon groups such as methyl, ethyl, n-propyl, allyl, n-butyl, n-pentyl, n-hexyl, n-heptyl, n-octyl, n-nonyl, and n-decanyl; branched hydrocarbon groups such as isopropyl, tert-butyl, amyl, 3-methylpentyl, 1,1-diethylpropyl, 1,1-dimethylbutyl, 1-methyl-1-propylbutyl, 1,1-propylbutyl, 1,1-dimethyl-2-methylpropyl, and 1-methyl-1-isopropyl-2-methylpropyl; cyclic saturated hydrocarbon groups such as cyclopentyl, cyclohexyl, cycloheptyl, cyclooctyl, norbonyl, and adamantyl; cyclic unsaturated hydrocarbon groups such as phenyl, naphthyl, biphenylyl, phenanthryl, anthracenyl, and their ring-substituted derivatives; aryl-substituted saturated hydrocarbon groups such as benzyl and cumyl; and heteroatom-containing hydrocarbon groups such as methoxy, ethoxy, phenoxy, N-methylamino, trifluoromethyl, tribromomethyl, pentafluoroethyl, and pentafluorophenyl.

The silicon-containing group (f2) having 1 to 20 carbon atom(s) is, for example, a group that bonds to a ring carbon atom in the cyclopentadienyl group so that the silicon atom directly bonds to said carbon atom via a covalent bond. Specific examples of the silicon-containing group (f2) having 1 to 20 carbon atom(s) include alkylsilyl groups and arylsilyl groups. Examples of the silicon-containing group (f2) include trimethylsilyl, triethylsilyl, triphenylsilyl, and the like.

$R^2$ is preferably a hydrocarbon group having 4 to 20 carbon atoms, which is exemplified by, for example, the groups listed above for the hydrocarbon group (f1) having 1 to 20 carbon atom(s) except methyl, ethyl, and propyl.

$R^4$ in general formula (a2) is preferably a hydrocarbon group having 1 to 10 carbon atom(s). In the point that a high-molecular-weight polymer can be obtained, $R^4$ is more preferably an alkyl group having 1 to 4 carbon atom(s), for example, methyl, ethyl, n-propyl, isopropyl, n-butyl, isobutyl, and sec-butyl; especially preferably, it is methyl, ethyl, or n-propyl.

In the most preferable embodiment of the substituted cyclopentadienyl group in the bridged metallocene compound (a2), which is preferably used for producing the propylene/ethylene/α-olefin random copolymer (B), $R^4$ is a hydrocarbon group having 2 to 4 carbon atoms and at the same time $R^2$ is a substituent more bulky than $R^2$ such as tert-butyl, methylcyclohexyl, and methyladamantyl group. The term "bulky" means that occupying a large volume.

[2] Fluorenyl Group

In a preferable polymerization method used for producing the propylene/ethylene/α-olefin random copolymer (B), $R^5$, $R^6$, $R^7$, $R^8$, $R^9$, $R^{10}$, $R^{11}$, and $R^{12}$ of the fluorenyl group in the metallocene compound represented by general formula (a2) are the same atom or the same group selected from a hydrogen atom, a hydrocarbon group, and a silicon-containing group and may bond together to form a ring. Preferred examples of the hydrocarbon group are the hydrocarbon group (f1). The silicon-containing group is exemplified by the silicon-containing group (f2). A more preferable embodiment of the fluorenyl group is a fluorenyl group in which neither $R^6$ nor $R^{11}$ is a hydrogen atom; and an especially preferable is a fluorenyl group in which $R^6$ and $R^{11}$ are the same atoms other than hydrogen or same groups.

[3] Covalent Bridging Part

The main-chain part of the bond linking the cyclopentadienyl group and the fluorenyl group is a divalent covalently bridging divalency bond containing one carbon atom or one silicon atom. The important point in the polymerization is that bridging atom Y of the covalently bridging part in general formula (a2) has $R^{13}$ and $R^{14}$, which may be the same or different from each other. $R^{13}$ and $R^{14}$ are atoms or groups selected from a hydrocarbon group having 1 to 40 carbon atom(s) and a silicon-containing group having 1 to 40 carbon atom(s) and they may bond together to form a ring. The hydrocarbon group and silicon-containing group are exemplified by the hydrocarbon group (f1) and the silicon-containing group (f2), respectively, and groups in which a hydrogen atom in such a group is replaced by an alkyl group, a cycloalkyl group, an aryl group, or the like.

In a preferable method for producing the propylene/ethylene/α-olefin random copolymer (B), $R^{13}$ and $R^{14}$ may be the same or different from each other and each is an aryl group or a substituted aryl group. [In the present specification, "aryl group" is a group solely consisting of aromatic carbons atoms and aromatic hydrogen atoms (sp2-type hydrogen atoms) and "substituted aryl group" is defined as a group in which at least one aromatic hydrogen atom (sp2-type hydrogen atom) of an aryl group is replaced by a group other than hydrogen.] When an aryl group or a substituted aryl group is introduced on the bridging atom (Y), a high-molecular-weight olefin polymer can be efficiently produced.

Examples of the aryl group or substituted aryl group include groups solely consisting of aromatic carbon atoms and aromatic hydrogen atoms (sp$^2$-type hydrogen atoms) having 6 to 18 carbon atoms such as phenyl, naphthyl, anthryl, and phenathryl; and substituted aryl groups in which one or more aromatic hydrogen atoms (sp$^2$-type hydrogen atoms) is/are replaced by a substituent, that is, alkyl- or aryl-substituted aryl groups having 7 to 30 carbon atoms such as tolyl, xylyl, methylnaphthyl, biphenylyl, and terphenylyl, fluoroaryl groups having 6 to 20 carbon atoms such as fluorophenyl and difluorophenyl, chloroaryl groups having 6 to 20 carbon atoms such as chlorophenyl and dichlorophenyl, bromoaryl groups having 6 to 20 carbon atoms such as bromophenyl and dibromophenyl, iodoaryl groups having 6 to 20 carbon atoms such as iodophenyl and diiodophenyl, chloroalkylaryl groups having 7 to 40 carbon atoms such as (trichloromethyl)phenyl and bis(trichloromethyl)phenyl, bromoalkylaryl groups having 7 to 40 carbon atoms such as (tribromomethyl)phenyl and bis(tribromomethyl)phenyl, iodoalkylaryl groups having 7 to 40 carbon atoms such as (triiodomethyl)phenyl and bis(triiodomethyl)phenyl, fluoroalkylaryl groups having 7 to 40 carbon atoms such as (trifluoromethyl)phenyl and bis(trifluoromethyl)phenyl, and the like. Among the substituted aryl groups, preferable is a substituted phenyl group in which the substituents are located at the meta-position or the para-position.

$R^{13}$ and $R^{14}$ are preferably each selected from an alkyl group having 1 to 5 carbon atom(s), phenyl group, and a substituted phenyl group having 6 to 10 carbon atoms, and more preferably selected from methyl, phenyl, tolyl (=methylphenyl), and (trifluoromethy)phenyl.

In method for producing the propylene/ethylene/α-olefin random copolymer (B) preferably used in the present invention, when $R^4$ of the substituted cyclopentadienyl group is methyl, preferably used is a bridged metallocene compound in which $R^6$ and $R^7$ are bonded to each other to form an aliphatic ring and $R^{10}$ and $R^{11}$ are bonded to each other to form an aliphatic ring; and in order to produce a polymer with a higher molecular weight, preferably used is a bridged metallocene compound in which both $R^{13}$ and $R^{14}$ are substituted aryl groups. When $R^4$ is ethyl group, preferably used is a bridged metallocene compound in which both $R^{13}$ and $R^{14}$ are aryl groups or substituted aryl groups from a viewpoint of production of a high-molecular-weight polymer. In general, preferably used is a bridged metallocene compound in which $R^{13}$ and $R^{14}$ are the same because such a bridged metallocene compound is easily produced.

[4] Other Structural Features of the Bridged Metallocene Compound

In general formula (a2), M is Ti, Zr, or Hf and preferably Zr or Hf. Q may be the same or different from each other and each selected from a halogen atom, a hydrocarbon group having 1 to 10 carbon atom(s), a neutral, conjugated or non-conjugated diene having not more than 10 carbon atoms, an anionic ligand, or a neutral ligand capable of coordinating with a lone pair. Specific examples of the halogen atom include fluorine, chlorine, bromine, and iodine atoms. Specific examples of the hydrocarbon group include methyl, ethyl, n-propyl, isopropyl, 2-methylpropyl, 1,1-dimethylpropyl, 2,2-dimethylpropyl, 1,1-diethylpropyl, 1-ethyl-1-methylpropyl, 1,1,2,2-tetramethylpropyl, sec-butyl, tert-butyl, 1,1-dimethylbutyl, 1,1,3-trimethylbutyl, neopentyl, cyclohexylmethyl, cyclohexyl, 1-methyl-1-cyclohexyl, and the like. Specific examples of the neutral conjugated or non-conjugated diene having not more than 10 carbon atoms include s-cis- or s-trans-η$^4$-1,3-butadiene, s-cis- or s-trans-η$^4$-1,4-diphenyl-1,3-butadiene, s-cis- or s-trans-η$^4$-3-methyl-1,3-pentadiene, s-cis- or s-trans-η$^4$-1,4-dibenzyl-1,3-butadiene, s-cis- or s-trans-η$^4$-2,4-hexadiene, s-cis- or s-trans-η$^4$-1,3-pentadiene, s-cis- or s-trans-η$^4$-1,4-ditolyl-1,3-butadiene, s-cis- or s-trans-η$^4$-1,4-bis(trimethylsilyl)-1,3-butadiene, and the like. Specific examples of the anionic ligand include alkoxy groups such as methoxy, tert-butoxy, and phenoxy, carboxylato ligands such acetato and benzoato, sulfonato ligands such as mesylato and tosylato, and the like. Specific examples of the neutral ligand capable of coordinating with a lone pair include organophosphorus compounds such as trimethylphosphine, triethylphosphine, triphenylphosphine, and diphenylmethylphosphine and ethers such as tetrahydrofuran, diethyl ether, dioxane, and 1,2-dimethoxyethane. j is an integer of 1 to 4, and Qs may be the same or different from each other when j is 2 or greater.

[5] Example of Preferable Bridged Metallocene Compound

Specific examples of the metallocene compound represented by the general formula (a2) are listed below, but the scope of the present invention is not limited by these examples:

isopropylidene(3-tert-butyl-5-ethylcyclopentadienyl)(fluorenyl)zirconium dichloride,
isopropylidene(3-tert-butyl-5-ethylcyclopentadienyl)(2,7-di-tert-butylfluorenyl)zirconium dichloride,
isopropylidene(3-tert-butyl-5-ethylcyclopentadienyl)(3,6-di-tert-butylfluorenyl)zirconium dichloride,
isopropylidene(3-tert-butyl-5-ethylcyclopentadienyl)(3,6-di-tert-butyl-2,7-dimethylfluorenyl)zirconium dichloride,
isopropylidene(3-tert-butyl-5-ethylcyclopentadienyl)(2,7-dimethylfluorenyl)zirconium dichloride,
isopropylidene(3-tert-butyl-5-ethylcyclopentadienyl)(2,7-diphenylfluorenyl)zirconium dichloride,
isopropylidene(3-tert-butyl-5-ethylcyclopentadienyl)(2,7-dimesitylfluorenyl)zirconium dichloride,
isopropylidene(3-tert-butyl-5-ethylcyclopentadienyl)(octamethyloctahydrodibenzofluorenyl)zirconium dichloride,
isopropylidene(3-tert-butyl-5-ethylcyclopentadienyl)(1,1,3,6,8,8-hexamethyl-1H,8H-dicyclopenta[b,H]fluorenyl)zirconium dichloride,
isopropylidene(3-tert-butyl-5-ethylcyclopentadienyl)(3,6-di-tert-butyl-2,7-dimesitylfluorenyl)zirconium dichloride,
isopropylidene(3-tert-butyl-5-ethylcyclopentadienyl)(2,3,6,7-tetramethylfluorenyl)zirconium dichloride,
isopropylidene(3-tert-butyl-5-ethylcyclopentadienyl)(2,3,6,7-tetra-tert-butylfluorenyl)zirconium dichloride,
(methyl)(phenyl)methylene(3-tert-butyl-5-ethylcyclopentadienyl)(fluorenyl)zirconium dichloride,
(methyl)(phenyl)methylene(3-tert-butyl-5-ethylcyclopentadienyl)(2,7-di-tert-butylfluorenyl)zirconium dichloride,
(methyl)(phenyl)methylene(3-tert-butyl-5-ethylcyclopentadienyl)(3,6-di-tert-butylfluorenyl)zirconium dichloride,
(methyl)(phenyl)methylene(3-tert-butyl-5-ethylcyclopentadienyl)(3,6-di-tert-butyl-2,7-dimethylfluorenyl)zirconium dichloride,
(methyl)(phenyl)methylene(3-tert-butyl-5-ethylcyclopentadienyl)(2,7-dimethylfluorenyl)zirconium dichloride,
(methyl)(phenyl)methylene(3-tert-butyl-5-ethylcyclopentadienyl)(2,7-diphenylfluorenyl)zirconium dichloride,
(methyl)(phenyl)methylene(3-tert-butyl-5-ethylcyclopentadienyl)(2,7-dimesitylfluorenyl)zirconium dichloride,
(methyl)(phenyl)methylene(3-tert-butyl-5-ethylcyclopentadienyl) (octamethyloctahydrodibenzofluorenyl)zirconium dichloride,
(methyl)(phenyl)methylene(3-tert-butyl-5-ethylcyclopentadienyl)(1,1,3,6,8,8-hexamethyl-1H,8H-dicyclopenta[b,h]fluorenyl)zirconium dichloride,
(methyl)(phenyl)methylene(3-tert-butyl-5-ethylcyclopentadienyl)(3,6-di-tert-butyl-2,7-dimesitylfluorenyl)zirconium dichloride,
(methyl)(phenyl)methylene(3-tert-butyl-5-ethylcyclopentadienyl)(2,3,6,7-tetramethylfluorenyl)zirconium dichloride,
(methyl)(phenyl)methylene(3-tert-butyl-5-ethylcyclopentadienyl)(2,3,6,7-tetra-tert-butylfluorenyl)zirconium dichloride,
diphenylmethylene(3-tert-butyl-5-ethylcyclopentadienyl)(fluorenyl)zirconium dichloride,
diphenylmethylene(3-tert-butyl-5-ethylcyclopentadienyl)(2,7-di-tert-butylfluorenyl)zirconium dichloride,
diphenylmethylene(3-tert-butyl-5-ethylcyclopentadienyl)(3,6-di-tert-butylfluorenyl)zirconium dichloride,
diphenylmethylene(3-tert-butyl-5-ethylcyclopentadienyl)(3,6-di-tert-butyl-2,7-dimethylfluorenyl)zirconium dichloride,
diphenylmethylene(3-tert-butyl-5-ethylcyclopentadienyl)(2,7-dimethylfluorenyl)zirconium dichloride,
diphenylmethylene(3-tert-butyl-5-ethylcyclopentadienyl)(2,7-diphenylfluorenyl)zirconium dichloride,
diphenylmethylene(3-tert-butyl-5-ethylcyclopentadienyl)(2,7-dimesitylfluorenyl)zirconium dichloride,
diphenylmethylene(3-tert-butyl-5-ethylcyclopentadienyl) (octamethyloctahydrodibenzofluorenyl)zirconium dichloride,
diphenylmethylene(3-tert-butyl-5-ethylcyclopentadienyl)(1,1,3,6,8,8-hexamethyl-1H,8H-dicyclopenta[b,h]fluorenyl)zirconium dichloride,
diphenylmethylene(3-tert-butyl-5-ethylcyclopentadienyl)(3,6-di-tert-butyl-2,7-dimesitylfluorenyl)zirconium dichloride,
diphenylmethylene(3-tert-butyl-5-ethylcyclopentadienyl)(2,3,6,7-tetramethylfluorenyl)zirconium dichloride,
diphenylmethylene(3-tert-butyl-5-ethylcyclopentadienyl)(2,3,6,7-tetra-tert-butylfluorenyl)zirconium dichloride,
di(p-chlorophenyl)methylene(3-tert-butyl-5-ethylcyclopentadienyl)(fluorenyl)zirconium dichloride,
di(p-chlorophenyl)methylene(3-tert-butyl-5-ethylcyclopentadienyl)(2,7-di-tert-butylfluorenyl)zirconium dichloride,
di(p-chlorophenyl)methylene(3-tert-butyl-5-ethylcyclopentadienyl)(3,6-di-tert-butylfluorenyl)zirconium dichloride,
di(p-chlorophenyl)methylene(3-tert-butyl-5-ethylcyclopentadienyl)(3,6-di-tert-butyl-2,7-dimethylfluorenyl)zirconium dichloride,
di(p-chlorophenyl)methylene(3-tert-butyl-5-ethylcyclopentadienyl)(2,7-dimethylfluorenyl)zirconium dichloride,
di(p-chlorophenyl)methylene(3-tert-butyl-5-ethylcyclopentadienyl)(2,7-diphenylfluorenyl)zirconium dichloride,
di(p-chlorophenyl)methylene(3-tert-butyl-5-ethylcyclopentadienyl)(2,7-dimesitylfluorenyl)zirconium dichloride,
di(p-chlorophenyl)methylene(3-tert-butyl-5-ethylcyclopentadienyl)(octamethyloctahydrodibenzofluorenyl)zirconium dichloride,
di(p-chlorophenyl)methylene(3-tert-butyl-5-ethylcyclopentadienyl)(1,1,3,6,8,8-hexamethyl-1H,8H-dicyclopenta[b,h]fluorenyl)zirconium dichloride,
di(p-chlorophenyl)methylene(3-tert-butyl-5-ethylcyclopentadienyl)(3,6-di-tert-butyl-2,7-dimesitylfluorenyl)zirconium dichloride,
di(p-chlorophenyl)methylene(3-tert-butyl-5-ethylcyclopentadienyl)(2,3,6,7-tetramethylfluorenyl)zirconium dichloride,
di(p-chlorophenyl)methylene(3-tert-butyl-5-ethylcyclopentadienyl)(2,3,6,7-tetra-tert-butylfluorenyl)zirconium dichloride,
di(m-chlorophenyl)methylene(3-tert-butyl-5-ethylcyclopentadienyl)(fluorenyl)zirconium dichloride,
di(m-chlorophenyl)methylene(3-tert-butyl-5-ethylcyclopentadienyl)(2,7-di-tert-butylfluorenyl)zirconium dichloride,
di(m-chlorophenyl)methylene(3-tert-butyl-5-ethylcyclopentadienyl)(3,6-di-tert-butylfluorenyl)zirconium dichloride,
di(m-chlorophenyl)methylene(3-tert-butyl-5-ethylcyclopentadienyl)(3,6-di-tert-butyl-2,7-dimethylfluorenyl)zirconium dichloride,
di(m-chlorophenyl)methylene(3-tert-butyl-5-ethylcyclopentadienyl)(2,7-dimethylfluorenyl)zirconium dichloride, di(m-chlorophenyl)methylene(3-tert-butyl-5-ethylcyclopentadienyl)(2,7-diphenylfluorenyl)zirconium dichloride,
di(m-chlorophenyl)methylene(3-tert-butyl-5-ethylcyclopentadienyl)(2,7-dimesitylfluorenyl)zirconium dichloride,
di(m-chlorophenyl)methylene(3-tert-butyl-5-ethylcyclopentadienyl)(octamethyloctahydrodibenzofluorenyl)zirconium dichloride,
di(m-chlorophenyl)methylene(3-tert-butyl-5-ethylcyclopentadienyl)(1,1,3,6,8,8-hexamethyl-1H,8H-dicyclopenta[b,h]fluorenyl)zirconium dichloride,
di(m-chlorophenyl)methylene(3-tert-butyl-5-ethylcyclopentadienyl)(3,6-di-tert-butyl-2,7-dimesitylfluorenyl)zirconium dichloride,
di(m-chlorophenyl)methylene(3-tert-butyl-5-ethylcyclopentadienyl)(2,3,6,7-tetramethylfluorenyl)zirconium dichloride,
di(m-chlorophenyl)methylene(3-tert-butyl-5-ethylcyclopentadienyl)(2,3,6,7-tetra-tert-butylfluorenyl)zirconium dichloride,
di(m-trifluoromethylphenyl)methylene(3-tert-butyl-5-ethylcyclopentadienyl)(fluorenyl)zirconium dichloride,
di(m-trifluoromethylphenyl)methylene(3-tert-butyl-5-ethylcyclopentadienyl)(2,7-di-tert-butylfluorenyl)zirconium dichloride,
di(m-trifluoromethylphenyl)methylene(3-tert-butyl-5-ethylcyclopentadienyl)(3,6-di-tert-butylfluorenyl)zirconium dichloride,
di(m-trifluoromethylphenyl)methylene(3-tert-butyl-5-ethylcyclopentadienyl)(3,6-di-tert-butyl-2,7-dimethylfluorenyl)zirconium dichloride,
di(m-trifluoromethylphenyl)methylene(3-tert-butyl-5-ethylcyclopentadienyl)(2,7-dimethylfluorenyl)zirconium dichloride,
di(m-trifluoromethylphenyl)methylene(3-tert-butyl-5-ethylcyclopentadienyl)(2,7-diphenylfluorenyl)zirconium dichloride,
di(m-trifluoromethylphenyl)methylene(3-tert-butyl-5-ethylcyclopentadienyl)(2,7-dimesitylfluorenyl)zirconium dichloride,
di(m-trifluoromethylphenyl)methylene(3-tert-butyl-5-ethylcyclopentadienyl)(octamethyloctahydrodibenzofluorenyl)zirconium dichloride,
di(m-trifluoromethylphenyl)methylene(3-tert-butyl-5-ethylcyclopentadienyl)(1,1,3,6,8,8-hexamethyl-1H,8H-dicyclopenta[b,h]fluorenyl)zirconium dichloride,
di(m-trifluoromethylphenyl)methylene(3-tert-butyl-5-ethylcyclopentadienyl)(3,6-di-tert-butyl-2,7-dimesitylfluorenyl)zirconium dichloride,
di(m-trifluoromethylphenyl)methylene(3-tert-butyl-5-ethylcyclopentadienyl)(2,3,6,7-tetramethylfluorenyl)zirconium dichloride,
di(m-trifluoromethylphenyl)methylene(3-tert-butyl-5-ethylcyclopentadienyl)(2,3,6,7-tetra-tert-butylfluorenyl)zirconium dichloride,
di(p-trifluoromethylphenyl)methylene(3-tert-butyl-5-ethylcyclopentadienyl)(fluorenyl)zirconium dichloride,
di(p-trifluoromethylphenyl)methylene(3-tert-butyl-5-ethylcyclopentadienyl)(2,7-di-tert-butylfluorenyl)zirconium dichloride,
di(p-trifluoromethylphenyl)methylene(3-tert-butyl-5-ethylcyclopentadienyl)(3,6-di-tert-butylfluorenyl)zirconium dichloride,
di(p-trifluoromethylphenyl)methylene(3-tert-butyl-5-ethylcyclopentadienyl)(3,6-di-tert-butyl-2,7-dimethylfluorenyl)zirconium dichloride,
di(p-trifluoromethylphenyl)methylene(3-tert-butyl-5-ethylcyclopentadienyl)(2,7-dimethylfluorenyl)zirconium dichloride,
di(p-trifluoromethylphenyl)methylene(3-tert-butyl-5-ethylcyclopentadienyl)(2,7-diphenylfluorenyl)zirconium dichloride,
di(p-trifluoromethylphenyl)methylene(3-tert-butyl-5-ethylcyclopentadienyl)(2,7-dimesitylfluorenyl)zirconium dichloride,
di(p-trifluoromethylphenyl)methylene(3-tert-butyl-5-ethylcyclopentadienyl)(octamethyloctahydrodibenzofluorenyl)zirconium dichloride,
di(p-trifluoromethylphenyl)methylene(3-tert-butyl-5-ethylcyclopentadienyl)(1,1,3,6,8,8-hexamethyl-1H,8H-dicyclopenta[b,h]fluorenyl)zirconium dichloride,
di(p-trifluoromethylphenyl)methylene(3-tert-butyl-5-ethylcyclopentadienyl)(3,6-di-tert-butyl-2,7-dimesitylfluorenyl)zirconium dichloride,
di(p-trifluoromethylphenyl)methylene(3-tert-butyl-5-ethylcyclopentadienyl)(2,3,6,7-tetramethylfluorenyl)zirconium dichloride,
di(p-trifluoromethylphenyl)methylene(3-tert-butyl-5-ethylcyclopentadienyl)(2,3,6,7-tetra-tert-butylfluorenyl)zirconium dichloride,
di(p-tolyl)methylene(3-tert-butyl-5-ethylcyclopentadienyl)(fluorenyl)zirconium dichloride,
di(p-tolyl)methylene(3-tert-butyl-5-ethylcyclopentadienyl)(2,7-di-tert-butylfluorenyl)zirconium dichloride,
di(p-tolyl)methylene(3-tert-butyl-5-ethylcyclopentadienyl)(3,6-di-tert-butylfluorenyl)zirconium dichloride,
di(p-tolyl)methylene(3-tert-butyl-5-ethylcyclopentadienyl)(3,6-di-tert-butyl-2,7-dimethylfluorenyl)zirconium dichloride,
di(p-tolyl)methylene(3-tert-butyl-5-ethylcyclopentadienyl)(2,7-dimethylfluorenyl)zirconium dichloride,
di(p-tolyl)methylene(3-tert-butyl-5-ethylcyclopentadienyl)(2,7-diphenylfluorenyl)zirconium dichloride,
di(p-tolyl)methylene(3-tert-butyl-5-ethylcyclopentadienyl)(2,7-dimesitylfluorenyl)zirconium dichloride,
di(p-tolyl)methylene(3-tert-butyl-5-ethylcyclopentadienyl)(octamethyloctahydrodibenzofluorenyl)zirconium dichloride,
di(p-tolyl)methylene(3-tert-butyl-5-ethylcyclopentadienyl)(1,1,3,6,8,8-hexamethyl-1H,8H-dicyclopenta[b,h]fluorenyl)zirconium dichloride,
di(p-tolyl)methylene(3-tert-butyl-5-ethylcyclopentadienyl)(3,6-di-tert-butyl-2,7-dimesitylfluorenyl)zirconium dichloride,
di(p-tolyl)methylene(3-tert-butyl-5-ethylcyclopentadienyl)(2,3,6,7-tetramethylfluorenyl)zirconium dichloride,
di(p-tolyl)methylene(3-tert-butyl-5-ethylcyclopentadienyl)(2,3,6,7-tetra-tert-butylfluorenyl)zirconium dichloride,
isopropylidene(3-tert-butyl-5-n-propylcyclopentadienyl)(fluorenyl)zirconium dichloride,
isopropylidene(3-tert-butyl-5-n-propylcyclopentadienyl)(2,7-di-tert-butylfluorenyl)zirconium dichloride,
isopropylidene(3-tert-butyl-5-n-propylcyclopentadienyl)(3,6-di-tert-butylfluorenyl)zirconium dichloride,
isopropylidene(3-tert-butyl-5-n-propylcyclopentadienyl)(3,6-di-tert-butyl-2,7-dimethylfluorenyl)zirconium dichloride,
isopropylidene(3-tert-butyl-5-n-propylcyclopentadienyl)(2,7-dimethylfluorenyl)zirconium dichloride,
isopropylidene(3-tert-butyl-5-n-propylcyclopentadienyl)(2,7-diphenylfluorenyl)zirconium dichloride,
isopropylidene(3-tert-butyl-5-n-propylcyclopentadienyl)(2,7-dimesitylfluorenyl)zirconium dichloride, isopropylidene(3-tert-butyl-5-n-propylcyclopentadienyl)(octamethyloctahydrodibenzofluorenyl)zirconium dichloride,
isopropylidene(3-tert-butyl-5-n-propylcyclopentadienyl)(1,1,3,6,8,8-hexamethyl-1H,8H-dicyclopenta[b,h]fluorenyl)zirconium dichloride,
isopropylidene(3-tert-butyl-5-n-propylcyclopentadienyl)(3,6-di-tert-butyl-2,7-mesitylfluorenyl)zirconium dichloride,
isopropylidene(3-tert-butyl-5-n-propylcyclopentadienyl)(2,3,6,7-tetramethylfluorenyl)zirconium dichloride,
isopropylidene(3-tert-butyl-5-n-propylcyclopentadienyl)(2,3,6,7-tetra-tert-butylfluorenyl)zirconium dichloride,
(methyl)(phenyl)methylene(3-tert-butyl-5-n-propylcyclopentadienyl)(fluorenyl)zirconium dichloride,
(methyl)(phenyl)methylene(3-tert-butyl-5-n-propylcyclopentadienyl)(2,7-di-tert-butylfluorenyl)zirconium dichloride,
(methyl)(phenyl)methylene(3-tert-butyl-5-n-propylcyclopentadienyl)(3,6-di-tert-butylfluorenyl)zirconium dichloride,
(methyl)(phenyl)methylene(3-tert-butyl-5-n-propylcyclopentadienyl)(3,6-di-tert-butyl-2,7-dimethylfluorenyl)zirconium dichloride,
(methyl)(phenyl)methylene(3-tert-butyl-5-n-propylcyclopentadienyl)(2,7-dimethylfluorenyl)zirconium dichloride,
(methyl)(phenyl)methylene(3-tert-butyl-5-n-propylcyclopentadienyl)(2,7-diphenylfluorenyl)zirconium dichloride,
(methyl)(phenyl)methylene(3-tert-butyl-5-n-propylcyclopentadienyl)(2,7-dimesitylfluorenyl)zirconium dichloride,
(methyl)(phenyl)methylene(3-tert-butyl-5-n-propylcyclopentadienyl)(octamethyloctahydrodibenzofluorenyl)zirconium dichloride,
(methyl)(phenyl)methylene(3-tert-butyl-5-n-propylcyclopentadienyl)(1,1,3,6,8,8-hexamethyl-1H,8H-dicyclopenta[b,h]fluorenyl)zirconium dichloride,
(methyl)(phenyl)methylene(3-tert-butyl-5-n-propylcyclopentadienyl)(3,6-di-tert-butyl-2,7-mesitylfluorenyl)zirconium dichloride,
(methyl)(phenyl)methylene(3-tert-butyl-5-n-propylcyclopentadienyl)(2,3,6,7-tetramethylfluorenyl)zirconium dichloride,
(methyl)(phenyl)methylene(3-tert-butyl-5-n-propylcyclopentadienyl)(2,3,6,7-tetra-tert-butylfluorenyl)zirconium dichloride,
diphenylmethylene(3-tert-butyl-5-n-propylcyclopentadienyl)(fluorenyl)zirconium dichloride,
diphenylmethylene(3-tert-butyl-5-n-propylcyclopentadienyl)(2,7-di-tert-butylfluorenyl)zirconium dichloride,
diphenylmethylene(3-tert-butyl-5-n-propylcyclopentadienyl)(3,6-di-tert-butylfluorenyl)zirconium dichloride,
diphenylmethylene(3-tert-butyl-5-n-propylcyclopentadienyl)(3,6-di-tert-butyl-2,7-dimethylfluorenyl)zirconium dichloride,
diphenylmethylene(3-tert-butyl-5-n-propylcyclopentadienyl)(2,7-dimethylfluorenyl)zirconium dichloride,
diphenylmethylene(3-tert-butyl-5-n-propylcyclopentadienyl)(2,7-diphenylfluorenyl)zirconium dichloride,
diphenylmethylene(3-tert-butyl-5-n-propylcyclopentadienyl)(2,7-dimesitylfluorenyl)zirconium dichloride,
diphenylmethylene(3-tert-butyl-5-n-propylcyclopentadienyl)(octamethyloctahydrodibenzofluorenyl)zirconium dichloride,
diphenylmethylene(3-tert-butyl-5-n-propylcyclopentadienyl)(1,1,3,6,8,8-hexamethyl-1H,8H-dicyclopenta[b,h]fluorenyl)zirconium dichloride,
diphenylmethylene(3-tert-butyl-5-n-propylcyclopentadienyl)(3,6-di-tert-butyl-2,7-mesitylfluorenyl)zirconium dichloride,
diphenylmethylene(3-tert-butyl-5-n-propylcyclopentadienyl)(2,3,6,7-tetramethylfluorenyl)zirconium dichloride,
diphenylmethylene(3-tert-butyl-5-n-propylcyclopentadienyl)(2,3,6,7-tetra-tert-butylfluorenyl)zirconium dichloride,
di(p-chlorophenyl)methylene(3-tert-butyl-5-n-propylcyclopentadienyl)(fluorenyl)zirconium dichloride,
di(p-chlorophenyl)methylene(3-tert-butyl-5-n-propylcyclopentadienyl)(2,7-di-tert-butylfluorenyl)zirconium dichloride,
di(p-chlorophenyl)methylene(3-tert-butyl-5-n-propylcyclopentadienyl)(3,6-di-tert-butylfluorenyl)zirconium dichloride,
di(p-chlorophenyl)methylene(3-tert-butyl-5-n-propylcyclopentadienyl)(3,6-di-tert-butyl-2,7-dimethylfluorenyl)zirconium dichloride,
di(p-chlorophenyl)methylene(3-tert-butyl-5-n-propylcyclopentadienyl)(2,7-dimethylfluorenyl)zirconium dichloride,
di(p-chlorophenyl)methylene(3-tert-butyl-5-n-propylcyclopentadienyl)(2,7-diphenylfluorenyl)zirconium dichloride,
di(p-chlorophenyl)methylene(3-tert-butyl-5-n-propylcyclopentadienyl)(2,7-dimesitylfluorenyl)zirconium dichloride,
di(p-chlorophenyl)methylene(3-tert-butyl-5-n-propylcyclopentadienyl)(octamethyloctahydrodibenzofluorenyl)zirconium dichloride,
di(p-chlorophenyl)methylene(3-tert-butyl-5-n-propylcyclopentadienyl)(1,1,3,6,8,8-hexamethyl-1H,8H-dicyclopenta[b,h]fluorenyl)zirconium dichloride,
di(p-chlorophenyl)methylene(3-tert-butyl-5-n-propylcyclopentadienyl)(3,6-di-tert-butyl-2,7-mesitylfluorenyl)zirconium dichloride,
di(p-chlorophenyl)methylene(3-tert-butyl-5-n-propylcyclopentadienyl)(2,3,6,7-tetramethylfluorenyl)zirconium dichloride,
di(p-chlorophenyl)methylene(3-tert-butyl-5-n-propylcyclopentadienyl)(2,3,6,7-tetra-tert-butylfluorenyl)zirconium dichloride,
di(m-chlorophenyl)methylene(3-tert-butyl-5-n-propylcyclopentadienyl)(fluorenyl)zirconium dichloride,
di(m-chlorophenyl)methylene(3-tert-butyl-5-n-propylcyclopentadienyl)(2,7-di-tert-butylfluorenyl)zirconium dichloride,
di(m-chlorophenyl)methylene(3-tert-butyl-5-n-propylcyclopentadienyl)(3,6-di-tert-butylfluorenyl)zirconium dichloride,
di(m-chlorophenyl)methylene(3-tert-butyl-5-n-propylcyclopentadienyl)(3,6-di-tert-butyl-2,7-dimethylfluorenyl)zirconium dichloride,
di(m-chlorophenyl)methylene(3-tert-butyl-5-n-propylcyclopentadienyl)(2,7-dimethylfluorenyl)zirconium dichloride,
di(m-chlorophenyl)methylene(3-tert-butyl-5-n-propylcyclopentadienyl)(2,7-diphenylfluorenyl)zirconium dichloride,
di(m-chlorophenyl)methylene(3-tert-butyl-5-n-propylcyclopentadienyl)(2,7-dimesitylfluorenyl)zirconium dichloride,
di(m-chlorophenyl)methylene(3-tert-butyl-5-n-propylcyclopentadienyl)(octamethyloctahydrodibenzofluorenyl)zirconium dichloride,
di(m-chlorophenyl)methylene(3-tert-butyl-5-n-propylcyclopentadienyl)(1,1,3,6,8,8-hexamethyl-1H,8H-dicyclopenta[b,h]fluorenyl)zirconium dichloride, di(m-chlorophenyl)methylene(3-tert-butyl-5-n-propylcyclopentadienyl)(3,6-di-tert-butyl-2,7-mesitylfluorenyl)zirconium dichloride,
di(m-chlorophenyl)methylene(3-tert-butyl-5-n-propylcyclopentadienyl)(2,3,6,7-tetramethylfluorenyl)zirconium dichloride,
di(m-chlorophenyl)methylene(3-tert-butyl-5-n-propylcyclopentadienyl)(2,3,6,7-tetra-tert-butylfluorenyl)zirconium dichloride,
di(m-trifluoromethylphenyl)methylene(3-tert-butyl-5-n-propylcyclopentadienyl)(fluorenyl)zirconium dichloride,
di(m-trifluoromethylphenyl)methylene(3-tert-butyl-5-n-propylcyclopentadienyl)(2,7-di-tert-butylfluorenyl)zirconium dichloride,
di(m-trifluoromethylphenyl)methylene(3-tert-butyl-5-n-propylcyclopentadienyl)(3,6-di-tert-butylfluorenyl)zirconium dichloride,
di(m-trifluoromethylphenyl)methylene(3-tert-butyl-5-n-propylcyclopentadienyl)(3,6-di-tert-butyl-2,7-dimethylfluorenyl)zirconium dichloride,
di(m-trifluoromethylphenyl)methylene(3-tert-butyl-5-n-propylcyclopentadienyl)(2,7-dimethylfluorenyl)zirconium dichloride,
di(m-trifluoromethylphenyl)methylene(3-tert-butyl-5-n-propylcyclopentadienyl)(2,7-diphenylfluorenyl)zirconium dichloride,
di(m-trifluoromethylphenyl)methylene(3-tert-butyl-5-n-propylcyclopentadienyl)(2,7-dimesitylfluorenyl)zirconium dichloride,
di(m-trifluoromethylphenyl)methylene(3-tert-butyl-5-n-propylcyclopentadienyl)(octamethyloctahydrodibenzofluorenyl)zirconium dichloride,
di(m-trifluoromethylphenyl)methylene(3-tert-butyl-5-n-propylcyclopentadienyl)(1,1,3,6,8,8-hexamethyl-1H,8H-dicyclopenta[b,h]fluorenyl)zirconium dichloride,
di(m-trifluoromethylphenyl)methylene(3-tert-butyl-5-n-propylcyclopentadienyl)(3,6-di-tert-butyl-2,7-mesitylfluorenyl)zirconium dichloride,
di(m-trifluoromethylphenyl)methylene(3-tert-butyl-5-n-propylcyclopentadienyl)(2,3,6,7-tetramethylfluorenyl)zirconium dichloride,
di(m-trifluoromethylphenyl)methylene(3-tert-butyl-5-n-propylcyclopentadienyl)(2,3,6,7-tetra-tert-butylfluorenyl)zirconium dichloride,
di(p-trifluoromethylphenyl)methylene(3-tert-butyl-5-n-propylcyclopentadienyl)(fluorenyl)zirconium dichloride,
di(p-trifluoromethylphenyl)methylene(3-tert-butyl-5-n-propylcyclopentadienyl)(2,7-di-tert-butylfluorenyl)zirconium dichloride,
di(p-trifluoromethylphenyl)methylene(3-tert-butyl-5-n-propylcyclopentadienyl)(3,6-di-tert-butylfluorenyl)zirconium dichloride,
di(p-trifluoromethylphenyl)methylene(3-tert-butyl-5-n-propylcyclopentadienyl)(3,6-di-tert-butyl-2,7-dimethylfluorenyl)zirconium dichloride,
di(p-trifluoromethylphenyl)methylene(3-tert-butyl-5-n-propylcyclopentadienyl)(2,7-dimethylfluorenyl)zirconium dichloride,
di(p-trifluoromethylphenyl)methylene(3-tert-butyl-5-n-propylcyclopentadienyl)(2,7-diphenylfluorenyl)zirconium dichloride,
di(p-trifluoromethylphenyl)methylene(3-tert-butyl-5-n-propylcyclopentadienyl)(2,7-dimesitylfluorenyl)zirconium dichloride,
di(p-trifluoromethylphenyl)methylene(3-tert-butyl-5-n-propylcyclopentadienyl)(octamethyloctahydrodibenzofluorenyl)zirconium dichloride,
di(p-trifluoromethylphenyl)methylene(3-tert-butyl-5-n-propylcyclopentadienyl)(1,1,3,6,8,8-hexamethyl-1H,8H-dicyclopenta[b,h]fluorenyl)zirconium dichloride,
di(p-trifluoromethylphenyl)methylene(3-tert-butyl-5-n-propylcyclopentadienyl)(3,6-di-tert-butyl-2,7-mesitylfluorenyl)zirconium dichloride,
di(p-trifluoromethylphenyl)methylene(3-tert-butyl-5-n-propylcyclopentadienyl)(2,3,6,7-tetramethylfluorenyl)zirconium dichloride,
di(p-trifluoromethylphenyl)methylene(3-tert-butyl-5-n-propylcyclopentadienyl)(2,3,6,7-tetra-tert-butylfluorenyl)zirconium dichloride,
di(p-tolyl)methylene(3-tert-butyl-5-n-propylcyclopentadienyl)(fluorenyl)zirconium dichloride,
di(p-tolyl)methylene(3-tert-butyl-5-n-propylcyclopentadienyl)(2,7-di-tert-butylfluorenyl)zirconium dichloride,
di(p-tolyl)methylene(3-tert-butyl-5-n-propylcyclopentadienyl)(3,6-di-tert-butylfluorenyl)zirconium dichloride,
di(p-tolyl)methylene(3-tert-butyl-5-n-propylcyclopentadienyl)(3,6-di-tert-butyl-2,7-dimethylfluorenyl)zirconium dichloride,
di(p-tolyl)methylene(3-tert-butyl-5-n-propylcyclopentadienyl)(2,7-dimethylfluorenyl)zirconium dichloride,
di(p-tolyl)methylene(3-tert-butyl-5-n-propylcyclopentadienyl)(2,7-diphenylfluorenyl)zirconium dichloride,
di(p-tolyl)methylene(3-tert-butyl-5-n-propylcyclopentadienyl)(2,7-dimesitylfluorenyl)zirconium dichloride,
di(p-tolyl)methylene(3-tert-butyl-5-n-propylcyclopentadienyl)(octamethyloctahydrodibenzofluorenyl)zirconium dichloride,
di(p-tolyl)methylene(3-tert-butyl-5-n-propylcyclopentadienyl)(1,1,3,6,8,8-hexamethyl-1H,8H-dicyclopenta[b,h]fluorenyl)zirconium dichloride,
di(p-tolyl)methylene(3-tert-butyl-5-n-propylcyclopentadienyl)(3,6-di-tert-butyl-2,7-mesitylfluorenyl)zirconium dichloride,
di(p-tolyl)methylene(3-tert-butyl-5-n-propylcyclopentadienyl)(2,3,6,7-tetramethylfluorenyl)zirconium dichloride,
di(p-tolyl)methylene(3-tert-butyl-5-n-propylcyclopentadienyl)(2,3,6,7-tetra-tert-butylfluorenyl)zirconium dichloride,
isopropylidene(3-tert-butyl-5-n-isopropylcyclopentadienyl)(fluorenyl)zirconium dichloride,
isopropylidene(3-tert-butyl-5-n-isopropylcyclopentadienyl)(2,7-di-tert-butylfluorenyl)zirconium dichloride,
isopropylidene(3-tert-butyl-5-n-isopropylcyclopentadienyl)(3,6-di-tert-butylfluorenyl)zirconium dichloride,
isopropylidene(3-tert-butyl-5-n-isopropylcyclopentadienyl)(3,6-di-tert-butyl-2,7-dimethylfluorenyl)zirconium dichloride,
isopropylidene(3-tert-butyl-5-n-isopropylcyclopentadienyl)(2,7-dimethylfluorenyl)zirconium dichloride,
isopropylidene(3-tert-butyl-5-n-isopropylcyclopentadienyl)(2,7-diphenylfluorenyl)zirconium dichloride,
isopropylidene(3-tert-butyl-5-n-isopropylcyclopentadienyl)(2,7-dimesitylfluorenyl)zirconium dichloride,
isopropylidene(3-tert-butyl-5-n-isopropylcyclopentadienyl)(octamethyloctahydrodibenzofluorenyl)zirconium dichloride,
isopropylidene(3-tert-butyl-5-n-isopropylcyclopentadienyl)(1,1,3,6,8,8-hexamethyl-1H,8H-dicyclopenta[b,h]fluorenyl)zirconium dichloride,
isopropylidene(3-tert-butyl-5-n-isopropylcyclopentadienyl)(3,6-di-tert-butyl-2,7-mesitylfluorenyl)zirconium dichloride,
isopropylidene(3-tert-butyl-5-n-isopropylcyclopentadienyl)(2,3,6,7-tetramethylfluorenyl)zirconium dichloride, isopropylidene(3-tert-butyl-5-n-isopropylcyclopentadienyl)(2,3,6,7-tetra-tert-butylfluorenyl)zirconium dichloride,
(methyl)(phenyl)methylene(3-tert-butyl-5-n-isopropylcyclopentadienyl)(fluorenyl)zirconium dichloride,
(methyl)(phenyl)methylene(3-tert-butyl-5-n-isopropylcyclopentadienyl)(2,7-di-tert-butylfluorenyl)zirconium dichloride,
(methyl)(phenyl)methylene(3-tert-butyl-5-n-isopropylcyclopentadienyl)(3,6-di-tert-butylfluorenyl)zirconium dichloride,
(methyl)(phenyl)methylene(3-tert-butyl-5-n-isopropylcyclopentadienyl)(3,6-di-tert-butyl-2,7-dimethylfluorenyl)zirconium dichloride,
(methyl)(phenyl)methylene(3-tert-butyl-5-n-isopropylcyclopentadienyl)(2,7-dimethylfluorenyl)zirconium dichloride,
(methyl)(phenyl)methylene(3-tert-butyl-5-n-isopropylcyclopentadienyl)(2,7-diphenylfluorenyl)zirconium dichloride,
(methyl)(phenyl)methylene(3-tert-butyl-5-n-isopropylcyclopentadienyl)(2,7-dimesitylfluorenyl)zirconium dichloride,
(methyl)(phenyl)methylene(3-tert-butyl-5-n-isopropylcyclopentadienyl)(octamethyloctahydrodibenzofluorenyl)zirconium dichloride,
(methyl)(phenyl)methylene(3-tert-butyl-5-n-isopropylcyclopentadienyl)(1,1,3,6,8,8-hexamethyl-1H,8H-dicyclopenta[b,h]fluorenyl)zirconium dichloride,
(methyl)(phenyl)methylene(3-tert-butyl-5-n-isopropylcyclopentadienyl)(3,6-di-tert-butyl-2,7-mesitylfluorenyl)zirconium dichloride,
(methyl)(phenyl)methylene(3-tert-butyl-5-n-isopropylcyclopentadienyl)(2,3,6,7-tetramethylfluorenyl)zirconium dichloride,
(methyl)(phenyl)methylene(3-tert-butyl-5-n-isopropylcyclopentadienyl)(2,3,6,7-tetra-tert-butylfluorenyl)zirconium dichloride,
diphenylmethylene(3-tert-butyl-5-n-isopropylcyclopentadienyl)(fluorenyl)zirconium dichloride,
diphenylmethylene(3-tert-butyl-5-n-isopropylcyclopentadienyl)(2,7-di-tert-butylfluorenyl)zirconium dichloride,
diphenylmethylene(3-tert-butyl-5-n-isopropylcyclopentadienyl)(3,6-di-tert-butylfluorenyl)zirconium dichloride,
diphenylmethylene(3-tert-butyl-5-n-isopropylcyclopentadienyl)(3,6-di-tert-butyl-2,7-dimethylfluorenyl)zirconium dichloride,
diphenylmethylene(3-tert-butyl-5-n-isopropylcyclopentadienyl)(2,7-dimethylfluorenyl)zirconium dichloride,
diphenylmethylene(3-tert-butyl-5-n-isopropylcyclopentadienyl)(2,7-diphenylfluorenyl)zirconium dichloride,
diphenylmethylene(3-tert-butyl-5-n-isopropylcyclopentadienyl)(2,7-dimesitylfluorenyl)zirconium dichloride,
diphenylmethylene(3-tert-butyl-5-n-isopropylcyclopentadienyl)(octamethyloctahydrodibenzofluorenyl)zirconium dichloride,
diphenylmethylene(3-tert-butyl-5-n-isopropylcyclopentadienyl)(1,1,3,6,8,8-hexamethyl-1H,8H-dicyclopenta[b,h]fluorenyl)zirconium dichloride,
diphenylmethylene(3-tert-butyl-5-n-isopropylcyclopentadienyl)(3,6-di-tert-butyl-2,7-mesitylfluorenyl)zirconium dichloride,
diphenylmethylene(3-tert-butyl-5-n-isopropylcyclopentadienyl)(2,3,6,7-tetramethylfluorenyl)zirconium dichloride,
diphenylmethylene(3-tert-butyl-5-n-isopropylcyclopentadienyl)(2,3,6,7-tetra-tert-butylfluorenyl)zirconium dichloride,
di(p-chlorophenyl)methylene(3-tert-butyl-5-n-isopropylcyclopentadienyl)(fluorenyl)zirconium dichloride,
di(p-chlorophenyl)methylene(3-tert-butyl-5-n-isopropylcyclopentadienyl)(2,7-di-tert-butylfluorenyl)zirconium dichloride,
di(p-chlorophenyl)methylene(3-tert-butyl-5-n-isopropylcyclopentadienyl)(3,6-di-tert-butylfluorenyl)zirconium dichloride,
di(p-chlorophenyl)methylene(3-tert-butyl-5-n-isopropylcyclopentadienyl)(3,6-di-tert-butyl-2,7-dimethylfluorenyl)zirconium dichloride,
di(p-chlorophenyl)methylene(3-tert-butyl-5-n-isopropylcyclopentadienyl)(2,7-dimethylfluorenyl)zirconium dichloride,
di(p-chlorophenyl)methylene(3-tert-butyl-5-n-isopropylcyclopentadienyl)(2,7-diphenylfluorenyl)zirconium dichloride,
di(p-chlorophenyl)methylene(3-tert-butyl-5-n-isopropylcyclopentadienyl)(2,7-dimesitylfluorenyl)zirconium dichloride,
di(p-chlorophenyl)methylene(3-tert-butyl-5-n-isopropylcyclopentadienyl)(octamethyloctahydrodibenzofluorenyl)zirconium dichloride,
di(p-chlorophenyl)methylene(3-tert-butyl-5-n-isopropylcyclopentadienyl)(1,1,3,6,8,8-hexamethyl-1H,8H-dicyclopenta[b,h]fluorenyl)zirconium dichloride,
di(p-chlorophenyl)methylene(3-tert-butyl-5-n-isopropylcyclopentadienyl)(3,6-di-tert-butyl-2,7-mesitylfluorenyl)zirconium dichloride,
di(p-chlorophenyl)methylene(3-tert-butyl-5-n-isopropylcyclopentadienyl)(2,3,6,7-tetramethylfluorenyl)zirconium dichloride,
di(p-chlorophenyl)methylene(3-tert-butyl-5-n-isopropylcyclopentadienyl)(2,3,6,7-tetra-tert-butylfluorenyl)zirconium dichloride,
di(m-chlorophenyl)methylene(3-tert-butyl-5-n-isopropylcyclopentadienyl)(fluorenyl)zirconium dichloride,
di(m-chlorophenyl)methylene(3-tert-butyl-5-n-isopropylcyclopentadienyl)(2,7-di-tert-butylfluorenyl)zirconium dichloride,
di(m-chlorophenyl)methylene(3-tert-butyl-5-n-isopropylcyclopentadienyl)(3,6-di-tert-butylfluorenyl)zirconium dichloride,
di(m-chlorophenyl)methylene(3-tert-butyl-5-n-isopropylcyclopentadienyl)(3,6-di-tert-butyl-2,7-dimethylfluorenyl)zirconium dichloride,
di(m-chlorophenyl)methylene(3-tert-butyl-5-n-isopropylcyclopentadienyl)(2,7-dimethylfluorenyl)zirconium dichloride,
di(m-chlorophenyl)methylene(3-tert-butyl-5-n-isopropylcyclopentadienyl)(2,7-diphenylfluorenyl)zirconium dichloride,
di(m-chlorophenyl)methylene(3-tert-butyl-5-n-isopropylcyclopentadienyl)(2,7-dimesitylfluorenyl)zirconium dichloride,
di(m-chlorophenyl)methylene(3-tert-butyl-5-n-isopropylcyclopentadienyl)(octamethyloctahydrodibenzofluorenyl)zirconium dichloride,
di(m-chlorophenyl)methylene(3-tert-butyl-5-n-isopropylcyclopentadienyl)(1,1,3,6,8,8-hexamethyl-1H,8H-dicyclopenta[b,h]fluorenyl)zirconium dichloride,
di(m-chlorophenyl)methylene(3-tert-butyl-5-n-isopropylcyclopentadienyl)(3,6-di-tert-butyl-2,7-mesitylfluorenyl)zirconium dichloride,
di(m-chlorophenyl)methylene(3-tert-butyl-5-n-isopropylcyclopentadienyl)(2,3,6,7-tetramethylfluorenyl)zirconium dichloride, di(m-chlorophenyl)methylene(3-tert-butyl-5-n-isopropylcyclopentadienyl)(2,3,6,7-tetra-tert-butylfluorenyl)zirconium dichloride,
di(m-trifluoromethylphenyl)methylene(3-tert-butyl-5-n-isopropylcyclopentadienyl)(fluorenyl)zirconium dichloride,
di(m-trifluoromethylphenyl)methylene(3-tert-butyl-5-n-isopropylcyclopentadienyl)(2,7-di-tert-butylfluorenyl)zirconium dichloride,
di(m-trifluoromethylphenyl)methylene(3-tert-butyl-5-n-isopropylcyclopentadienyl)(3,6-di-tert-butylfluorenyl)zirconium dichloride,
di(m-trifluoromethylphenyl)methylene(3-tert-butyl-5-n-isopropylcyclopentadienyl)(3,6-di-tert-butyl-2,7-dimethylfluorenyl)zirconium dichloride,
di(m-trifluoromethylphenyl)methylene(3-tert-butyl-5-n-isopropylcyclopentadienyl)(2,7-dimethylfluorenyl)zirconium dichloride,
di(m-trifluoromethylphenyl)methylene(3-tert-butyl-5-n-isopropylcyclopentadienyl)(2,7-diphenylfluorenyl)zirconium dichloride,
di(m-trifluoromethylphenyl)methylene(3-tert-butyl-5-n-isopropylcyclopentadienyl)(2,7-dimesitylfluorenyl)zirconium dichloride,
di(m-trifluoromethylphenyl)methylene(3-tert-butyl-5-n-isopropylcyclopentadienyl)(octamethyloctahydrodibenzofluorenyl)zirconium dichloride,
di(m-trifluoromethylphenyl)methylene(3-tert-butyl-5-n-isopropylcyclopentadienyl)(1,1,3,6,8,8-hexamethyl-1H,8H-dicyclopenta[b,h]fluorenyl)zirconium dichloride,
di(m-trifluoromethylphenyl)methylene(3-tert-butyl-5-n-isopropylcyclopentadienyl)(3,6-di-tert-butyl-2,7-mesitylfluorenyl)zirconium dichloride,
di(m-trifluoromethylphenyl)methylene(3-tert-butyl-5-n-isopropylcyclopentadienyl)(2,3,6,7-tetramethylfluorenyl)zirconium dichloride,
di(m-trifluoromethylphenyl)methylene(3-tert-butyl-5-n-isopropylcyclopentadienyl)(2,3,6,7-tetra-tert-butylfluorenyl)zirconium dichloride,
di(p-trifluoromethylphenyl)methylene(3-tert-butyl-5-n-isopropylcyclopentadienyl)(fluorenyl)zirconium dichloride,
di(p-trifluoromethylphenyl)methylene(3-tert-butyl-5-n-isopropylcyclopentadienyl)(2,7-di-tert-butylfluorenyl)zirconium dichloride,
di(p-trifluoromethylphenyl)methylene(3-tert-butyl-5-n-isopropylcyclopentadienyl)(3,6-di-tert-butylfluorenyl)zirconium dichloride,
di(p-trifluoromethylphenyl)methylene(3-tert-butyl-5-n-isopropylcyclopentadienyl)(3,6-di-tert-butyl-2,7-dimethylfluorenyl)zirconium dichloride,
di(p-trifluoromethylphenyl)methylene(3-tert-butyl-5-n-isopropylcyclopentadienyl)(2,7-dimethylfluorenyl)zirconium dichloride,
di(p-trifluoromethylphenyl)methylene(3-tert-butyl-5-n-isopropylcyclopentadienyl)(2,7-diphenylfluorenyl)zirconium dichloride,
di(p-trifluoromethylphenyl)methylene(3-tert-butyl-5-n-isopropylcyclopentadienyl)(2,7-dimesitylfluorenyl)zirconium dichloride,
di(p-trifluoromethylphenyl)methylene(3-tert-butyl-5-n-isopropylcyclopentadienyl)(octamethyloctahydrodibenzofluorenyl)zirconium dichloride,
di(p-trifluoromethylphenyl)methylene(3-tert-butyl-5-n-isopropylcyclopentadienyl)(1,1,3,6,8,8-hexamethyl-1H,8H-dicyclopenta[b,h]fluorenyl)zirconium dichloride,
di(p-trifluoromethylphenyl)methylene(3-tert-butyl-5-n-isopropylcyclopentadienyl)(3,6-di-tert-butyl-2,7-mesitylfluorenyl)zirconium dichloride,
di(p-trifluoromethylphenyl)methylene(3-tert-butyl-5-n-isopropylcyclopentadienyl)(2,3,6,7-tetramethylfluorenyl)zirconium dichloride,
di(p-trifluoromethylphenyl)methylene(3-tert-butyl-5-n-isopropylcyclopentadienyl)(2,3,6,7-tetra-tert-butylfluorenyl)zirconium dichloride,
di(p-tolyl)methylene(3-tert-butyl-5-n-isopropylcyclopentadienyl)(fluorenyl)zirconium dichloride,
di(p-tolyl)methylene(3-tert-butyl-5-n-isopropylcyclopentadienyl)(2,7-di-tert-butylfluorenyl)zirconium dichloride,
di(p-tolyl)methylene(3-tert-butyl-5-n-isopropylcyclopentadienyl)(3,6-di-tert-butylfluorenyl)zirconium dichloride,
di(p-tolyl)methylene(3-tert-butyl-5-n-isopropylcyclopentadienyl)(3,6-di-tert-butyl-2,7-dimethylfluorenyl)zirconium dichloride,
di(p-tolyl)methylene(3-tert-butyl-5-n-isopropylcyclopentadienyl)(2,7-dimethylfluorenyl)zirconium dichloride,
di(p-tolyl)methylene(3-tert-butyl-5-n-isopropylcyclopentadienyl)(2,7-diphenylfluorenyl)zirconium dichloride,
di(p-tolyl)methylene(3-tert-butyl-5-n-isopropylcyclopentadienyl)(2,7-dimesitylfluorenyl)zirconium dichloride,
di(p-tolyl)methylene(3-tert-butyl-5-n-isopropylcyclopentadienyl)(octamethyloctahydrodibenzofluorenyl)zirconium dichloride,
di(p-tolyl)methylene(3-tert-butyl-5-n-isopropylcyclopentadienyl)(1,1,3,6,8,8-hexamethyl-1H,8H-dicyclopenta[b,h]fluorenyl)zirconium dichloride,
di(p-tolyl)methylene(3-tert-butyl-5-n-isopropylcyclopentadienyl)(3,6-di-tert-butyl-2,7-mesitylfluorenyl)zirconium dichloride,
di(p-tolyl)methylene(3-tert-butyl-5-n-isopropylcyclopentadienyl)(2,3,6,7-tetramethylfluorenyl)zirconium dichloride,
di(p-tolyl)methylene(3-tert-butyl-5-n-isopropylcyclopentadienyl)(2,3,6,7-tetra-tert-butylfluorenyl)zirconium dichloride,
isopropylidene(3-tert-butyl-5-n-butylcyclopentadienyl)(fluorenyl)zirconium dichloride,
isopropylidene(3-tert-butyl-5-n-butylcyclopentadienyl)(2,7-di-tert-butylfluorenyl)zirconium dichloride,
isopropylidene(3-tert-butyl-5-n-butylcyclopentadienyl)(3,6-di-tert-butylfluorenyl)zirconium dichloride,
isopropylidene(3-tert-butyl-5-n-butylcyclopentadienyl)(3,6-di-tert-butyl-2,7-dimethylfluorenyl)zirconium dichloride,
isopropylidene(3-tert-butyl-5-n-butylcyclopentadienyl)(2,7-dimethylfluorenyl)zirconium dichloride,
isopropylidene(3-tert-butyl-5-n-butylcyclopentadienyl)(2,7-diphenylfluorenyl)zirconium dichloride,
isopropylidene(3-tert-butyl-5-n-butylcyclopentadienyl)(2,7-dimesitylfluorenyl)zirconium dichloride,
isopropylidene(3-tert-butyl-5-n-butylcyclopentadienyl)(octamethyloctahydrodibenzofluorenyl)zirconium dichloride,
isopropylidene(3-tert-butyl-5-n-butylcyclopentadienyl)(1,1,3,6,8,8-hexamethyl-1H,8H-dicyclopenta[b,h]fluorenyl)zirconium dichloride,
isopropylidene(3-tert-butyl-5-n-butylcyclopentadienyl)(3,6-di-tert-butyl-2,7-mesitylfluorenyl)zirconium dichloride,
isopropylidene(3-tert-butyl-5-n-butylcyclopentadienyl)(2,3,6,7-tetramethylfluorenyl)zirconium dichloride,
isopropylidene(3-tert-butyl-5-n-butylcyclopentadienyl)(2,3,6,7-tetra-tert-butylfluorenyl)zirconium dichloride,
(methyl)(phenyl)methylene(3-tert-butyl-5-n-butylcyclopentadienyl)(fluorenyl)zirconium dichloride,
(methyl)(phenyl)methylene(3-tert-butyl-5-n-butylcyclopentadienyl)(2,7-di-tert-butylfluorenyl)zirconium dichloride, (methyl)(phenyl)methylene(3-tert-butyl-5-n-butylcyclopentadienyl)(3,6-di-tert-butylfluorenyl)zirconium dichloride,
(methyl)(phenyl)methylene(3-tert-butyl-5-n-butylcyclopentadienyl)(3,6-di-tert-butyl-2,7-dimethylfluorenyl)zirconium dichloride,
(methyl)(phenyl)methylene(3-tert-butyl-5-n-butylcyclopentadienyl)(2,7-dimethylfluorenyl)zirconium dichloride,
(methyl)(phenyl)methylene(3-tert-butyl-5-n-butylcyclopentadienyl)(2,7-diphenylfluorenyl)zirconium dichloride,
(methyl)(phenyl)methylene(3-tert-butyl-5-n-butylcyclopentadienyl)(2,7-dimesitylfluorenyl)zirconium dichloride,
(methyl)(phenyl)methylene(3-tert-butyl-5-n-butylcyclopentadienyl)(octamethyloctahydrodibenzofluorenyl)zirconium dichloride,
(methyl)(phenyl)methylene(3-tert-butyl-5-n-butylcyclopentadienyl)(1,1,3,6,8,8-hexamethyl-1H,8H-dicyclopenta[b,h]fluorenyl)zirconium dichloride,
(methyl)(phenyl)methylene(3-tert-butyl-5-n-butylcyclopentadienyl)(3,6-di-tert-butyl-2,7-mesitylfluorenyl)zirconium dichloride,
(methyl)(phenyl)methylene(3-tert-butyl-5-n-butylcyclopentadienyl)(2,3,6,7-tetramethylfluorenyl)zirconium dichloride,
(methyl)(phenyl)methylene(3-tert-butyl-5-n-butylcyclopentadienyl)(2,3,6,7-tetra-tert-butylfluorenyl)zirconium dichloride,
diphenylmethylene(3-tert-butyl-5-n-butylcyclopentadienyl)(fluorenyl)zirconium dichloride,
diphenylmethylene(3-tert-butyl-5-n-butylcyclopentadienyl)(2,7-di-tert-butylfluorenyl)zirconium dichloride,
diphenylmethylene(3-tert-butyl-5-n-butylcyclopentadienyl)(3,6-di-tert-butylfluorenyl)zirconium dichloride,
diphenylmethylene(3-tert-butyl-5-n-butylcyclopentadienyl)(3,6-di-tert-butyl-2,7-dimethylfluorenyl)zirconium dichloride,
diphenylmethylene(3-tert-butyl-5-n-butylcyclopentadienyl)(2,7-dimethylfluorenyl)zirconium dichloride,
diphenylmethylene(3-tert-butyl-5-n-butylcyclopentadienyl)(2,7-diphenylfluorenyl)zirconium dichloride,
diphenylmethylene(3-tert-butyl-5-n-butylcyclopentadienyl)(2,7-dimesitylfluorenyl)zirconium dichloride,
diphenylmethylene(3-tert-butyl-5-n-butylcyclopentadienyl)(octamethyloctahydrodibenzofluorenyl)zirconium dichloride,
diphenylmethylene(3-tert-butyl-5-n-butylcyclopentadienyl)(1,1,3,6,8,8-hexamethyl-1H,8H-dicyclopenta[b,h]fluorenyl)zirconium dichloride,
diphenylmethylene(3-tert-butyl-5-n-butylcyclopentadienyl)(3,6-di-tert-butyl-2,7-mesitylfluorenyl)zirconium dichloride,
diphenylmethylene(3-tert-butyl-5-n-butylcyclopentadienyl)(2,3,6,7-tetramethylfluorenyl)zirconium dichloride,
diphenylmethylene(3-tert-butyl-5-n-butylcyclopentadienyl)(2,3,6,7-tetra-tert-butylfluorenyl)zirconium dichloride,
di(p-chlorophenyl)methylene(3-tert-butyl-5-n-butylcyclopentadienyl)(fluorenyl)zirconium dichloride,
di(p-chlorophenyl)methylene(3-tert-butyl-5-n-butylcyclopentadienyl)(2,7-di-tert-butylfluorenyl)zirconium dichloride,
di(p-chlorophenyl)methylene(3-tert-butyl-5-n-butylcyclopentadienyl)(3,6-di-tert-butylfluorenyl)zirconium dichloride,
di(p-chlorophenyl)methylene(3-tert-butyl-5-n-butylcyclopentadienyl)(3,6-di-tert-butyl-2,7-dimethylfluorenyl)zirconium dichloride,
di(p-chlorophenyl)methylene(3-tert-butyl-5-n-butylcyclopentadienyl)(2,7-dimethylfluorenyl)zirconium dichloride,
di(p-chlorophenyl)methylene(3-tert-butyl-5-n-butylcyclopentadienyl)(2,7-diphenylfluorenyl)zirconium dichloride,
di(p-chlorophenyl)methylene(3-tert-butyl-5-n-butylcyclopentadienyl)(2,7-dimesitylfluorenyl)zirconium dichloride,
di(p-chlorophenyl)methylene(3-tert-butyl-5-n-butylcyclopentadienyl)(octamethyloctahydrodibenzofluorenyl)zirconium dichloride,
di(p-chlorophenyl)methylene(3-tert-butyl-5-n-butylcyclopentadienyl)(1,1,3,6,8,8-hexamethyl-1H,8H-dicyclopenta[b,h]fluorenyl)zirconium dichloride,
di(p-chlorophenyl)methylene(3-tert-butyl-5-n-butylcyclopentadienyl)(3,6-di-tert-butyl-2,7-mesitylfluorenyl)zirconium dichloride,
di(p-chlorophenyl)methylene(3-tert-butyl-5-n-butylcyclopentadienyl)(2,3,6,7-tetramethylfluorenyl)zirconium dichloride,
di(p-chlorophenyl)methylene(3-tert-butyl-5-n-butylcyclopentadienyl)(2,3,6,7-tetra-tert-butylfluorenyl)zirconium dichloride,
di(m-chlorophenyl)methylene(3-tert-butyl-5-n-butylcyclopentadienyl)(fluorenyl)zirconium dichloride,
di(m-chlorophenyl)methylene(3-tert-butyl-5-n-butylcyclopentadienyl)(2,7-di-tert-butylfluorenyl)zirconium dichloride,
di(m-chlorophenyl)methylene(3-tert-butyl-5-n-butylcyclopentadienyl)(3,6-di-tert-butylfluorenyl)zirconium dichloride,
di(m-chlorophenyl)methylene(3-tert-butyl-5-n-butylcyclopentadienyl)(3,6-di-tert-butyl-2,7-dimethylfluorenyl)zirconium dichloride,
di(m-chlorophenyl)methylene(3-tert-butyl-5-n-butylcyclopentadienyl)(2,7-dimethylfluorenyl)zirconium dichloride,
di(m-chlorophenyl)methylene(3-tert-butyl-5-n-butylcyclopentadienyl)(2,7-diphenylfluorenyl)zirconium dichloride,
di(m-chlorophenyl)methylene(3-tert-butyl-5-n-butylcyclopentadienyl)(2,7-dimesitylfluorenyl)zirconium dichloride,
di(m-chlorophenyl)methylene(3-tert-butyl-5-n-butylcyclopentadienyl)(octamethyloctahydrodibenzofluorenyl)zirconium dichloride,
di(m-chlorophenyl)methylene(3-tert-butyl-5-n-butylcyclopentadienyl)(1,1,3,6,8,8-hexamethyl-1H,8H-dicyclopenta[b,h]fluorenyl)zirconium dichloride,
di(m-chlorophenyl)methylene(3-tert-butyl-5-n-butylcyclopentadienyl)(3,6-di-tert-butyl-2,7-mesitylfluorenyl)zirconium dichloride,
di(m-chlorophenyl)methylene(3-tert-butyl-5-n-butylcyclopentadienyl)(2,3,6,7-tetramethylfluorenyl)zirconium dichloride,
di(m-chlorophenyl)methylene(3-tert-butyl-5-n-butylcyclopentadienyl)(2,3,6,7-tetra-tert-butylfluorenyl)zirconium dichloride,
di(m-trifluoromethylphenyl)methylene(3-tert-butyl-5-n-butylcyclopentadienyl)(fluorenyl)zirconium dichloride,
di(m-trifluoromethylphenyl)methylene(3-tert-butyl-5-n-butylcyclopentadienyl)(2,7-di-tert-butylfluorenyl)zirconium dichloride,
di(m-trifluoromethylphenyl)methylene(3-tert-butyl-5-n-butylcyclopentadienyl)(3,6-di-tert-butylfluorenyl)zirconium dichloride,
di(m-trifluoromethylphenyl)methylene(3-tert-butyl-5-n-butylcyclopentadienyl)(3,6-di-tert-butyl-2,7-dimethylfluorenyl)zirconium dichloride,
di(m-trifluoromethylphenyl)methylene(3-tert-butyl-5-n-butylcyclopentadienyl)(2,7-dimethylfluorenyl)zirconium dichloride, di(m-trifluoromethylphenyl)methylene(3-tert-butyl-5-n-butylcyclopentadienyl)(2,7-diphenylfluorenyl)zirconium dichloride,
di(m-trifluoromethylphenyl)methylene(3-tert-butyl-5-n-butylcyclopentadienyl)(2,7-dimesitylfluorenyl)zirconium dichloride,
di(m-trifluoromethylphenyl)methylene(3-tert-butyl-5-n-butylcyclopentadienyl)(octamethyloctahydrodibenzofluorenyl)zirconium dichloride,
di(m-trifluoromethylphenyl)methylene(3-tert-butyl-5-n-butylcyclopentadienyl)(1,1,3,6,8,8-hexamethyl-1H,8H-dicyclopenta[b,h]fluorenyl)zirconium dichloride,
di(m-trifluoromethylphenyl)methylene(3-tert-butyl-5-n-butylcyclopentadienyl)(3,6-di-tert-butyl-2,7-mesitylfluorenyl)zirconium dichloride,
di(m-trifluoromethylphenyl)methylene(3-tert-butyl-5-n-butylcyclopentadienyl)(2,3,6,7-tetramethylfluorenyl)zirconium dichloride,
di(m-trifluoromethylphenyl)methylene(3-tert-butyl-5-n-butylcyclopentadienyl)(2,3,6,7-tetra-tert-butylfluorenyl)zirconium dichloride,
di(p-trifluoromethylphenyl)methylene(3-tert-butyl-5-n-butylcyclopentadienyl)(fluorenyl)zirconium dichloride,
di(p-trifluoromethylphenyl)methylene(3-tert-butyl-5-n-butylcyclopentadienyl)(2,7-di-tert-butylfluorenyl)zirconium dichloride,
di(p-trifluoromethylphenyl)methylene(3-tert-butyl-5-n-butylcyclopentadienyl)(3,6-di-tert-butylfluorenyl)zirconium dichloride,
di(p-trifluoromethylphenyl)methylene(3-tert-butyl-5-n-butylcyclopentadienyl)(3,6-di-tert-butyl-2,7-dimethylfluorenyl)zirconium dichloride,
di(p-trifluoromethylphenyl)methylene(3-tert-butyl-5-n-butylcyclopentadienyl)(2,7-dimethylfluorenyl)zirconium dichloride,
di(p-trifluoromethylphenyl)methylene(3-tert-butyl-5-n-butylcyclopentadienyl)(2,7-diphenylfluorenyl)zirconium dichloride,
di(p-trifluoromethylphenyl)methylene(3-tert-butyl-5-n-butylcyclopentadienyl)(2,7-dimesitylfluorenyl)zirconium dichloride,
di(p-trifluoromethylphenyl)methylene(3-tert-butyl-5-n-butylcyclopentadienyl)(octamethyloctahydrodibenzofluorenyl)zirconium dichloride,
di(p-trifluoromethylphenyl)methylene(3-tert-butyl-5-n-butylcyclopentadienyl)(1,1,3,6,8,8-hexamethyl-1H,8H-dicyclopenta[b,h]fluorenyl)zirconium dichloride,
di(p-trifluoromethylphenyl)methylene(3-tert-butyl-5-n-butylcyclopentadienyl)(3,6-di-tert-butyl-2,7-mesitylfluorenyl)zirconium dichloride,
di(p-trifluoromethylphenyl)methylene(3-tert-butyl-5-n-butylcyclopentadienyl)(2,3,6,7-tetramethylfluorenyl)zirconium dichloride,
di(p-trifluoromethylphenyl)methylene(3-tert-butyl-5-n-butylcyclopentadienyl)(2,3,6,7-tetra-tert-butylfluorenyl)zirconium dichloride,
di(p-tolyl)methylene(3-tert-butyl-5-n-butylcyclopentadienyl)(fluorenyl)zirconium dichloride,
di(p-tolyl)methylene(3-tert-butyl-5-n-butylcyclopentadienyl)(2,7-di-tert-butylfluorenyl)zirconium dichloride,
di(p-tolyl)methylene(3-tert-butyl-5-n-butylcyclopentadienyl)(3,6-di-tert-butylfluorenyl)zirconium dichloride,
di(p-tolyl)methylene(3-tert-butyl-5-n-butylcyclopentadienyl)(3,6-di-tert-butyl-2,7-dimethylfluorenyl)zirconium dichloride,
di(p-tolyl)methylene(3-tert-butyl-5-n-butylcyclopentadienyl)(2,7-dimethylfluorenyl)zirconium dichloride,
di(p-tolyl)methylene(3-tert-butyl-5-n-butylcyclopentadienyl)(2,7-diphenylfluorenyl)zirconium dichloride,
di(p-tolyl)methylene(3-tert-butyl-5-n-butylcyclopentadienyl)(2,7-dimesitylfluorenyl)zirconium dichloride,
di(p-tolyl)methylene(3-tert-butyl-5-n-butylcyclopentadienyl)(octamethyloctahydrodibenzofluorenyl)zirconium dichloride,
di(p-tolyl)methylene(3-tert-butyl-5-n-butylcyclopentadienyl)(1,1,3,6,8,8-hexamethyl-1H,8H-dicyclopenta[b,h]fluorenyl)zirconium dichloride,
di(p-tolyl)methylene(3-tert-butyl-5-n-butylcyclopentadienyl)(3,6-di-tert-butyl-2,7-mesitylfluorenyl)zirconium dichloride,
di(p-tolyl)methylene(3-tert-butyl-5-n-butylcyclopentadienyl)(2,3,6,7-tetramethylfluorenyl)zirconium dichloride,
di(p-tolyl)methylene(3-tert-butyl-5-n-butylcyclopentadienyl)(2,3,6,7-tetra-tert-butylfluorenyl)zirconium dichloride,
dimethylmethylene(3-tert-butyl-5-methylcyclopentadienyl)(3,6-di-tert-butyl-2,7-dimethylfluorenyl)zirconium dichloride,
dimethylmethylene(3-tert-butyl-5-methylcyclopentadienyl)(octamethyloctahydrodibenzofluorenyl)zirconium dichloride,
dimethylmethylene(3-tert-butyl-5-methylcyclopentadienyl)(1,1,3,6,8,8-hexamethyl-1H,8H-dicyclopenta[b,h]fluorenyl)zirconium dichloride,
dimethylmethylene(3-tert-butyl-5-methylcyclopentadienyl)(2,3,6,7-tetramethylfluorenyl)zirconium dichloride,
dimethylmethylene(3-tert-butyl-5-methylcyclopentadienyl)(3,6-di-tert-butyl-2,7-diphenylfluorenyl)zirconium dichloride,
dimethylmethylene(3-tert-butyl-5-methylcyclopentadienyl)(3,6-di-tert-butyl-2,7-mesitylfluorenyl)zirconium dichloride,
diphenylmethylene(3-tert-butyl-5-methylcyclopentadienyl)(3,6-di-tert-butyl-2,7-dimethylfluorenyl)zirconium dichloride,
diphenylmethylene(3-tert-butyl-5-methylcyclopentadienyl)(octamethyloctahydrodibenzofluorenyl)zirconium dichloride,
diphenylmethylene(3-tert-butyl-5-methylcyclopentadienyl)(1,1,3,6,8,8-hexamethyl-1H,8H-dicyclopenta[b,h]fluorenyl)zirconium dichloride,
diphenylmethylene(3-tert-butyl-5-methylcyclopentadienyl)(2,3,6,7-tetramethylfluorenyl)zirconium dichloride,
diphenylmethylene(3-tert-butyl-5-methylcyclopentadienyl)(3,6-di-tert-butyl-2,7-diphenylfluorenyl)zirconium dichloride,
diphenylmethylene(3-tert-butyl-5-methylcyclopentadienyl)(3,6-di-tert-butyl-2,7-mesitylfluorenyl)zirconium dichloride,
(methyl)(phenyl)methylene(3-tert-butyl-5-methylcyclopentadienyl)(3,6-di-tert-butyl-2,7-dimethylfluorenyl)zirconium dichloride,
(methyl)(phenyl)methylene(3-tert-butyl-5-methylcyclopentadienyl)(octamethyloctahydrodibenzofluorenyl)zirconium dichloride,
(methyl)(phenyl)methylene(3-tert-butyl-5-methylcyclopentadienyl)(1,1,3,6,8,8-hexamethyl-1H,8H-dicyclopenta[b,h]fluorenyl)zirconium dichloride,
(methyl)(phenyl)methylene(3-tert-butyl-5-methylcyclopentadienyl)(2,3,6,7-tetramethylfluorenyl)zirconium dichloride,
(methyl)(phenyl)methylene(3-tert-butyl-5-methylcyclopentadienyl)(3,6-di-tert-butyl-2,7-diphenylfluorenyl)zirconium dichloride, (methyl)(phenyl)methylene(3-tert-butyl-5-methylcyclopentadienyl)(3,6-di-tert-butyl-2,7-mesitylfluorenyl)zirconium dichloride,
(methyl)(p-tolyl)methylene(3-tert-butyl-5-methylcyclopentadienyl)(3,6-di-tert-butyl-2,7-dimethylfluorenyl)zirconium dichloride,
(methyl)(p-tolyl)methylene(3-tert-butyl-5-methylcyclopentadienyl)(octamethyloctahydrodibenzofluorenyl)zirconium dichloride,
(methyl)(p-tolyl)methylene(3-tert-butyl-5-methylcyclopentadienyl)(1,1,3,6,8,8-hexamethyl-1H,8H-dicyclopenta[b,h]fluorenyl)zirconium dichloride,
(methyl)(p-tolyl)methylene(3-tert-butyl-5-methylcyclopentadienyl)(2,3,6,7-tetramethylfluorenyl)zirconium dichloride,
(methyl)(p-tolyl)methylene(3-tert-butyl-5-methylcyclopentadienyl)(3,6-di-tert-butyl-2,7-diphenylfluorenyl)zirconium dichloride,
(methyl)(p-tolyl)methylene(3-tert-butyl-5-methylcyclopentadienyl)(3,6-di-tert-butyl-2,7-mesitylfluorenyl)zirconium dichloride,
(methyl)(2-naphthyl)methylene(3-tert-butyl-5-methylcyclopentadienyl)(3,6-di-tert-butyl-2,7-dimethylfluorenyl)zirconium dichloride,
(methyl)(2-naphthyl)methylene(3-tert-butyl-5-methylcyclopentadienyl)(octamethyloctahydrodibenzofluorenyl)zirconium dichloride,
(methyl)(2-naphthyl)methylene(3-tert-butyl-5-methylcyclopentadienyl)(1,1,3,6,8,8-hexamethyl-1H,8H-dicyclopenta[b,h]fluorenyl)zirconium dichloride,
(methyl)(2-naphthyl)methylene(3-tert-butyl-5-methylcyclopentadienyl)(2,3,6,7-tetramethylfluorenyl)zirconium dichloride,
(methyl)(2-naphthyl)methylene(3-tert-butyl-5-methylcyclopentadienyl)(3,6-di-tert-butyl-2,7-diphenylfluorenyl)zirconium dichloride,
(methyl)(2-naphthyl)methylene(3-tert-butyl-5-methylcyclopentadienyl)(3,6-di-tert-butyl-2,7-mesitylfluorenyl)zirconium dichloride,
(ethyl)(phenyl)methylene(3-tert-butyl-5-methylcyclopentadienyl)(3,6-di-tert-butyl-2,7-dimethylfluorenyl)zirconium dichloride,
(ethyl)(phenyl)methylene(3-tert-butyl-5-methylcyclopentadienyl)(octamethyloctahydrodibenzofluorenyl)zirconium dichloride,
(ethyl)(phenyl)methylene(3-tert-butyl-5-methylcyclopentadienyl)(1,1,3,6,8,8-hexamethyl-1H,8H-dicyclopenta[b,h]fluorenyl)zirconium dichloride,
(ethyl)(phenyl)methylene(3-tert-butyl-5-methylcyclopentadienyl)(2,3,6,7-tetramethylfluorenyl)zirconium dichloride,
(ethyl)(phenyl)methylene(3-tert-butyl-5-methylcyclopentadienyl)(3,6-di-tert-butyl-2,7-diphenylfluorenyl)zirconium dichloride,
(ethyl)(phenyl)methylene(3-tert-butyl-5-methylcyclopentadienyl)(3,6-di-tert-butyl-2,7-mesitylfluorenyl)zirconium dichloride,
(methyl)(p-trifluoromethyl)methylene(3-tert-butyl-5-methylcyclopentadienyl)(3,6-di-tert-butyl-2,7-dimethylfluorenyl)zirconium dichloride,
(methyl)(p-trifluoromethyl)methylene(3-tert-butyl-5-methylcyclopentadienyl)(octamethyloctahydrodibenzofluorenyl)zirconium dichloride,
(methyl)(p-trifluoromethyl)methylene(3-tert-butyl-5-methylcyclopentadienyl)(1,1,3,6,8,8-hexamethyl-1H,8H-dicyclopenta[b,h]fluorenyl)zirconium dichloride,
(methyl)(p-trifluoromethyl)methylene(3-tert-butyl-5-methylcyclopentadienyl)(2,3,6,7-tetramethylfluorenyl)zirconium dichloride,
(methyl)(p-trifluoromethyl)methylene(3-tert-butyl-5-methylcyclopentadienyl)(3,6-di-tert-butyl-2,7-diphenylfluorenyl)zirconium dichloride,
(methyl)(p-trifluoromethyl)methylene(3-tert-butyl-5-methylcyclopentadienyl)(3,6-di-tert-butyl-2,7-mesitylfluorenyl)zirconium dichloride,
dimethylmethylene(3-(1-methylcyclohexyl)-5-methylcyclopentadienyl)(3,6-di-tert-butyl-2,7-dimethylfluorenyl)zirconium dichloride,
dimethylmethylene(3-(1-methylcyclohexyl)-5-methylcyclopentadienyl)(octamethyloctahydrodibenzofluorenyl)zirconium dichloride,
dimethylmethylene(3-(1-methylcyclohexyl)-5-methylcyclopentadienyl)(1,1,3,6,8,8-hexamethyl-1H,8H-dicyclopenta[b,h]fluorenyl)zirconium dichloride,
dimethylmethylene(3-(1-methylcyclohexyl)-5-methylcyclopentadienyl) 2,3,6,7-tetramethylfluorenyl)zirconium dichloride,
dimethylmethylene(3-(1-methylcyclohexyl)-5-methylcyclopentadienyl)(3,6-di-tert-butyl-2,7-diphenylfluorenyl)zirconium dichloride,
dimethylmethylene(3-(1-methylcyclohexyl)-5-methylcyclopentadienyl)(3,6-di-tert-butyl-2,7-mesitylfluorenyl)zirconium dichloride,
diphenylmethylene(3-(1-methylcyclohexyl)-5-methylcyclopentadienyl)(3,6-di-tert-butyl-2,7-dimethylfluorenyl)zirconium dichloride,
diphenylmethylene(3-(1-methylcyclohexyl)-5-methylcyclopentadienyl)(octamethyloctahydrodibenzofluorenyl)zirconium dichloride,
diphenylmethylene(3-(1-methylcyclohexyl)-5-methylcyclopentadienyl)(1,1,3,6,8,8-hexamethyl-1H,8H-dicyclopenta[b,h]fluorenyl)zirconium dichloride,
diphenylmethylene(3-(1-methylcyclohexyl)-5-methylcyclopentadienyl)(2,3,6,7-tetramethylfluorenyl)zirconium dichloride,
diphenylmethylene(3-(1-methylcyclohexyl)-5-methylcyclopentadienyl)(3,6-di-tert-butyl-2,7-diphenylfluorenyl)zirconium dichloride
diphenylmethylene(3-(1-methylcyclohexyl)-5-methylcyclopentadienyl)(3,6-di-tert-butyl-2,7-mesitylfluorenyl)zirconium dichloride,
(methyl)(phenyl)methylene(3-(1-methylcyclohexyl)-5-methylcyclopentadienyl)(3,6-di-tert-butyl-2,7-dimethylfluorenyl)zirconium dichloride,
(methyl)(phenyl)methylene(3-(1-methylcyclohexyl)-5-methylcyclopentadienyl)(octamethyloctahydrodibenzofluorenyl)zirconium dichloride,
(methyl)(phenyl)methylene(3-(1-methylcyclohexyl)-5-methylcyclopentadienyl)(1,1,3,6,8,8-hexamethyl-1H,8H-dicyclopenta[b,h]fluorenyl)zirconium dichloride,
(methyl)(phenyl)methylene(3-(1-methylcyclohexyl)-5-methylcyclopentadienyl)(2,3,6,7-tetramethylfluorenyl)zirconium dichloride,
(methyl)(phenyl)methylene(3-(1-methylcyclohexyl)-5-methylcyclopentadienyl)(3,6-di-tert-butyl-2,7-diphenylfluorenyl)zirconium dichloride,
(methyl)(phenyl)methylene(3-(1-methylcyclohexyl)-5-methylcyclopentadienyl)(3,6-di-tert-butyl-2,7-mesitylfluorenyl)zirconium dichloride,
(methyl)(p-tolyl)methylene(3-(1-methylcyclohexyl)-5-methylcyclopentadienyl)(3,6-di-tert-butyl-2,7-dimethylfluorenyl)zirconium dichloride, (methyl)(p-tolyl)methylene(3-(1-methylcyclohexyl)-5-methylcyclopentadienyl)(octamethyloctahydrodibenzofluorenyl)zirconium dichloride,
(methyl)(p-tolyl)methylene(3-(1-methylcyclohexyl)-5-methylcyclopentadienyl)(1,1,3,6,8,8-hexamethyl-1H,8H-dicyclopenta[b,h]fluorenyl)zirconium dichloride,
(methyl)(p-tolyl)methylene(3-(1-methylcyclohexyl)-5-methylcyclopentadienyl)(2,3,6,7-tetramethylfluorenyl)zirconium dichloride,
(methyl)(p-tolyl)methylene(3-(1-methylcyclohexyl)-5-methylcyclopentadienyl)(3,6-di-tert-butyl-2,7-diphenylfluorenyl)zirconium dichloride,
(methyl)(p-tolyl)methylene(3-(1-methylcyclohexyl)-5-methylcyclopentadienyl)(3,6-di-tert-butyl-2,7-mesitylfluorenyl)zirconium dichloride,
(methyl)(2-naphthyl)methylene(3-(1-methylcyclohexyl)-5-methylcyclopentadienyl)(3,6-di-tert-butyl-2,7-dimethylfluorenyl)zirconium dichloride,
(methyl)(2-naphthyl)methylene(3-(1-methylcyclohexyl)-5-methylcyclopentadienyl)(octamethyloctahydrodibenzofluorenyl)zirconium dichloride,
(methyl)(2-naphthyl)methylene(3-(1-methylcyclohexyl)-5-methylcyclopentadienyl)(1,1,3,6,8,8-hexamethyl-1H,8H-dicyclopenta[b,h]fluorenyl)zirconium dichloride,
(methyl)(2-naphthyl)methylene(3-(1-methylcyclohexyl)-5-methylcyclopentadienyl)(2,3,6,7-tetramethylfluorenyl)zirconium dichloride,
(methyl)(2-naphthyl)methylene(3-(1-methylcyclohexyl)-5-methylcyclopentadienyl)(3,6-di-tert-butyl-2,7-diphenylfluorenyl)zirconium dichloride,
(methyl)(2-naphthyl)methylene(3-(1-methylcyclohexyl)-5-methylcyclopentadienyl)(3,6-di-tert-butyl-2,7-mesitylfluorenyl)zirconium dichloride,
(ethyl)(phenyl)methylene(3-(1-methylcyclohexyl)-5-methylcyclopentadienyl)(3,6-di-tert-butyl-2,7-dimethylfluorenyl)zirconium dichloride,
(ethyl)(phenyl)methylene(3-(1-methylcyclohexyl)-5-methylcyclopentadienyl)(octamethyloctahydrodibenzofluorenyl)zirconium dichloride,
(ethyl)(phenyl)methylene(3-(1-methylcyclohexyl)-5-methylcyclopentadienyl)(1,1,3,6,8,8-hexamethyl-1H,8H-dicyclopenta[b,h]fluorenyl)zirconium dichloride,
(ethyl)(phenyl)methylene(3-(1-methylcyclohexyl)-5-methylcyclopentadienyl)(2,3,6,7-tetramethylfluorenyl)zirconium dichloride,
(ethyl)(phenyl)methylene(3-(1-methylcyclohexyl)-5-methylcyclopentadienyl)(3,6-di-tert-butyl-2,7-diphenylfluorenyl)zirconium dichloride,
(ethyl)(phenyl)methylene(3-(1-methylcyclohexyl)-5-methylcyclopentadienyl)(3,6-di-tert-butyl-2,7-mesitylfluorenyl)zirconium dichloride,
(methyl)(p-trifluoromethyl)methylene(3-(1-methylcyclohexyl)-5-methylcyclopentadienyl)(3,6-di-tert-butyl-2,7-dimethylfluorenyl)zirconium dichloride,
(methyl)(p-trifluoromethyl)methylene(3-(1-methylcyclohexyl)-5-methylcyclopentadienyl)(octamethyloctahydrodibenzofluorenyl)zirconium dichloride,
(methyl)(p-trifluoromethyl)methylene(3-(1-methylcyclohexyl)-5-methylcyclopentadienyl)(1,1,3,6,8,8-hexamethyl-1H,8H-dicyclopenta[b,h]fluorenyl)zirconium dichloride,
(methyl)(p-trifluoromethyl)methylene(3-(1-methylcyclohexyl)-5-methylcyclopentadienyl)(2,3,6,7-tetramethylfluorenyl)zirconium dichloride,
(methyl)(p-trifluoromethyl)methylene(3-(1-methylcyclohexyl)-5-methylcyclopentadienyl)(3,6-di-tert-butyl-2,7-diphenylfluorenyl)zirconium dichloride,
(methyl)(p-trifluoromethyl)methylene(3-(1-methylcyclohexyl)-5-methylcyclopentadienyl)(3,6-di-tert-butyl-2,7-mesitylfluorenyl)zirconium dichloride,
dimethylmethylene(3-(2-methyl-2-adamantyl)-5-methylcyclopentadienyl)(3,6-di-tert-butyl-2,7-dimethylfluorenyl)zirconium dichloride,
dimethylmethylene(3-(2-methyl-2-adamantyl)-5-methylcyclopentadienyl)(octamethyloctahydrodibenzofluorenyl)zirconium dichloride,
dimethylmethylene(3-(2-methyl-2-adamantyl)-5-methylcyclopentadienyl)(1,1,3,6,8,8-hexamethyl-1H,8H-dicyclopenta[b,h]fluorenyl)zirconium dichloride,
dimethylmethylene(3-(2-methyl-2-adamantyl)-5-methylcyclopentadienyl)(2,3,6,7-tetramethylfluorenyl)zirconium dichloride,
dimethylmethylene(3-(2-methyl-2-adamantyl)-5-methylcyclopentadienyl)(3,6-di-tert-butyl-2,7-diphenylfluorenyl)zirconium dichloride,
dimethylmethylene(3-(2-methyl-2-adamantyl)-5-methylcyclopentadienyl)(3,6-di-tert-butyl-2,7-mesitylfluorenyl)zirconium dichloride,
diphenylmethylene(3-(2-methyl-2-adamantyl)-5-methylcyclopentadienyl)(3,6-di-tert-butyl-2,7-dimethylfluorenyl)zirconium dichloride,
diphenylmethylene(3-(2-methyl-2-adamantyl)-5-methylcyclopentadienyl)(octamethyloctahydrodibenzofluorenyl)zirconium dichloride,
diphenylmethylene(3-(2-methyl-2-adamantyl)-5-methylcyclopentadienyl)(1,1,3,6,8,8-hexamethyl-1H,8H-dicyclopenta[b,h]fluorenyl)zirconium dichloride,
diphenylmethylene(3-(2-methyl-2-adamantyl)-5-methylcyclopentadienyl)(2,3,6,7-tetramethylfluorenyl)zirconium dichloride,
diphenylmethylene(3-(2-methyl-2-adamantyl)-5-methylcyclopentadienyl)(3,6-di-tert-butyl-2,7-diphenylfluorenyl)zirconium dichloride,
diphenylmethylene(3-(2-methyl-2-adamantyl)-5-methylcyclopentadienyl)(3,6-di-tert-butyl-2,7-mesitylfluorenyl)zirconium dichloride,
(methyl)(phenyl)methylene(3-(2-methyl-2-adamantyl)-5-methylcyclopentadienyl)(3,6-di-tert-butyl-2,7-dimethylfluorenyl)zirconium dichloride,
(methyl)(phenyl)methylene(3-(2-methyl-2-adamantyl)-5-methylcyclopentadienyl)(octamethyloctahydrodibenzofluorenyl)zirconium dichloride,
(methyl)(phenyl)methylene(3-(2-methyl-2-adamantyl)-5-methylcyclopentadienyl)(1,1,3,6,8,8-hexamethyl-1H,8H-dicyclopenta[b,h]fluorenyl)zirconium dichloride,
(methyl)(phenyl)methylene(3-(2-methyl-2-adamantyl)-5-methylcyclopentadienyl)(2,3,6,7-tetramethylfluorenyl)zirconium dichloride,
(methyl)(phenyl)methylene(3-(2-methyl-2-adamantyl)-5-methylcyclopentadienyl)(3,6-di-tert-butyl-2,7-diphenylfluorenyl)zirconium dichloride,
(methyl)(phenyl)methylene(3-(2-methyl-2-adamantyl)-5-methylcyclopentadienyl)(3,6-di-tert-butyl-2,7-mesitylfluorenyl)zirconium dichloride,
(methyl)(p-tolyl)methylene(3-(2-methyl-2-adamantyl)-5-methyl cyclopentadienyl)(3,6-di-tert-butyl-2,7-dimethylfluorenyl)zirconium dichloride,
(methyl)(p-tolyl)methylene(3-(2-methyl-2-adamantyl)-5-methylcyclopentadienyl)(octamethyloctahydrodibenzofluorenyl)zirconium dichloride,
(methyl)(p-tolyl)methylene(3-(2-methyl-2-adamantyl)-5-methylcyclopentadienyl)(1,1,3,6,8,8-hexamethyl-1H,8H-dicyclopenta[b,h]fluorenyl)zirconium dichloride, (methyl)(p-tolyl)methylene(3-(2-methyl-2-adamantyl)-5-methylcyclopentadienyl)(2,3,6,7-tetramethylfluorenyl)zirconium dichloride,
(methyl)(p-tolyl)methylene(3-(2-methyl-2-adamantyl)-5-methylcyclopentadienyl)(3,6-di-tert-butyl-2,7-diphenylfluorenyl)zirconium dichloride,
(methyl)(p-tolyl)methylene(3-(2-methyl-2-adamantyl)-5-methylcyclopentadienyl)(3,6-di-tert-butyl-2,7-mesitylfluorenyl)zirconium dichloride,
(methyl)(2-naphthyl)methylene(3-(2-methyl-2-adamantyl)-5-methylcyclopentadienyl)(3,6-di-tert-butyl-2,7-dimethylfluorenyl)zirconium dichloride,
(methyl)(2-naphthyl)methylene(3-(2-methyl-2-adamantyl)-5-methylcyclopentadienyl)(octamethyloctahydrodibenzofluorenyl)zirconium dichloride,
(methyl)(2-naphthyl)methylene(3-(2-methyl-2-adamantyl)-5-methylcyclopentadienyl)(1,1,3,6,8,8-hexamethyl-1H,8H-dicyclopenta[b,h]fluorenyl)zirconium dichloride,
(methyl)(2-naphthyl)methylene(3-(2-methyl-2-adamantyl)-5-methylcyclopentadienyl)(2,3,6,7-tetramethylfluorenyl)zirconium dichloride,
(methyl)(2-naphthyl)methylene(3-(2-methyl-2-adamantyl)-5-methylcyclopentadienyl)(3,6-di-tert-butyl-2,7-diphenylfluorenyl)zirconium dichloride,
(methyl)(2-naphthyl)methylene(3-(2-methyl-2-adamantyl)-5-methylcyclopentadienyl)(3,6-di-tert-butyl-2,7-mesitylfluorenyl)zirconium dichloride,
(ethyl)(phenyl)methylene(3-(2-methyl-2-adamantyl)-5-methylcyclopentadienyl)(3,6-di-tert-butyl-2,7-dimethylfluorenyl)zirconium dichloride,
(ethyl)(phenyl)methylene(3-(2-methyl-2-adamantyl)-5-methylcyclopentadienyl)(octamethyloctahydrodibenzofluorenyl)zirconium dichloride,
(ethyl)(phenyl)methylene(3-(2-methyl-2-adamantyl)-5-methylcyclopentadienyl)(1,1,3,6,8,8-hexamethyl-1H,8H-dicyclopenta[b,h]fluorenyl)zirconium dichloride,
(ethyl)(phenyl)methylene(3-(2-methyl-2-adamantyl)-5-methylcyclopentadienyl)(2,3,6,7-tetramethylfluorenyl)zirconium dichloride,
(ethyl)(phenyl)methylene(3-(2-methyl-2-adamantyl)-5-methylcyclopentadienyl)(3,6-di-tert-butyl-2,7-diphenylfluorenyl)zirconium dichloride,
(ethyl)(phenyl)methylene(3-(2-methyl-2-adamantyl)-5-methylcyclopentadienyl)(3,6-di-tert-butyl-2,7-mesitylfluorenyl)zirconium dichloride,
(methyl)(p-trifluoromethyl)methylene(3-(2-methyl-2-adamantyl)-5-methylcyclopentadienyl)(3,6-di-tert-butyl-2,7-dimethylfluorenyl)zirconium dichloride,
(methyl)(p-trifluoromethyl)methylene(3-(2-methyl-2-adamantyl)-5-methylcyclopentadienyl)(octamethyloctahydrodibenzofluorenyl)zirconium dichloride,
(methyl)(p-trifluoromethyl)methylene(3-(2-methyl-2-adamantyl)-5-methylcyclopentadienyl)(1,1,3,6,8,8-hexamethyl-1H,8H-dicyclopenta[b,h]fluorenyl)zirconium dichloride,
(methyl)(p-trifluoromethyl)methylene(3-(2-methyl-2-adamantyl)-5-methylcyclopentadienyl)(2,3,6,7-tetramethylfluorenyl)zirconium dichloride,
(methyl)(p-trifluoromethyl)methylene(3-(2-methyl-2-adamantyl)-5-methylcyclopentadienyl)(3,6-di-tert-butyl-2,7-diphenylfluorenyl)zirconium dichloride,
(methyl)(p-trifluoromethyl)methylene(3-(2-methyl-2-adamantyl)-5-methylcyclopentadienyl)(3,6-di-tert-butyl-2,7-mesitylfluorenyl)zirconium dichloride, and the like. (In the compounds listed above, "octamethyloctahydrofluorene" is an abbreviated name of "1,1,4,4,7,7,10,10-octamethyloctahydrodibenzo[b,h]fluorene".)

Examples of bridged metallocene compound (a2) also include compounds in which zirconium in the above compounds is replaced by hafnium or titanium and metallocene compounds in which dichloride in the above compounds is replaced by difluoride, dibromide, diiodide, dimethyl, or methylethyl.

The bridged metallocene compound (a2) may be produced by a publicly-known method and the production method is not especially limited. Such publicly-known production method includes, for example, the method in Pamphlet of WO 2001/27124 and Pamphlet of WO 2004/087775 by the present applicant.

The bridged metallocene compounds (a2) as described above may be used alone or in combination of two or more.

As the organoaluminoxy compound (b-1), the compound (b-2) that reacts with the bridged metallocene compound (a2) to form an ion-pair, and the organoaluminum compound (b-3), there may be used, for example, such compounds described in Pamphlet of WO 2004/087775.

The propylene/ethylene/α-olefin copolymer (B) may be produced by using the transition metal compound (a1) or the bridged metallocene compound (a2) (hereinafter, these are collectively referred to as "component (a)") together with, for example, one or more compounds (b) selected from the organoaluminoxy compound (b-1), the compound (b-2) that reacts with the component (a) to forms an ion-pair, and the organoaluminum compound (b-3).

The polymerization temperature of olefins using the component (a) is in the range of typically −50 to +200° C., preferably 0 to 200° C., more preferably 40 to 180° C., and still more preferably 40 to 150° C. The polymerization pressure is typically atmospheric pressure to 10 MPa (gauge pressure), and preferably atmospheric pressure to 5 MPa (gauge pressure). The polymerization may be carried out in any of batch-wise, semi-continuous, and continuous processes. It is possible to conduct the polymerization in two or more stages under different reaction conditions.

The molecular weight of the resulting olefin-based polymer can be adjusted by adding hydrogen in the polymerization system or changing the polymerization temperature. The molecular weight can be also adjusted by changing the amount of the component (b) to be used. When hydrogen is added, the volume is suitably approximately 0.001 to 100 NL per kg of the olefin.

A preferred embodiment of solution polymerization involving component (a) is as follows. A solvent is usually used in the solution polymerization. Such a solvent used in the solution polymerization is typically an inert hydrocarbon solvent, preferably a saturated hydrocarbon having a boiling point of 50° C. to 200° C. under atmospheric pressure, which is specifically exemplified by aliphatic hydrocarbons such as pentane, hexane, heptane, octane, decane, dodecane, and kerosene; and alicyclic hydrocarbons such as cyclopentane, cyclohexane, and methylcyclopentane. Here, the "inert hydrocarbon solvent" also includes aromatic hydrocarbons such as benzene, toluene, and xylene and halogenohydrocarbon such as ethylene chloride, chlorobenzene, and dichloromethane, and use of these solvents are not necessarily limited.

In the solution polymerization, the component (a) is used in an amount of typically $10^{-9}$ to $10^{-1}$ moles and preferably $10^{-8}$ to $10^{-2}$ moles per liter of the reaction volume.

The component (b-1) is used in such an amount that the molar ratio ((b-1)/M) of the component (b-1) to the total of the transition metal atom (M) in the component (a) becomes typically 0.01 to 5,000 and preferably 0.05 to 2,000. The component (b-2) is used in such an amount that the molar ratio ((b-2)/M) of aluminum atom in the component (b-2) to the total of the transition metal (M) in the component (a) becomes typically 1 to 5,000 and preferably 5 to 1,000. The component (b-3) is used in such an amount that the molar ratio ((b-3)/M) of the component (b-3) to the total of the transition metal atom (M) in the component (a) becomes typically 0.01 to 10,000 and preferably 0.05 to 5,000.

The hydrocarbon solvent is usually used in the solution polymerization, however, the α-olefin may serve as a solvent. The copolymerization may be performed by either a batchwise process or a continuous process. In the case of a batch process, the concentration of the metallocene compound in the polymerization system is typically 0.00005 to 1 mmol and preferably 0.0001 to 0.50 mmol per liter of polymerization volume.

The reaction time (average retention time in the case of a continuous method), which varies depending on the conditions such as the catalyst concentration and polymerization temperature, is typically 5 minutes to 3 hours and preferably approximately 10 minutes to 1.5 hours.

(C) Ethylene/α-Olefin Random Copolymer

The ethylene/α-olefin random copolymer (C), which may be used in the present invention, is desirably an ethylene/α-olefin copolymer containing 50 to 99 mol % of constitutional units derived from ethylene and 1 to 50 mol % of constitutional units derived from an α-olefin having 3 to 20 carbon atoms (provided that the total of ethylene and α-olefin is 100 mol %).

Preferably, the ethylene/α-olefin random copolymer (C) contains 55 to 99 mol % of constitutional units derived from ethylene and 1 to 45 mol % of constitutional units derived from an α-olefin having 3 to 20 carbon atoms other than ethylene (provided that the total of ethylene and α-olefin is 100 mol %) and has a density of 850 to 920 kg/m$^3$ and an MFR (ASTM D1238, 190° C., load of 2.16 kg) of 0.1 to 20 g/10 min.

More preferably, the ethylene/α-olefin random copolymer (C) contains 80 to 99 mol % of constitutional units derived from ethylene and 1 to 20 mol % of constitutional units derived from an α-olefin having 3 to 20 carbon atoms other than ethylene (provided that the total of ethylene and α-olefin is 100 mol %) and has a density of 870 to 920 kg/m$^3$ and an MFR (ASTM D1238, 190° C., load of 2.16 kg) of 0.1 to 20 g/10 min.

When these properties are in such preferable ranges, it is especially excellent in balance between transparency and impact resistance.

Further preferably, the ethylene/α-olefin random copolymer (C) contains 80 to 95 mol % of constitutional units derived from ethylene and 5 to 20 mol % of constitutional units derived from an α-olefin having 3 to 20 carbon atoms other than ethylene (provided that the total of ethylene and α-olefin is 100 mol %) and has a density of 870 to 900 kg/m$^3$ and an MFR (ASTM D1238, 190° C., load of 2.16 kg) of 0.1 to 20 g/10 min.

Especially preferably, the ethylene/α-olefin random copolymer (C) contains 82 to 92 mol % of constitutional units derived from ethylene and 8 to 18 mol % of constitutional units derived from an α-olefin having 3 to 20 carbon atoms (provided that the total of ethylene and α-olefin is 100 mol %) and has a density of 875 to 900 kg/m$^3$ and an MFR (ASTM D1238, 190° C., load of 2.16 kg) of 0.1 to 10 g/10 min.

In another preferable embodiment of the ethylene-α-olefin random copolymer (C), the content of constitutional units derived from ethylene is more than 90 mol % and not more than 99 mol %, preferably more than 90 mol % and not more than 97 mol %, more preferably not less than 91 mol % and not more than 97 mol %; the density is more than 900 kg/m$^3$ and not more than 920 kg/m$^3$, preferably not less than 901 kg/m$^3$ and not more than 920 kg/m$^3$; and the MFR (ASTM D1238, 190° C., load of 2.16 kg) is 0.1 to 20 g/10 min and preferably 0.1 to 10 g/10 min. When these properties are in such ranges, it is excellent in balance among impact resistance, rigidity, and transparency.

When these properties are in the above preferable ranges, it is especially excellent in balance between transparency and impact resistance.

The α-olefin to be copolymerized with ethylene is an α-olefin having 3 to 20 carbon atoms, and is specifically exemplified by propylene, 1-butene, 1-pentene, 1-hexene, 1-heptene, 1-octene, 1-nonene, 1-decene, 1-undecene, 1-dodecene, 1-hexadodecene, 1-octadecene, 1-nonadecene, 1-eicosene, 4-methyl-1-pentene, and the like. Among them, α-olefins having 3 to 10 carbon atoms are preferred, and α-olefins having 4 to 8 carbon atoms are more preferred. Especially preferable are propylene, 1-butene, 4-methyl-1-pentene, 1-hexene, and 1-octene. Especially, these α-olefins are used alone or in combination of two or more.

The ethylene/α-olefin random copolymer (C) may further contain, in addition to the units described above, units derived from another polymerizable monomer so long as the objectives of the present invention are not impaired.

Examples of such another polymerizable monomer include, for example, vinyl compounds such as styrene, vinylcyclopentene, vinylcyclohexane, and vinylnorbornane; vinyl esters such as vinyl acetate; unsaturated organic acids and derivatives thereof such as maleic anhydride; conjugated dienes such as butadiene, isoprene, pentadiene, and 2,3-dimethylbutadiene; and non-conjugated polyenes such as 1,4-hexadiene, 1,6-octadiene, 2-methyl-1,5-hexadiene, 6-methyl-1,5-heptadiene, 7-methyl-1,6-octadiene, dicyclopentadiene, cyclohexadiene, dicyclooctadiene, methylenenorbornene, 5-vinylnorbornene, 5-ethylidene-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norbornene, and 2-propenyl-2,2-norbornadiene. In one preferred embodiment of the present invention, the ethylene-α-olefin random copolymer (C) contains neither non-conjugated diene nor non-conjugated polyene.

Ethylene/α-olefin random copolymer (C) may contain such additional units derived from another polymerizable monomer in an amount of 10 mol % or less, preferably 5 mol % or less, and more preferably 3 mol % or less, relative to 100 mol % of the total of ethylene and α-olefin.

Examples of the ethylene/α-olefin random copolymer (C) include, specifically, ethylene/propylene random copolymer, ethylene/1-butene random copolymer, ethylene/propylene/1-butene random copolymer, ethylene/propylene/ethylidenenorbornene random copolymer, ethylene/1-butene/1-octene random copolymer, ethylene/4-methyl-1-pentene copolymer, ethylene/1-hexene random copolymer, ethylene/1-octene random copolymer, and the like. Of these, particularly preferably used are ethylene/propylene random copolymer, ethylene/1-butene random copolymer, ethylene/1-hexene random copolymer, ethylene/1-octene random copolymer, and the like. Above all, especially preferably used are ethylene/1-butene random copolymer, ethylene/1-hexene random copolymer, ethylene/1-octene random copolymer, and the like. Two or more of these copolymers may be used in combination.

The crystallinity of the ethylene/α-olefin random copolymer (C), which may be used in the present invention, is typically 40% or less, preferably 0 to 39%, and more preferably 0 to 35%, as measured by X-ray diffractometry.

Use of the component (C) in the present invention particularly improves the balance between impact resistance and transparency.

The ethylene/α-olefin random copolymer (C) can be produced by a conventional known method using a vanadium catalyst, a titanium catalyst, a metallocene catalyst, or the like.

(X) Propylene-Based Polymer Composition

The propylene-based polymer composition (X) of the present invention comprises 40 to 95 parts by weight, preferably 41 to 95 parts by weight, more preferably 55 to 95 parts by weight, and further more preferably 50 to 95 parts by weight of the propylene-based polymer (A) and 60 to 5 parts by weight, preferably 59 to 5 parts by weight, and more preferably 50 to 5 parts by weight, and further more preferably 45 to 5 parts by weight of the propylene/ethylene/α-olefin copolymer (B) (provided that the total of the component (A) and the component (B) is 100 parts by weight).

The propylene polymer composition in which the ratio of the component (A) and the component (B) is within the above range is preferred in terms of being particularly excellent in heat resistance, transparency, impact strength, mechanical properties (flexibility or rigidity, etc.), and impact resistance.

When flexibility is required, the content of the component (A) is typically 40 to 70 parts by weight, preferably 41 to 70 parts by weight, more preferably 41 to 65 parts by weight, further preferably 50 to 65 parts by weight, and especially preferably 55 to 65 parts by weight; and the content of the component (B) is typically 30 to 60 parts by weight, preferably 30 to 59 parts by weight, more preferably 35 to 59 parts by weight, further preferably 35 to 50 parts by weight, and especially preferably 35 to 45 parts by weight.

On the other hand, when rigidity is required, the content of the component (A) is preferably 70 to 95 parts by weight and more preferably 75 to 95 parts by weight, and the content of the component (B) is preferably 5 to 30 parts by weight and more preferably 5 to 25 parts by weight.

(P) Propylene-Based Polymer Composition

The propylene-based polymer composition (P) of the present invention comprises 40 to 95 parts by weight, preferably 41 to 95 parts by weight, more preferably 50 to 95 parts by weight, and furthermore preferably 55 to 95 parts by weight of the propylene-based polymer (A), 60 to 5 parts by weight, preferably 59 to 5 parts by weight, more preferably 50 to 5 parts by weight, and furthermore preferably 45 to 5 parts by weight of the propylene/ethylene/α-olefin copolymer (B), and the ethylene/α-olefin copolymer (C) that contains 50 to 99 mol % of constitutional units derived from ethylene and 1 to 50 mol % of constitutional units derived from an α-olefin having 3 to 20 carbon atoms in an amount of 5 to 95 parts by weight, preferably 5 to 90 parts by weight, and more preferably 5 to 70 parts by weight, relative to 100 parts by weight of the total of (A) and (B).

The propylene polymer composition in which a component ratio in the above range is preferred in terms of being particularly excellent in heat resistance, transparency, impact strength, mechanical properties (flexibility or rigidity, etc.), and impact resistance, and being especially good balance between low-temperature impact resistance and transparency.

When flexibility is required, the content of the component (A) is preferably 40 to 90 parts by weight, more preferably 41 to 90 parts by weight, and still more preferably 55 to 85 parts by weight; the content of the component (B) is preferably 10 to 60 parts by weight, more preferably 10 to 59 parts by weight, and still more preferably 15 to 45 parts by weight; and the content of the component (C) is preferably 20 to 90 parts by weight, more preferably 20 to 85 parts by weight, and still more preferably 25 to 85 parts by weight, relative to 100 parts by weight of the total of the component (A) and the component (B).

On the other hand, when rigidity is required, the content of the component (A) is preferably 60 to 95 parts by weight and more preferably 70 to 95 parts by weight, the content of the component (B) is preferably 5 to 50 parts by weight and more preferably 5 to 40 parts by weight, and the content of the component (C) is preferably 5 to 50 parts by weight and more preferably 5 to 40 parts by weight.

Graft Modification

In both the propylene-based polymer composition (X) and the propylene-based polymer composition (P) of the present invention, at least part or the whole of said propylene-based polymer composition may be graft-modified with a polar monomer.

In the case of the propylene-based polymer composition (X), for example, part or the whole of the component (A) may be graft-modified, part or the whole of the component (B) may be graft modified, and part or the whole of each of the components (A) and (B) may be graft-modified.

In the case of the propylene-based polymer composition (P), for example, part or the whole of the component (A) may be graft-modified, part or the whole of the component (B) may be graft-modified, part or the whole of the component (C) may be graft-modified, part or the whole of each of the components (A) and (B) may be graft-modified, part or the whole of each of the components (B) and (C) may be graft-modified, part or the whole of each of the components (A) and (C) may be graft-modified, part or the whole of each of the components (A), (B), and (C) may be graft-modified.

Examples of the polar monomer include hydroxyl group-containing ethylenically unsaturated compounds, amino-group containing ethylenically unsaturated compounds, epoxy group-containing ethylenically unsaturated compounds, aromatic vinyl compounds, unsaturated carboxylic acids and derivatives thereof, vinyl esters, vinyl chloride, carbodiimides, and the like.

As the polar monomer, especially preferable are unsaturated carboxylic acids and derivatives thereof, which are exemplified by unsaturated compounds having one or more carboxyl groups, esters of a carboxyl group-containing compound and an alkanol, unsaturated compounds having one or more carboxylic anhydride groups, and the like. Examples of the unsaturated group include vinyl, vinylene, unsaturated cyclic hydrocarbon groups, and the like.

Examples of the specific compounds include unsaturated carboxylic acids such as acrylic acid, maleic acid, fumaric acid, tetrahydrophthalic acid, itaconic acid, citraconic acid, crotonic acid, isocrotonic acid, and nadic acid (brand name: endo-cis-bicyclo[2.2.1]hept-5-ene-2,3-dicarboxylic acid); derivatives thereof such as acid halide, amide, imide, anhydride, esters, and the like. Specific examples of such derivatives include maleyl chloride, maleimide, maleic anhydride, citraconic anhydride, monomethyl maleate, dimethyl maleate, glycidyl maleate, and the like.

These unsaturated carboxylic acids and/or their derivatives may be used alone or in combination of two or more. Of these, preferable is an unsaturated dicarboxylic acid or its anhydride, and especially preferably used is maleic acid, nadic acid, or their anhydride.

The modification may be performed by graft polymerization of a polar monomer onto a component to be modified. In the graft-polymerization of a polar monomer onto a component to be modified, the polar monomer is used in an amount of typically 1 to 100 parts by weight and preferably 5 to 80 parts by weight relative to 100 parts by weight of the component to be modified. The graft polymerization is typically carried out in the presence of a radical initiator.

As the radical initiator, there may be used an organic peroxide, an azo compound, or the like.

The radical initiator may be directly mixed with the component to be modified and the polar monomer, or it may be used after dissolved in a small amount of an organic solvent. The organic solvent may be used without specific limitation so long as it dissolves the radical initiator.

In graft-polymerization of the polar monomer onto the component to be modified, a reductive substance may be further used. When a reductive substance is used, a larger amount of polar monomer is grafted.

The polar monomer may be grafted onto the component to be modified by a conventional known method, for example, by a method in which the component to be modified is dissolved in an organic solvent; the polar monomer, a radical initiator, and the like are added to the solution; and the reaction is conducted at 70 to 200° C., preferably 80 to 190° C., for 0.5 to 15 hours, preferably for 1 to 10 hours.

Alternatively, a modified propylene-based polymer composition may be also produced by reacting a component to be modified with a polar monomer using an extruder or the like. The reaction is typically carried out at a temperature not lower than the melting point of the component to be modified: specifically, when the component (B) is modified, it is desirable to conduct the reaction, for example, at 120 to 300° C., preferably at 120 to 250° C., typically for 0.5 to 10 min; and when component to be modified including the component (A) is modified, it is desirable to conduct the reaction, for example, at 160 to 300° C., preferably at 180 to 250° C., typically for 0.5 to 10 min.

The desirable modification ratio in the resulting modified component (the grafting ratio of the polar monomer) is typically 0.1 to 50 wt %, preferably 0.2 to 30 wt %, and further preferably 0.2 to 10 wt %, provided that the weight of the modified component is 100 wt %.

In the present invention, the propylene-based polymer composition (X) of the present invention may be obtained by kneading such modified components, if necessary, together with one or more of unmodified component selected from the component (A) and the component (B). The propylene-based polymer composition (P) of the present invention may be obtained by kneading such modified components, if necessary, together with one or more unmodified components selected from the component (A), the component (B), and the component (C).

For example, the propylene-based polymer (X) or the propylene-based polymer composition (P) may be produced by modifying a propylene-based polymer composition (Y) of the present invention described later or pellets of said propylene-based polymer composition (Y), followed by melt-kneading the resultant modified polymer composition with a required amount of an unmodified polymer (one or more components selected from the component (A) and the component (B)).

In both cases of the propylene-based polymer composition (X) and the propylene-based polymer composition (P), the content is typically 0.001 to 50 wt %, preferably 0.001 to 10 wt %, more preferably 0.001 to 5 wt %, and still more preferably 0.01 to 3 wt %, relative to 100 wt % of the propylene-based polymer composition at least part of which is graft-modified with a polar monomer by the above method. The content of the polar monomer is readily controlled, for example, by selecting the grafting condition accordingly.

When the propylene-based polymer composition of the present invention is at least partially graft-modified with a polar monomer, it is excellent in adhesiveness and compatibility with other resins, and the surface wettability of molded articles obtained from the propylene-based polymer composition may sometimes be improved.

In addition, when the composition is at least partially graft-modified, the compatibility or adhesiveness with other materials may be additionally imparted without deteriorating characteristic performance of the propylene-based polymer composition of the present invention, such as transparency, low-temperature impact resistance, mechanical properties (rigidity or flexibility), heat resistance and the like.

Further, if the content of a polar monomer, for example, an unsaturated carboxylic acid and/or its derivative, is within the above range, the polyolefin composition of the present invention exhibits high adhesion strength to a polar group-containing resin (for example, polyester, polyvinyl alcohol, ethylene/vinyl alcohol copolymer, polyamide, PMMA, polycarbonate, etc.).

The propylene-based polymer composition at least partially graft-modified of the present invention may be blended with another polymer, for example, a thermoplastic resin or an elastomer, as long as the properties of the modified polymer composition are not impaired. Such another polymer may be blended in the graft modification or after the modification.

To the propylene-based polymer composition at least partially graft-modified of the present invention, there may be added a known process stabilizer, a heat resistant stabilizer, a preventive agent against thermal aging, a filler, or the like as long as the properties of the modified polymer composition are not impaired. Examples of these components include, for example, the same components as described in the section of optional components. In the present invention, particularly in order to impart adhesion, it is preferred to add a so-called tackifier. Examples of the tackifier, which is a material that imparts adhesion, include rosin derivatives, terpene resins, petroleum resins, and hydrogenated derivative thereof. Of them, preferable are hydrogenated terpene resins and hydrogenated petroleum resins. In the propylene-based polymer composition that is at least partially graft-modified, the preferred ratio is 5 to 30 wt % of the tackifier to 70 to 95 wt % of the total of the components (A) and (B).

Optional Components

The propylene-based polymer composition (X) of the present invention may contain another polymer (excluding the propylene-based polymer (A) and the propylene/ethylene/α-olefin having 4 to 20 carbon atoms copolymer (B)) so long as the objectives of the present invention are not impaired.

The propylene-based polymer composition (P) of the present invention may also contain another polymer (excluding the propylene-based polymer (A) and the propylene/ethylene/α-olefin having 4 to 20 carbon atoms copolymer (B), and the ethylene/α-olefin copolymer (C)) where necessary so long as the objectives of the present invention are not impaired.

In that case, the blending amount is not specifically limited, but it is preferably approximately 0.1 to 30 parts by weight relative to 100 parts by weight of the total of the propylene-based polymer (A) and the propylene/ethylene/α-olefin copolymer (B). In this case, one embodiment is a propylene-based polymer composition that contains no styrene-based polymer.

In another embodiment, the polymer component of propylene-based polymer composition (X) is composed of the component (A) and the component (B) without containing any other elastomers or other resins. In this case, the propylene-based polymer composition is especially excellent in transparency.

Similarly, there is one embodiment wherein the propylene-based polymer composition (P) does not contain any other polymers (excluding the propylene-based polymer (A), the propylene/ethylene/α-olefin having 4 to 20 carbon atoms copolymer (B), and the ethylene/α-olefin copolymer (C)) and the polymer component of the composition (P) is composed of the component (A), the component (B), and the component (C). In this case, the polymer composition is especially excellent in transparency.

In the propylene-based polymer composition of the present invention, there may be added an additive such as a weathering stabilizer, a heat-resistance stabilizer, an antistatic agent, a slip preventive agent, an antiblocking agent, an anticlouding agent, a nucleating agent, a lubricant, a pigment, a dye, a plasticizer, an antiaging agent, a hydrochloric acid absorber, and an antioxidant, so long as the objectives of the present invention are not impaired.

The propylene-based polymer composition of the present invention may contain a nucleating agent (also referred to as crystal nucleating agent or clarifying nucleating agent), which is a specific optional component in order to further impart transparency. Examples of the nucleating agent used here include dibenzylidenesorbitol-type nucleating agents, phosphate ester type nucleating agents, rosin-type nucleating agents, metal benzoate-type salt-based nucleating agents, and the like. The amount in the blend is not specifically limited, but preferably approximately 0.1 to 1 parts by weight relative to 100 parts by weight of the total of the component (A) and the component (B) in the propylene-based polymer composition (X) or approximately 0.1 to 1 parts by weight relative to 100 parts by weight of the total of the component (A), the component (B), and the component (C) in the propylene-based polymer composition (P).

In a preferred embodiment of the propylene-based polymer composition (X) of the present invention, a phase-separated structure is observed in a core portion of a 1-mm thick press-molded sheet obtained therefrom and stained with ruthenium acid, with a transmission electron microscope (TEM). In this case, a phase-separated structure comprising a phase containing the component (A) and a phase containing the component (B) is typically formed.

More preferably, the phase-separated structure is a sea-island structure in which the component (A) forms a matrix and the component (B) forms a domain. When the propylene-based polymer composition (X) has a sea-island structure, the average dispersion particle size of the domain is 0.1 to 10 μm and preferably 0.1 μm to 5 μm. For example, FIG. 1 shows this structure. In the present invention, the propylene-based polymer composition (X) with such structure is preferred, since it is excellent in balance between impact resistance and transparency.

Figure 2:
FIG. 2 is a TEM image of the composition of Comparative Example X2 magnified by 20,000.

In the present invention, the composition may form a phase-separated structure in which the component (A) and the component (B) are separated and they form a co-continuous structure. For example, FIG. 2 shows this structure.

In the present invention, the propylene-based polymer composition (X) with these phase-separated structures is preferable in terms of being excellent in balance between impact resistance and transparency.

In observing if a phase separation occurs, a pressed sheet is prepared as follows: Using a hydraulic hot press molding machine whose temperature has been set at 200° C., the composition is preheated for 5 minutes, molded into a sheet in 1 minute under 10 MPa, and cooled at 20° C. for 3 minutes under 10 MPa to prepare a sheet specimen having a predetermined thickness.

A slice of approximately 100 nm is cut out from the core portion of said pressed sheet using a microtome. The slice is stained with ruthenic acid and observed with a transmission electron microscope (TEM hereinafter) at a suitable magnification of 100 to 100,000.

In the observed image, the occurrence of phase separation in the composition of the present invention can be confirmed by the existence of more stained phase and less stained phase distinguishably present.

Figure 3:
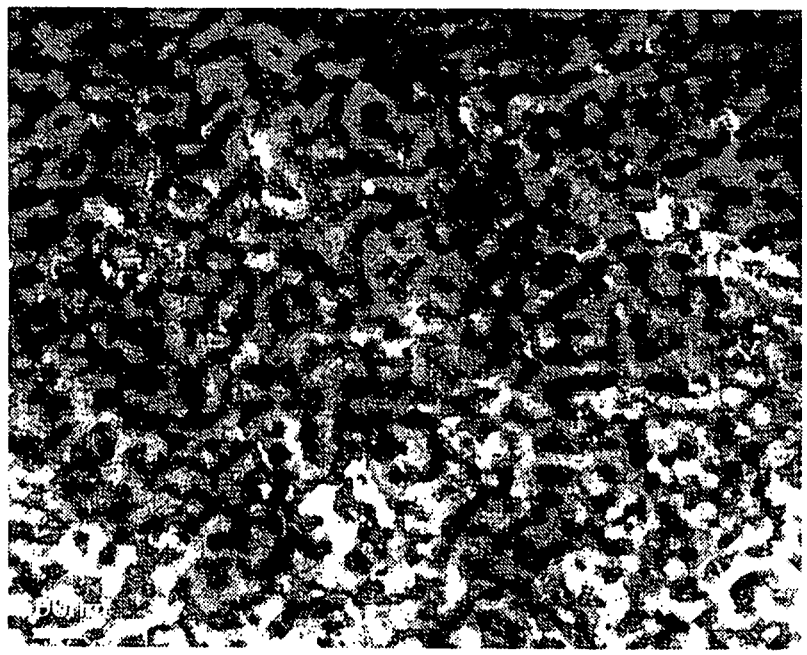
FIG. 3 is a TEM image of the composition of Example X6 magnified by 20,000.

In contrast, when the composition of the present invention has no phase-separated structure, the observed image shows no distinguishable borderline between more stained phase and less stained phase. For example, FIG. 3 shows this structure.

When the composition of the present invention has a sea island structure, that the component (A) is a matrix is confirmed by the fact that more stained portion and less stained portion are separately present wherein the less stained portion is a matrix. In other words, that the component (A) is a matrix is further supported by the fact that lamellar structure composed of crystalline layers and amorphous layers is observed in the less stained portion magnified by approximately 100,000. That the component (B) is a domain is confirmed by the fact that more stained portion is a domain. The average dispersion particle size of the domain is determined from the number average of the domain dispersion particle size observed after binarization of the image captured with a TEM. In the binarization of the captured image, the borderlines between the domain and the matrix or the borderlines of individual phases in the continuous structure captured in the above observation is manually copied to a transparent film by overlapping the transparent film over the image, and the drawing of borderlines copied on the film is used for binarization.

When the propylene-based polymer of the present invention has a phase-separated structure, for example, in the case where these phases form a cocontinuous structure (for example, Polymer Experiment New Edition 6, Polymer Structure 2 (Shin-koubunsizikkengaku 6 Koubunsi no kouzou (2)), page 64, lines 20-23 (Kyoritsu Shuppan Co., Ltd.), there are also observed more stained portions and less stained portions, and the less stained portions are made of the component (A) and the more stained portions are made of the component (B). That the component (A) forms less stained portions is supported by the fact that a lamellar structure is composed of crystalline substance and amorphous substance in the less stained portion when magnified by approximately 100,000.

Image analyses are described in Chapter 4 of Polymer Experiment New Edition 6, Polymer Structure 2, Kyoritsu Shuppan Co., Ltd.

In Examples described later, the images were analyzed as follows. Specifically, the composition was molded into a 2-mm thick sheet under 100 kgf/cm$^2$ using a hydraulic hot press molding machine whose temperature had been set at 200° C. and the sheet was cooled by pressing under 100 kgf/cm$^2$ using another hydraulic hot press molding machine whose temperature had been set at 20° C. to prepare a specimen. A slice of approximately 100 nm was cut out of the core portion of the pressed sheet using a microtome. The slice was stained with ruthenium acid and observed on a transmission electron microscope (hereinafter, referred to as TEM).

For the fact that the propylene-based polymer composition (P) of the present invention is excellent in transparency, impact resistance, and mechanical properties (flexibility, rigidity or the like), one of the reasons is assumed to be that specific components are used as the component (A) and the component (B). When such specific components are used, for example, when only the component (A) and the component (B) are melt-kneaded and press-molded into a 1-mm thick sheet, a phase-separated structure may be observed in the core portion of the sheet stained with ruthenium acid on a transmission electron microscope (TEM). In this case, typically a phase-separated structure consisting of a phase containing the component (A) and a phase containing the component (B) is formed. Needless to say, in the composition of the present invention further containing the component (C), it is difficult to distinguish whether the component (B) is separated from the component (A) and compatible with the component (C). However, the fact that the component (A) and the component (B) are specific components, for example, a combination of specific components such that a blend of the component (A) and the component (B) forms not a single phase but separate phases may contribute, at least partly, to the improvement in balance of transparency, impact resistance, mechanical properties (flexibility or rigidity, etc.), and heat resistance.

The propylene-based polymer composition of the present invention is excellent particularly in transparency, impact resistance, mechanical properties, and heat resistance. For example, for the propylene-based polymer composition of the present invention having a tensile modulus not less than 700 MPa (preferably not more than 2500 MPa), the internal haze is preferably 70% or less, and more preferably 60% or less. For the propylene-based polymer composition of the present invention, the lower limit of internal haze is not specifically limited, but for example, is 5% or more, and preferably 20% or more. When a nucleating agent (also referred to as crystal nucleating agent or clarifying nucleating agent) is used, the internal haze may be controlled to 50% or less, and further preferably 40% or less. The lower limit of internal haze is not specifically limited, but 5% or more, and preferably 10% or more.

If the tensile modulus is 700 MPa or more, a 2-mm thick specimen obtained by injection molding is used for the measurement of internal haze as described later.

For the propylene-based polymer composition (X) of the present invention having a tensile modulus not less than 700 MPa and preferably not more than 2500 MPa, the Izod impact strength at 0° C., which is an indicator of impact strength, is preferably 30 J/m or more, more preferably 35 J/m or more, and further preferably 40 J/m. The upper limit of Izod impact strength is not specifically limited, but "NB (Not Break)" is the upper limit, for example, 500 J/m or less.

For the propylene-based polymer composition (X) of the present invention having a tensile modulus not less than 700 MPa and preferably not more than 2500 MPa, the softening point (IC), which is an indicator of heat resistance and determined by TMA, is preferably 140° C. or higher, and more preferably 145° C. or higher. The upper limit of softening point is not specifically limited, but typically 170° C. or lower.

For the propylene-based polymer composition (P) of the present invention having a tensile modulus not less than 700 MPa and preferably not more than 2500 MPa, the Izod impact strength at 0° C., which is an indicator of impact strength, is preferably 30 J/m or more, more preferably 35 J/m or more, still more preferably 40 J/m or more, further preferably 100 J/m or more, and especially preferably 200 J/m or more. The upper limit of Izod impact strength is not specifically limited, but "NB (Not Break)" is the upper limit and typically 900 J/m or less, for example, 500 J/m or less.

For the propylene-based polymer composition (P) of the present invention having a tensile modulus not less than 700 MPa and preferably not more than 2500 MPa, the softening point (° C.), which is an indicator of heat resistance and determined by TMA, is preferably 140° C. or higher, and more preferably 145° C. or higher. The upper limit of softening point is not specifically limited, but typically 170° C. or lower.

For the propylene-based polymer composition of the present invention whose tensile modulus is not less than 50 MPa and less than 700 MPa, preferably not more than 699 MPa, the internal haze is preferably 70% or less, and more preferably 60% or less. For the propylene-based polymer composition of the present invention, the lower limit of internal haze is not specifically limited, but typically 5% or more, for example, 20% or more. When a crystal nucleating agent is used, the internal haze may be controlled to 50% or less, and more preferably 40% or less. The lower limit of internal haze is not specifically limited, but 5% or more, and preferably 10% or more.

If the tensile modulus is not less than 50 MPa and less than 700 MPa, a 1-mm thick pressed sheet is used for the measurement of the internal haze as described later.

For the impact resistance, the Izod impact strength at 0° C. is preferably 500 J/m or more, and more preferably 600 J/m or more. The upper limit of Izod impact strength is not specifically limited, but typically "NB (Not Break)" is the upper limit. If a specimen is not broken at all after the Izod impact test, it is rated as Not Break.

As for the heat resistance, the softening point (° C.) determined by TMA is preferably 135° C. or higher, and more preferably 140° C. or higher. The upper limit of softening point is not specifically limited, but typically 170° C. or lower.

The internal haze was measured using a 1-mm thick pressed sheet or an injection-molded 2-mm thick specimen in accordance with JIS K7105 with a digital hazemeter NDH-20D manufactured by Nippon Denshoku Industries Co., Ltd. (medium: benzyl alcohol). The specimen for measurement of the internal haze was prepared as follows.

The injection-molded sheet was molded using an injection molding machine IS-55 manufactured by Toshiba Corporation under conditions that the resin temperature was 200° C., the injection pressure was 1000 kgf/cm$^2$ and the mold temperature was 40° C. A rectangular plate with a thickness of 2 mm, a length of 120 mm, and a width of 130 mm was prepared.

The pressed sheet for internal haze measurement is prepared as follows: the composition was preheated for 5 minutes and molded into a sheet in 1 minute under 10 MPa using a hydraulic hot press molding machine whose temperature has been set at 200° C. and the sheet is cooled for 3 minutes at 20° C. under 10 MPa to prepare a sheet-shaped specimen with a predetermined thickness.

For the measurement of tensile modulus, a JIS No. 3 dumbbell specimen was punched out from a 1-mm thick pressed sheet in accordance with JIS K6301. The tensile modulus was measured using, for example, an Instron 1123 Tensile Tester manufactured by Instron Corporation with a span distance of 30 mm at a tensile speed of 30 mm/min at 23° C., and an average value obtained from three runs was adopted.

The pressed sheet for tensile modulus measurement is prepared as follows. The composition is preheated for 5 minutes and molded into a sheet in 1 minute under 10 MPa using a hydraulic hot press molding machine whose temperature has been set at 200° C. and the sheet is cooled for 3 minutes at 20° C. under 10 MPa to prepare a sheet-shaped sample having a predetermined thickness.

The Izod impact strength was measured at 0° C. using a specimen with dimensions of 12.7 mm (width)×3.2 mm (thickness)×64 mm (length) that was obtained by punching out from a 3-mm thick pressed sheet and provided with a notch thereon by machining. An average value obtained from three runs was adopted.

The pressed sheet for Izod impact strength measurement is prepared as follows. The composition is preheated for 7 minutes and molded into a sheet in 1 minute under 10 MPa using a hydraulic hot press molding machine whose temperature has been set at 200° C. and subsequently the sheet is cooled for 3 minutes at 20° C. under 10 MPa to prepare a sheet-shaped specimen having a predetermined thickness.

For the heat resistance, the softening point (° C.) was determined from a TMA curve recorded with a specimen of a 1-mm thick pressed sheet while pressing with a 1.8-mmΦ flat indenter at a pressing pressure of 2 kgf/cm$^2$ and heating at 5° C./min, in accordance with JIS K7196.

The pressed sheet for TMA is prepared as follows. The composition is preheated for 5 minutes and molded into a sheet in 1 minute under 10 MPa using a hydraulic hot press molding machine whose temperature has been set at 200° C. and subsequently the sheet is cooled for 3 minutes at 20° C. under 10 MPa to prepare a sheet-shaped specimen having a predetermined thickness.

Method for Producing the Propylene-Based Polymer Composition

In both cases of the propylene-based polymer composition (X) and the propylene-based polymer composition (P), the propylene-based polymer composition as mentioned above may be produced by using various well-known methods, for example, a method of mixing the components within the above range by a multi-stage polymerization method or by using a mixing machine such as Henschel mixer, V-blender, ribbon blender, tumbler blender, and kneader ruder. The composition may be produced by melt-kneading of the premixed components with a single-screw extruder, a twin-screw extruder, a kneader, a Banbury mixer, or the like, followed by granulating or pulverizing of the melt-kneaded material.

The propylene-based polymer composition of the present invention described above (hereinafter may be called "the above-described propylene-based polymer composition") can be widely used in conventionally known applications of polyolefins; in particular, it can be used by forming, for example, to sheet, unoriented or oriented film, filament, or other various shapes of molded articles. The molded article obtained by using the above-described propylene-based polymer composition contains, at least in part, the above-described propylene-based polymer composition; that is, the above-described propylene-based polymer composition may be used at least in part of the molded article, or may be used in the whole of the molded article. As a molded article in part of which the above-described propylene-based polymer composition is used, there may be mentioned a multilayer laminate. Specific examples of the multilayer laminate include laminates such as multilayer films and sheets, multilayer containers, multilayer tubes, and multilayer coating film contained as a constitutional component of a water-based paint, in which at least one layer comprises the above-described propylene-based polymer composition.

Examples of the molded article include, specifically, molded articles obtained by publicly known heat molding methods such as extrusion molding, injection molding, inflation molding, blow molding, extrusion blow molding, injection blow molding, press molding, vacuum molding, calendar molding, foam molding, and powder slush molding. Hereinafter, the molded article will be explained with several examples.

When the molded article related to the present invention is, for example, an extrusion molded article, there is no limitation on its shape and product application; it is exemplified by sheets, films (unoriented), pipes, hoses, electrical wire coverings, tubes, and the like. Particularly preferred are sheets (skin material), films, tubes, catheters, monofilaments, nonwoven fabrics, and the like.

When the above-described propylene-based polymer composition is extrusion-molded, conventional known extruders and molding conditions may be adopted, and melt of the above-described propylene-based polymer composition may be molded to a desired shape by extruding through a given dice using, for example, a single-screw extruder, a kneading extruder, a ram extruder, a gear extruder, or the like.

An oriented film may be obtained by drawing above-described extruded sheet or film (unoriented) by publicly known methods such as the tenter method (longitudinal-transverse or transverse-longitudinal orientation), simultaneous biaxial orientation method, and uniaxial orientation method.

In drawing the sheet or unoriented film, the draw ratio is generally about 20 to about 70 in biaxial orientation, and about 2 to about 10 in uniaxial orientation. It is preferred to obtain an oriented film about 1 to 500 μm thick, preferably about 5 to 200 μm thick by drawing.

As film-shaped molded articles, inflation films may be also produced. On inflation molding, drawdown is not likely to develop.

The sheet-shaped or film-shaped molded articles obtained by using the above-described propylene-based polymer composition are less electrostatically charged and excellent in rigidity such as tensile modulus, heat resistance, stretching property, impact resistance, aging resistance, transparency, translucency, luster, rigidity, moisture resistance, and gas barrier property. They can be widely used as packaging films or the like. The sheet-shaped and film-shaped molded article obtained by using the above-mentioned propylene-based polymer composition may be a multilayer molded article having at least one layer of the above-mentioned propylene-based polymer composition.

Filament-shaped molded articles can be produced, for example, by extruding the above-described propylene-based polymer composition, which is melted, through a spinneret. The filament thus obtained may be further drawn. In this case, the filament is drawn so that molecules can be oriented along at least one axis of the filament, and the desirable draw ratio is generally about 5 to about 10. The filament made of the above-described propylene-based polymer composition is less electrostatically charged and excellent in transparency, rigidity, heat resistance, impact resistance, and stretching property. Nonwoven fabrics can be produced by, specifically, the spunbond method or the melt-blown method.

Injection-molded articles can be produced by injection molding of the above-described propylene-based polymer composition into various shapes under publicly known conditions using a conventional injection molding machine. The injection-molded articles obtained by using the above-described propylene-based polymer composition are less electrostatically charged and excellent in transparency, rigidity, heat resistance, impact resistance, surface gloss, chemical resistance, wear resistance, and the like; hence they are widely used in automobile interior trims, automobile exterior components, housings for home electric appliances, containers, and others.

Blow-molded articles can be produced by blow molding of the above-described propylene-based polymer composition under publicly known conditions using a conventional blow molding machine. The blow-molded article made of the above-described propylene-based polymer composition may be a multilayer article containing at least one layer made of the above-described propylene-based polymer composition.

For example, in extrusion blow molding, a hollow molded article can be produced by extruding the above-described propylene-based polymer composition through a die in a molten state at a resin temperature of 100° C. to 300° C. to form a tubular parison, which is held in a mold with a desired shape and subsequently fit to the mold at a resin temperature of 130° C. to 300° C. by blowing air thereinto. The blow ratio is desirably 1.5 to 5 in the transverse direction.

In injection blow molding, a hollow molded article can be produced by injecting the above-described propylene-based polymer composition into a parison mold at a resin temperature of 100° C. to 300° C. to form a parison, which is held in a mold with a desired shape and subsequently fit to the mold at a resin temperature of 120° C. to 300° C. by blowing air thereinto. The blow ratio is desirably 1.1 to 1.8 in the longitudinal direction and 1.3 to 2.5 in the transverse direction.

The blow-molded article obtained by using the above-described propylene-based polymer composition is excellent in transparency, rigidity or flexibility, heat resistance, impact resistance, and moisture resistance.

Examples of the press-molded article include a molded article obtained by mold stamping. For example, when a base material and a skin material are press-molded at a time into a monolithic composite (stamping molding), the above-described propylene-based polymer composition may be used for forming of the base material.

Such molded article obtained by stamp molding includes, specifically, automobile interior components such as door trims, rear package trims, sheet back garnishes, and instrumental panels.

Press-molded articles obtained by using the above-described propylene-based polymer composition are less electrostatically charged and excellent in rigidity or flexibility, heat resistance, transparency, impact resistance, aging resistance, surface luster, chemical resistance, wear resistance, and the like.

A foam-molded article obtained by using the above-described propylene-based polymer composition can be obtained with a high foaming ratio and has good injection-moldability, high rigidity, and high material strength.

Using the above-described propylene-based polymer composition, there can be produced vacuum-molded articles such as skin material of automobile interior such as instrument panels and door trims. Such molded articles are less electrostatically charged and excellent in flexibility, heat resistance, impact resistance, aging resistance, surface luster, chemical resistance, wear resistance, and the like.

By using above-described propylene-based polymer composition, there can be produced powder slush-molded articles such as automobile components, household electrical appliance components, toys, and sundries. Such molded articles are less electrostatically charged and excellent in flexibility, heat resistance, impact resistance, aging resistance, surface luster, chemical resistance, wear resistance, and the like.

Examples of the molded article of the present invention include laminates containing at least one layer made of the above-mentioned propylene-based polymer composition.

The propylene-based polymer composition of the present invention is suitable for, for example, containers or nonwoven fabric. Examples of the container include containers for frozen storage, food containers such as retort pouches, and bottle-shaped containers.

As described above, the propylene-based polymer composition of the present invention can be widely used for applications such as automobile interior/exterior materials, beverage bottles, clothing cases, food packaging materials, food containers, retort containers, substitute for PET, pipes, transparent substrates, sealants, and laminates.

(Multilayer Laminate)

The propylene-based polymer composition of the present invention that is at least partially graft modified is suitably used as an adhesive layer of a laminate. A resin of a thermoplastic resin layer constituting the laminate is exemplified by polyester, polyamide, PMMA, polyvinyl alcohol, ethylene/vinyl alcohol copolymer, and nylon. Of these, preferably used are polyester and ethylene/vinyl alcohol copolymer.

Examples of the polyester include aromatic polyesters such as polyethylene terephthalate, polybutylene terephthalate, and polyethylene isophthalate/terephthalate copolymer, and aliphatic polyesters such as polyglycol acid and polylactic acid.

The ethylene/vinyl alcohol copolymer is desirably a copolymer in which the content of units derived from ethylene is 20 to 50 mol % and preferably 25 to 48 mol %, which can be produced by saponifying the corresponding ethylene/vinyl acetate copolymer by a conventional method.

Examples of other materials constituting the laminate include paper, wood, metal, and the like. Of these, a metal is especially preferable. Although a metal has sufficient adhesive force even untreated, its surface may be provided with urethane-based adhesive or the like as a primer or may be subjected to chemical treatment or the like.

The laminate of the present invention can be produced by various known methods. For example, it can be produced by publicly known coextrusion methods such as inflation molding, cast molding, tube molding, and extrusion coating. Alternatively, it can be produced by forming monolayer or multilayer films or sheets, followed by dry lamination of the formed films or sheets with heating.

The laminate of the present invention can be suitably used as a material for automobile interior/exterior materials, beverage bottles, clothing cases, food packaging materials, food containers, retorts, pipes, transparent substrates, sealants, and the like.

(Y) Pellet Made of Propylene-Based Polymer Composition

The pellet of the present invention comprises a propylene-based polymer composition (Y) comprising 1 to 70 parts by weight of a propylene-based polymer (A) and 99 to 30 parts by weight of a propylene/ethylene/α-olefin copolymer (B) that contains 84 to 50 mol % of constitutional units derived from propylene, 15 to 30 mol % of constitutional units derived from ethylene, and 1 to 20 mol % of constitutional units derived from an α-olefin having 4 to 20 carbon atoms (provided that the total of said component (A) and said component (B) is 100 parts by weight).

As a raw material in producing the propylene-based polymer composition (P) of the present invention, there may be used not only a pellet comprising the propylene-based polymer composition (Y) but also, for example, a pellet comprising a propylene-based polymer composition (Q), which comprises 1 to 70 parts by weight of a propylene-based polymer (A) and 99 to 30 parts by weight of a propylene/ethylene/α-olefin copolymer (B) that contains 89 to 50 mol % of constitutional units derived from propylene, 10 to 30 mol % of constitutional units derived from ethylene, and 1 to 20 mol % of constitutional units derived from an α-olefin having 4 to 20 carbon atoms (provided that the total of said component (A) and said component (B) is 100 parts by weight).

In the propylene-based polymer composition (Y) and the propylene-based polymer composition (Q), it is preferred that the Tm of the above-described propylene-based polymer (A) is not less than 120° C. and not more than 170° C. as measured by DSC, and that the propylene/ethylene/α-olefin copolymer (B) contains 84.0 to 60.0 mol % of constitutional units derived from propylene, 15.0 to 30.0 mol % of constitutional units derived from ethylene, and 1.0 to 10.0 mol % of constitutional units derived from an α-olefin having 4 to 20 carbon atoms and has a B-value defined above of not less than 0.9 and not more than 1.5; it is also preferred that the Tm of the propylene-based polymer (A) is not less than 120° C. and not more than 170° C. as measured by DSC, and that the propylene/ethylene/α-olefin copolymer (B) contains 84.0 to 63.0 mol % of constitutional units derived from propylene, 15.0 to 30.0 mol % of constitutional units derived from ethylene, and 1.0 to 10.0 mol % of constitutional units derived from an α-olefin having 4 to 20 carbon atoms and has a B-value defined above of not less than 0.9 and not more than 1.5.

As the propylene-based polymer (A) used in the pellet comprising the propylene-based polymer composition (Y) of the present invention, there may be mentioned the same propylene-based polymer as that used in the propylene-based polymer composition (X). Preferred aspects for the bonding mode, type and content of constitutional units derived from the α-olefin except constitutional units derived from propylene, isotactic pentad fraction, Tm, ΔH, MFR, etc., the production method, and the like are all the same as those of the propylene-based polymer (A) used in propylene-based polymer composition (X).

As the propylene-based polymer (A) used in the pellet comprising the propylene-based polymer composition (Q) of the present invention, there may be mentioned the same propylene-based polymer as that used in the propylene-based polymer composition (P). Preferred aspect for the bonding mode, type and content of constitutional units derived from the α-olefin except constitutional units derived from propylene, isotactic pentad fraction, Tm, ΔH, MFR, etc, the production method, and the like are all the same as those of the propylene-based polymer (A) used in the propylene-based polymer composition (P).

As the propylene/ethylene/α-olefin copolymer (B) used in the pellet comprising the propylene-based polymer composition (Y) of the present invention, there may be mentioned the same propylene/ethylene/α-olefin copolymer (B) as that used in the propylene-based polymer composition (X). For example, with respect to the ratio of constitutional units in the copolymer, the content of propylene-derived constitutional unit is 84 to 50 mol %, the content of constitutional units derived from ethylene is 15 to 30 mol %, and the content of constitutional units derived from an α-olefin having 4 to 20 carbon atoms is 1 to 20 mol %. Here, the total of constitutional units derived from ethylene and constitutional units derived from an α-olefin having 4 to 20 carbon atoms is 16 to 50 mol %, and the total of constitutional units derived from propylene, constitutional units derived from ethylene, and constitutional units derived from an α-olefin having 4 to 20 carbon atoms is 100 mol %.

As the propylene/ethylene/α-olefin copolymer (B) used in the pellet comprising the propylene-based polymer composition (Q) of the present invention, there may be mentioned the same propylene/ethylene/α-olefin copolymer (B) as that used in the propylene-based polymer composition (P). For example, with respect to the ratio of constitutional units in the copolymer, the content of constitutional units derived from propylene is 89 to 50 mol %, the content of constitutional units derived from ethylene is 10 to 30 mol %, and the content of constitutional units derived from an α-olefin having 4 to 20 carbon atoms is 1 to 20 mol %. Here, the total of constitutional units derived from ethylene and constitutional units derived from an α-olefin having 4 to 20 carbon atoms is 11 to 50 mol %, and the total of constitutional units derived from propylene, constitutional units derived from ethylene, and constitutional units derived from an α-olefin having 4 to 20 carbon atoms is 100 mol %.

In both the pellet comprising the propylene-based polymer composition (Y) and the pellet comprising the propylene-based polymer composition (Q), more preferably, the component (B) contains 60.0 to 84.0 mol % of constitutional units derived from propylene, 15.0 to 30.0 mol % of constitutional units derived from ethylene, and 1.0 to 10.0 mol % of constitutional units derived from an α-olefin having 4 to 20 carbon atoms. Here, the total of constitutional units derived from ethylene and constitutional units derived from an α-olefin having 4 to 20 carbon atoms is 16.0 mol % to 40.0 mol %, and the total of constitutional units derived from propylene, constitutional units derived from ethylene, and constitutional units derived from an α-olefin having 4 to 20 carbon atoms is 100 mol %.

Still more preferably, the component (B) contains 63.0 to 84.0 mol % of constitutional units derived from propylene, 15.0 to 30.0 mol % of constitutional units derived from ethylene, and 1.0 to 7.0 mol % of constitutional units derived from an α-olefin having 4 to 20 carbon atoms. Here, the total of constitutional units derived from ethylene and constitutional units derived from an α-olefin having 4 to 20 carbon atoms is 16.0 mol % to 37.0 mol %, and the total of constitutional units derived from propylene, constitutional units derived from ethylene, and constitutional units derived from an α-olefin having 4 to 20 carbon atoms is 100 mol %.

Yet still more preferably, the component (B) contains 65.0 to 83.5 mol % of constitutional units derived from propylene, 15.5 to 28.0 of constitutional units derived from ethylene, and 1.0 to 7.0 mol % of constitutional units derived from an α-olefin having 4 to 20 carbon atoms. Here, the total of constitutional units derived from ethylene and constitutional units derived from an α-olefin having 4 to 20 carbon atoms is 16.5 mol % to 35.0 mol %, and the total of constitutional units derived from propylene, constitutional units derived from ethylene, and constitutional units derived from an α-olefin having 4 to 20 carbon atoms is 100 mol %.

Especially preferably, the component (B) contains 68.0 to 81.0 mol % of constitutional units derived from propylene, 16.0 to 25.0 of constitutional units derived from ethylene, and 3.0 to 7.0 mol % of constitutional units derived from an α-olefin having 4 to 20 carbon atoms. Here, the total of constitutional units derived from ethylene and constitutional units derived from an α-olefin having 4 to 20 carbon atoms is 19.0 mol % to 32.0 mol %, and the total of constitutional units derived from propylene, constitutional units derived from ethylene, and constitutional units derived from an α-olefin having 4 to 20 carbon atoms is 100 mol %.

For the copolymer (B) used in the pellet of present invention, preferred aspects for the type and content of constitutional units in the copolymer, mm value, MFR, [η], internal haze, M100, tensile strength at break, crystallinity, meting point, Tg, Mw/Mn, etc. and production method, and the like are all the same as those of the propylene-based polymer (B) used in the propylene-based polymer composition (X).

The pellet of the present invention comprises the propylene-based polymer composition (Y) containing 1 to 70 parts by weight, preferably 1 to 65 parts by weight, and more preferably 1 to 40 parts by weight of the component (A), and 99 to 30 parts by weight, preferably 99 to 35 parts by weight, and more preferably 99 to 60 parts by weight of the component (B) (provided that the total of the component (A) and the component (B) is 100 parts by weight).

In producing the propylene-based polymer composition (P) of the present invention, there may be used a pellet comprising the propylene-based polymer composition (Q), which contains 1 to 65 parts by weight, preferably 1 to 40 parts by weight of the component (A), and 99 to 35 parts by weight, preferably 99 to 60 parts by weight of the component (B) (provided that the total of the component (A) and the component (B) is 100 parts by weight).

The shape of pellets is, for example, spherical, cylindrical, lenticular, cubic, or the like. Pellets with such shape may be produced by a known pelletization method; for example, the component (A) and the component (B) are homogeneously mixed in a molten state and the mixture is extruded with an extruder and cut by hot-cutting or strand-cutting technique to obtain spherical, cylindrical, or lenticular pellets. In this case, the cutting process may be performed either in water or in a gas flow such as air. When one uses an extruder equipped with a device capable of forming a strand in which outer and inner layers are made of different polymers to prepare a two-layered strand with the component (A) in the outer layer and the component (B) in the inner layer, followed by cutting the strand, the mutual adhesion can be more effectively reduced. Cubic pellets can be obtained, for example, by a method in which the polymer composition is homogeneously mixed and then formed into a sheet by a roll or the like, followed by pelletizing with a sheet pelletizing machine. As for the size, the length of the longest part of pellet is preferably not more than 3 cm. With pellets sized over this range, the measurement error may increase.

The surfaces of pellets may be provided with one or more kinds of powder selected from calcium carbonate, barium sulfate, silica, talc, stearic acid, and polyolefin powder. This treatment is preferred since mutual adhesion can be further suppressed or bridging phenomenon of pellets can be reduced in taking out of a silo. The amount of a dusting agent to be applied may be adjusted depending on the size and form of pellets and it is typically 0.05 to 3 parts by weight per resin composition pellet.

There may be added an additive such as a weathering stabilizer, a heat resistant stabilizer, an antistatic agent, a slip preventive agent, an antiblocking agent, an anticlouding agent, a nucleating agent, a lubricant, a pigment, a dye, a plasticizer, an antiaging agent, a hydrochloric acid absorber, and an antioxidant where necessary, so long as the objectives of the present invention are not impaired. The propylene-based polymer composition of the present invention may contain another polymer (except the propylene-based polymer (A) and the propylene/ethylene/α-olefin copolymer (B)) so long as the objective of the present invention is not impaired. In one embodiment of the present invention, the propylene-based polymer composition contains no styrene-based polymer. In another embodiment, the propylene polymer composition contains neither other elastomer nor other resin. In a preferable embodiment of the present invention, the propylene polymer composition contains no polymers other than the component (A) or the component (B). In this case, transparency is especially excellent.

As a preferred method for obtaining the pellet, there may be mentioned a method of kneading the component (A) and the component (B) at a temperature higher than the maximum of peak temperatures (Tm) of the component (A) as measured with a differential scanning calorimeter (DSC) and, for example, lower than 280° C.

The pellet of the present invention may be used as a modifier for thermoplastic polymers and preferably a modifier for polyolefin polymers.

The polymer to be modified is not specifically limited, but a polyolefin polymer is preferable. Examples of the polyolefin resin include, for example, high-density polyethylene, medium-density polyethylene, low-density polyethylene, LLDPE (linear low-density polyethylene), polypropylene polymer, poly-4-methyl-1-pentene, and the like. Preferable is a polypropylene resin. In this case, the polypropylene polymer is crystalline and either a homopolymer of propylene or a random or block copolymer of propylene and a small amount of an α-olefin and/or ethylene.

The Tm of polypropylene polymer used here is preferably not less than 120° C. and not more than 170° C. as measured by DSC. The polypropylene polymer is exemplified by the same material as component (A). Preferred aspects for the linkage mode, type and content of constitutional units derived from an α-olefin except constitutional units derived from propylene, isotactic pentad fraction, Tm, ΔH, MFR, etc., the production method, and the like are all the same as those of the propylene-based polymer (A) used in the propylene-based polymer composition (X).

The component (A) contained in the pellet of the present invention and a polymer to be modified may be of the same nature.

A modified polymer composition may be obtained by kneading a polymer to be modified, for example a polyolefin polymer, the polyolefin-based modifier of the present invention, and an optional additive described in the section of propylene-based polymer composition. In kneading, it is preferred to knead the pellet of the present invention and a polymer to be modified in a melted state. The amount of the modifier to be added is 3 to 95 wt %, preferably 10 to 80 wt %, and further preferably 30 to 70 wt %. When the amount is within this range, the modified polymer composition is sufficiently modified to have a good fluidity, excellent moldability, high strength, and excellent heat resistance.

Since the pellet of the present invention is excellent in antiblocking property, it can modify other polymers with high productivity. In addition, it can provide polymer compositions excellent in transparency, low-temperature impact resistance, mechanical properties (flexibility or rigidity, etc.) and heat resistance; this is valuable for a modifier for polymers. It has an especially large modifying effect on the propylene-based polymer (A) used in the above-described propylene-based polymer composition.

Accordingly, the composition (X) of the present invention may be obtained by melt-kneading the pellet (the modifier for thermoplastic polymers) of the present invention, a required amount of the component (A), optional other polymers (excluding the propylene-based polymer (A) and the propylene/ethylene/α-olefin copolymer (B)), and the above optional additives.

The composition (P) of the present invention may be also obtained by kneading the pellet of the present invention, a required amount of component (A), a required amount of the ethylene/α-olefin copolymer (C), optional other polymers (excluding the propylene-based polymer (A), the propylene/ ethylene/α-olefin having 4 to 20 carbon atoms copolymer (B), and the ethylene/α-olefin copolymer (C)), and the above optional additive.

EXAMPLES

Hereinafter, the present invention is specifically described with reference to Examples, but the present invention is not limited by these examples.

Measurement Method of Properties

[Intrinsic Viscosity [η]]

The intrinsic viscosity was measured at 135° C. using decalin as a solvent. That is, approximately 20 mg of a weighed polymer in a powder, pellet, or resin block form was dissolved in 15 ml of decalin and the specific viscosity $\eta_{sp}$ of decalin solution is measured in an oil bath at 135° C. After diluting the decalin solution by adding 5 ml of decalin, the specific viscosity $\eta_{sp}$ is measured in the same way. The dilution operation is further repeated two times, and the $\eta_{sp}/C$ value is extrapolated to the concentration (C) of zero to obtain the intrinsic viscosity (see the following equation).

$$[\eta]=\lim(\eta_{sp}/C)(C\to 0)$$

[Molecular Weight Distribution (Mw/Mn)]

The molecular weight distribution (Mw/Mn) was measured as follows by using gel permeation chromatograph, Alliance GPC-2000 Model manufactured by Waters Corporation. Two TSK gel GNH6-HT columns and two TSK gel GNH6-HTL columns (each 7.5 mm in diameter×300 mm in length) were used, the column temperature was set at 140° C., the mobile phase was o-dichlorobenzene (Wako Pure Chemical Industries, Ltd.) containing 0.025 wt % of BHT (Takeda Pharmaceutical Company Limited) as an antioxidant, the flow rate was 1.0 ml/min, the sample concentration was 15 mg/10 mL, the sample injection volume was 500 μl, and a differential refractometer was used as a detector. Standard polystyrenes manufactured by Toso Corporation, Ltd. were used for Mw<1000 and Mw>4×10$^6$ and those manufactured by Pressure Company were used for 1000≤Mw≤4×10$^6$.

[Contents of Ethylene, Propylene, and α-Olefin in Polymer]

The contents of ethylene, propylene, and an α-olefin were quantified as follows with a JNM GX-500 Model NMR spectrometer manufactured by JEOL Ltd. A solution was prepared by dissolving 0.35 g of a sample in 2.0 ml of hexachlorobutadiene with heating and filtered though a glass filer (G2), and 0.5 ml of deuterated benzene was added to the filtrate, and the solution was put in a NMR tube of 10 mm in internal diameter. The $^{13}$C-NMR spectrum was recorded at 120° C. with an accumulation times not less than 10,000. The contents of ethylene, propylene, and an α-olefin were determined based on the $^{13}$C-NMR spectrum obtained.

[Melting Point (Tm) and Heat of Fusion (ΔH) of Component (A)]

Approximately 5 mg of a weighed sample was loaded on a DSC Pyris1 or DSC7 manufactured by PerkinElmer, Inc. under a nitrogen atmosphere and the sample was heated to 200° C., maintained at 200° C. for 10 minutes, cooled to 30° C. at 10° C./min, maintained at 30° C. for 5 minutes. The sample was then heated to 200° C. at 10° C./min to calculate the melting point based on the peak top of the crystal melting peak and the heat of fusion based on the integration value of the peak.

[Glass Transition Temperature (Tg) and Melting Point (Tm) of the Component (B)]

Approximately 5 mg of a weighed sample was put in an aluminum pan for DSC, and the sample temperature was raised to 200° C. at 100° C./min, maintained at 200° C. for 5 minutes, lowered to −150° C. at 10° C./min with a DSC manufactured by Seiko Instruments Inc. The temperature was then raised to 200° C. at 10° C./min to obtain an endothermic curve, from which Tg and Tm were determined.

[Method of Preparing Pressed Sheet for Measurements]

The composition was molded under 10 MPa into a pressed sheet with a hydraulic heat press machine manufactured by Shinto Metal Industries, Ltd. whose temperature had been set at 200° C. In case of a sheet of 0.5 to 3 mm in thickness (spacer shape: capable of taking 4 sheets of 80 mm square and 0.5 to 3 mm in thickness from a plate of 240 mm square and 2 mm in thickness), a test sample was prepared by preheating the composition for 5 to 7 minutes and pressing for 1 to 2 minutes under 10 MPa followed by cooling the sheet under 10 MPa for approximately 5 minutes with another hydraulic heat press machine manufactured by Shinto Metal Industries, Ltd. whose temperature had been set at 20° C. A brass plate of 5 mm in thickness was used as a hot plate. A sample prepared by the above method was used for evaluating the properties.

[Tensile Modulus, M100, TS (Tensile Strength at Break), EL (Tensile Elongation at Break)]

In accordance with JIS K6301, a JIS #3-dumbbell specimen was punched out from a 1 mm-thick pressed sheet to use as a test sample. The properties of the sample were measured at a span distance of 30 mm and a tensile speed of 30 mm/min at 23° C.

[Izod Impact Strength]

In accordance with ASTM D-256, a specimen with dimensions of 12.7 mm (width)×3.2 mm (thickness)×64 mm (length) was punched out from a 3-mm thick pressed sheet and a notch was provided by machining, and The Izod impact strength was measured at 0° C. with this specimen.

[Softening Point Measured by TMA]

The softening point (° C.) was determined from a TMA curve with a specimen of 1 mm-thick pressed sheet while applying a pressure of 2 kgf/cm$^2$ on a 1.8-mmΦ flat indenter and heating at 5° C./min in accordance with JIS K7196.

Preparation Method of Test Sample for Internal Haze

The test sample was molded using an injection molding machine IS-55 manufactured by Toshiba Corporation at a resin temperature of 200° C., under an injection pressure of 1000 kgf/cm$^2$, at a mold temperature of 40° C. A rectangular plate with a thickness of 2 mm, a length of 120 mm, and a width of 130 mm was prepared.

[Internal Haze (%)]

The internal haze was measured by using a 1-mm thick pressed sheet or a 2-mm thick injection-molded specimen with a digital hazemeter NDH-20D manufactured by Nippon Denshoku Industries Co., Ltd. in accordance with JIS K7105. For a composition with a tensile modulus less than 700 MPa, said 1-mm thick pressed sheet was used for measurement of the internal haze, while for a composition with a tensile modulus not less than 700 MPa, said 2-mm thick injection-molded rectangular plate was used.

[Internal Haze (%) After Annealing at 120° C.]

The 1-mm thick pressed sheet or 2-mm thick injection-molded specimen used for the measurement of internal haze was annealed in an oven at 120° C. for 30 minutes and then the internal haze was measured by a digital hazemeter "NDH-20D" manufactured by Nippon Denshoku Industries Co., Ltd.

[Measurement of Isotactic Pentad Fraction (Mmmm) and Isotactic Triad Fraction (Mm)]

The $^{13}$C-NMR spectrum (tetramethylsilane standard) of a hexachlorobutadiene solution of a sample was measured and the proportion (%) of the area of peaks observed in 21.0 to 21.9 ppm based on the total area of peaks observed in 19.5 to 21.9 ppm (100%) was determined.

[Preparation Method of Sample for Pellet Blocking]

The propylene-based polymer (A), the propylene/ethylene/α-olefin copolymer (B), 0.1 parts by weight of tri(2,4-di-t-butylphenyl)phosphate as a secondary antioxidant, 0.1 parts by weight of n-octadecyl 3-(4'-hydroxy-3',5'-di-t-butylphenyl)propionate as a heat resistant stabilizer, and 0.05 parts by weight of calcium stearate as a hydrochloric acid absorber were blended and the blend was kneaded using a twin-screw extruder BT-30 (30 mmΦ, L/D=46, rotation in the same direction) manufactured by Plabor Co, Ltd. at a preset temperature of 200° C. with a resin extrusion speed of 60 g/min at a revolution of 200 rpm to prepare pellets.

[Pellet Blocking Test]

120 g of said pellets are put in a plastic bag with a zipper closure sized 120 mm×85 mm×0.04 mm. The zipper of the bag was closed and a load of 5 kg was applied to the bag in an atmosphere at 50° C. for 3 days. The zipper was opened to visually examine the blocking of pellets. The evaluation criteria were as follows:

AA: When the zipper is opened and the plastic bag is tilted, pellets come out without blocking one another.

BB: When the zipper is opened and the plastic bag is tilted, a mass of 3 to 10 pellets adhered to one another comes out.

CC: When the zipper is opened and the plastic bag is tilted, no pellets come out because they block one another.

Synthesis Example 1

Synthesis of diphenylmethylene(3-tert-butyl-5-methylcyclopentadienyl)(2,7-di-tert-butylfluorenyl)zirconium dichloride (1) Synthesis of (3-tert-butyl-5-methyl-cyclopentadienyl)(2,7-di-tert-butyl-fluorenyl)diphenylmethane A 200-ml three-necked flask equipped with a magnetic stirring bar and a three-way cock was sufficiently purged with nitrogen, and then 2.53 g (9.10 mmol) of 2,7-di-tert-butylfluorene was dissolved in 70 ml of dehydrated diethyl ether under a nitrogen atmosphere. To this solution was added 6.4 ml of a hexane solution of n-butyllithium (1.56 M: 9.98 mmol) gradually dropwise in an ice bath, and the resultant solution was stirred overnight at room temperature. To the reaction solution was added a solution prepared by dissolving 3.01 g (10.0 mmol) of 3-tert-butyl-1-methyl-6,6-diphenylfulvene in 40 ml of dehydrated diethyl ether, and the solution was stirred under reflux for 7 days. The reaction mixture was poured into 100 ml of hydrochloric acid (1 N), diethyl ether was added to separate an organic layer, and the organic layer was washed with saturated sodium hydrogen carbonate aqueous solution and saturated brine and dried over anhydrous magnesium sulfate. The drying agent was filtered off and the solvent was distilled off from the filtrate under reduced pressure to obtain a reddish-brown liquid, which was purified with column chromatography using 180 g of silica gel (developing solvent: n-hexane). The developing solvent was distilled off under reduced pressure, and the residue was recrystallized from methanol and dried under reduced pressure to yield 1.65 g (2.85 mmol) of the target compound as pale yellow solid (Yield: 31%).

(2) Synthesis of diphenylmethylene(3-tert-butyl-5-methylcyclopentadienyl)(2,7-di-tert-butylfluorenyl) zirconium dichloride A 50-ml Schlenk flask equipped with a magnetic stirring bar and a three-way cock was sufficiently purged with nitrogen, and then 0.502 g of (3-tert-butyl-5-methylcyclopentadienyl)(2,7-di-tert-butylfluorenyl)diphenylmethane (0.868 mmol) was dissolved in 30 ml of dehydrated diethyl ether under a nitrogen atmosphere. To this solution was added 1.40 ml of a hexane solution of n-butyllithium (1.56 M: 2.18 mmol) gradually dropwise in an ice bath, and the resultant was stirred overnight at room temperature. The solvent was distilled off under reduced pressure and the resultant orange solid was washed with dehydrated pentane and dried under reduced pressure to obtain orange solid. To this solid was added 30 ml of dehydrated diethyl ether, the solution was sufficiently chilled on a dry ice/methanol bath, and here was added 0.206 g of zirconium tetrachloride (0.882 mmol). After the mixture was stirred for 2 days while gradually warming to room temperature, the solvent was distilled off under reduced pressure. The reaction mixture was moved into a glove box and re-slurried with dehydrated hexane. The resultant slurry was filtered through a glass filter filled with diatomaceous earth. The filtrate was concentrated to give solid, and the solid was washed with a small amount of dehydrated toluene and dried under reduced pressure to obtain 140 mg (0.189 mmol) of the target compound as pink solid (Yield: 22%). The solid was identified based on $^1$H-NMR and FD-mass spectra. The measurement results are shown below.

$^1$H-NMR spectrum (CDCl$_3$, TMS standard): δ/ppm 0.99 (s, 9H), 1.09 (s, 9H), 1.12 (s, 9H), 1.91 (s, 3H), 5.65 (d, 1H), 6.14 (d, 1H), 6.23 (m, 1H), 7.03 (m, 1H), 7.18-7.46 (m, 6H), 7.54-7.69 (m, 2H), 7.80-7.83 (m, 1H), 7.95-8.02 (m, 2H)

FD-mass spectrum: M/z=738 (M$^+$)

Synthesis Example 2

Synthesis of diphenylmethylene(3-tert-butyl-5-ethylcyclopentadienyl)(2,7-di-tert-butylfluorenyl)zirconium dichloride (1) 1-Ethyl-3-tert-butylcyclopentadiene A 300-ml three-necked flask equipped with a magnetic stirring bar and a three-way cock was charged with 200 ml of dehydrated diethyl ether and 52 ml (154 mmol) of a 3.0-M diethyl ether solution of ethyl magnesium bromide under a nitrogen atmosphere. To the solution was added dropwise 17.8 g (129 mmol) of 3-tert-butylcyclopentenone over 1 hour in an ice bath. After stirring at room temperature for 20 hours, the reaction solution was poured into 100 ml of 2N hydrochloric acid. The organic layer was separated and the aqueous layer was subjected to extraction with 50 ml of ether twice. The combined organic layer was washed with saturated sodium hydrogen carbonate aqueous solution twice, with water twice, and with saturated brine twice. After drying over magnesium sulfate, the solvent was distilled off. The residue was purified by column chromatography to obtain 20.2 g (GC purity: 75%) of pale yellow transparent liquid. The yield was 78%. The identification was carried out by $^1$H-NMR spectrum. The measurement results are shown below.

$^1$H-NMR spectrum (270 MHz, CDCl$_3$, TMS standard): δ 6.19+6.05+5.81+5.77 (m+m+m+m, 2H), 2.91+2.85 (m+m, 2H), 2.48-2.27 (m, 2H), 1.15-1.08 (s+s+m, 12H)

(2) Synthesis of 3-tert-butyl-1-ethyl-6,6-diphenylfulvene

To a 300-ml three-necked flask equipped with a magnetic stirring bar and a three-way cock was charged with 5.11 g (23.9 mmol) of 1-ethyl-3-tert-butylcyclopentadiene (GC purity 75%) and 150 ml of THF under nitrogen atmosphere.

To the solution was added, slowly and dropwise, 16 ml of a hexane solution of n-butyllithium (1.56 M: 25.2 mmol) in a dry ice/methanol bath, and the mixture was stirred at room temperature for 20 hours. To the resultant reaction liquid were added 3.1 ml (28.8 mmol) of 1,3-dimethyl-2-imidazolidinone and then 5.3 g (28.8 mmol) of benzophenone, and the solution was stirred under reflux for 48 hours. The reaction solution was poured into 100 ml of 2N hydrochloric acid. The organic layer was separated and the aqueous layer was subjected to extraction with 50 ml of hexane twice. The combined organic layer was washed with saturated sodium hydrogen carbonate aqueous solution, water, and saturated brine. After drying over magnesium sulfate, the solvent was distilled off. The residue was purified by column chromatography to obtain 4.2 g of an orange solid. The yield was 56%. The identification was carried out by $^1$H-NMR spectrum. The measurement results are shown below.

$^1$H-NMR spectrum (270 MHz, CDCl$_3$, TMS standard): δ 7.2-7.4 (m, 10H), 6.3 (m, 1H), 5.7 (m, 1H), 1.70+1.85 (q, 2H), 1.15 (s, 9H), 0.85 (t, 3H)

(3) Synthesis of diphenylmethylene(3-tert-butyl-5-ethylcyclopentadienyl)(2,7-di-tert-butylfluorenyl)

A 200-ml three-necked flask equipped with a magnetic stirring bar and a three-way cock was sufficiently purged with nitrogen, and then 3.8 g (13.7 mmol) of 2,7-di-tert-butylfluorene was dissolved in 80 ml of dehydrated diethyl ether under a nitrogen atmosphere. To this solution was added a 9.2 ml of a hexane solution of n-butyllithium (1.56 M: 14.3 mmol) gradually and dropwise in an ice bath, and the mixture was stirred at room temperature for 100 hours. To the resultant reaction solution was added 4.5 g (14.3 mmol) of 3-tert-butyl-1-ethyl-6,6-diphenylfulvene and the solution was stirred under reflux for 30 hours. After the reaction solution was poured into 100 ml of 2N hydrochloric acid in an ice bath, diethyl ether was added, the organic layer was separated, and the aqueous layer was subjected to extraction with 50 ml of diethyl ether twice. The combined organic layer was washed with saturated sodium hydrogen carbonate aqueous solution, water, and saturated brine, dried over magnesium sulfate, and evaporated up. The residue was purified by column chromatography to obtain 4.2 g of white solid. The yield was 53%. The identification was carried out by FD-mass spectrometry (FD-MS). The measurement result is shown below.

FD-MS: m/z=592 (M$^+$)

(4) Synthesis of diphenylmethylene(3-tert-butyl-5-ethylcyclopentadienyl)(2,7-di-tert-butylfluorenyl) zirconium dichloride A 100-ml Schlenk flask equipped with a magnetic stirrer chip and a three-way cock was sufficiently purged with nitrogen and then 1.0 g (1.68 mmol) of diphenylmethylene(3-tert-butyl-5-ethylcyclopentadienyl)(2,7-di-tert-butylfluorenyl) was dissolved in 40 ml of dehydrated diethyl ether under a nitrogen atmosphere. To this solution was added, gradually and dropwise, 2.2 ml of a hexane solution of n-butyllithium (1.56 M: 3.4 mmol) in an ice bath, and the mixture was stirred at room temperature for 28 hours. The reaction solution was sufficiently chilled in a dry ice/methanol bath and then 0.39 g (1.68 mmol) of zirconium tetrachloride was added. After the solution was stirred for 48 hours while gradually warming to room temperature, the solvent was distilled off under reduced pressure. The reaction mixture was reslurried with hexane and the slurry was filtered through a glass filter filled with diatomaceous earth. The brown solid on the filter was subjected to extraction with a small amount of dichloromethane and filtered. The hexane solution and the dichloromethane solution were evaporated up under reduced pressure, and the dark orange solids were washed with a small amount of pentane and diethyl ether, respectively, and dried under reduced pressure to obtain 140 mg (0.186 mmol) of the target compound as orange solid. The identification was carried out by $^1$H-NMR and FD-mass spectra. The measurement results are shown below.

$^1$H-NMR spectrum (270 MHz, CDCl$_3$, TMS standard): δ 7.90-8.07 (m, 5H), 7.75 (m, 1H), 7.15-7.60 (m, 8H), 6.93 (m, 1H), 6.15-6.25 (m, 2H), 5.6 (d, 1H), 2.05+2.25 (q, 2H), 0.95-1.15 (s+t+s, 30H)

FD-MS: m/z=752 (M$^+$)

Polymerization Example 1

Synthesis of Propylene/Ethylene/Butene Copolymer (B-1)

A 4000-ml polymerization vessel that had been sufficiently purged with nitrogen was charged with 1834 ml of dry hexane, 100 g of 1-butene, and triisobutylaluminum (1.0 mmol) at room temperature, and then the temperature in the polymerization vessel was increased to 55° C. and propylene was introduced so that the pressure in the system was raised to 0.58 MPa and subsequently ethylene was introduced to adjust the pressure in the system to 0.75 MPa. Next, to the polymerization vessel was added a toluene solution in which 0.001 mmol of diphenylmethylene(3-tert-butyl-5-ethylcyclopentadienyl)(2,7-di-tert-butylfluorenyl)zirconium dichloride synthesized in Synthesis Example 2 had been brought into contact with 0.3 mmol (relative to aluminum) of methylaluminoxane (manufactured by Tosoh Finechem Corporation). The polymerization was allowed to proceed for 20 minutes while the internal temperature was kept at 55° C. and ethylene was supplied to maintain the pressure in the system at 0.75 MPa. Then, 20 ml of methanol was added to terminate the polymerization. After the pressure was released, a polymer was precipitated from the polymerization solution in 4 L of methanol and dried under vacuum at 130° C. for 12 hours. The resultant polymer weighed 137.7 g and had an MFR of 0.6 (g/10 min). The properties measured for the polymer obtained are shown in Table 1.

A required amount of the polymer was obtained by repeating this operation and melt-kneaded to use in Examples below.

Polymerization Example 2

Synthesis of Propylene/Ethylene/Butene Copolymer (B-2)

A 4000-ml polymerization vessel that had been sufficiently purged with nitrogen was charged with 1834 ml of dry hexane, 110 g of 1-butene, and triisobutylaluminum (1.0 mmol) at room temperature. The internal temperature in the vessel was increased to 55° C. and propylene was introduced so that the pressure in the system increased to 0.58 MPa and subsequently ethylene was introduced to adjust the pressure in the system to 0.75 MPa. Next, to the polymerization vessel was added a toluene solution in which 0.001 mmol of diphenylmethylene(3-tert-butyl-5-ethylcyclopentadienyl)(2,7-di-tert-butylfluorenyl)zirconium dichloride synthesized in Synthesis Example 2 was brought into contact with 0.3 mmol (relative to aluminum) of methylaluminoxane (manufactured by Tosoh Finechem Corporation). The polymerization was allowed to proceed for 25 minutes while the internal temperature was kept at 55° C. and ethylene was supplied to maintain the pressure in the system at 0.75 MPa. Then, 20 ml of methanol was added to terminate the polymerization. After the pressure was released, a polymer was precipitated from the polymerization solution in 4 L of methanol and dried under vacuum at 130° C. for 12 hours. The resultant polymer weighed 120.2 g and had an MFR of 0.7 (g/10 min). The properties measured for the polymer obtained are shown in Table 1.

A required amount of the polymer was obtained by repeating this operation and melt-kneaded to use in Examples below.

Polymerization Example 3

Synthesis of Propylene/Ethylene/Butene Copolymer (B-3)

A 4000-ml polymerization vessel that had been sufficiently purged with nitrogen was charged with 1834 ml of dry hexane, 120 g of 1-butene, and triisobutylaluminum (1.0 mmol) at room temperature. The internal temperature in the polymerization vessel was increased to 55° C. and propylene was introduced so that the pressure in the system was raised to 0.56 MPa and subsequently ethylene was introduced to adjust the pressure in the system to 0.75 MPa. Next, to the polymerization vessel was added a toluene solution in which 0.001 mmol of diphenylmethylene(3-tert-butyl-5-ethylcyclopentadienyl)(2,7-di-tert-butylfluorenyl)zirconium dichloride synthesized in Synthesis Example 2 had been brought into contact with 0.3 mmol (relative to aluminum) of methylaluminoxane (manufactured by Tosoh Finechem Corporation). The polymerization was allowed to proceed for 20 minutes while the internal temperature was kept at 55° C. and ethylene was supplied to maintain the pressure in the system at 0.75 MPa. Then, 20 ml of methanol was added to terminate the polymerization. After the pressure was released, a polymer was precipitated from the polymerization solution in 4 L of methanol and dried under vacuum at 130° C. for 12 hours. The resultant polymer weighed 137.7 g and had an MFR of 0.6 (g/10 min). The properties measured for the polymer obtained are shown in Table 1.

A required amount of the polymer was obtained by repeating this operation and melt-kneaded to use in Examples below.

Polymerization Example 4

Synthesis of Propylene/Ethylene/Butene Copolymer (B-4)

A 4000-ml polymerization vessel that had been sufficiently purged with nitrogen was charged with 1834 ml of dry hexane, 120 g of 1-butene, and triisobutylaluminum (1.0 mmol) at room temperature. The internal temperature in the polymerization vessel was increased to 60° C. and propylene was introduced so that the pressure in the system was increased to 0.56 MPa and subsequently ethylene was introduced to adjust the pressure in the system to 0.75 MPa. Next, to the polymerization vessel was added a toluene solution in which 0.001 mmol of diphenylmethylene(3-tert-butyl-5-methylcyclopentadienyl)(2,7-di-tert-butylfluorenyl)zirconium dichloride synthesized in Synthesis Example 1 was brought into contact with 0.3 mmol (relative to aluminum) of methylaluminoxane (manufactured by Tosoh Finechem Corporation). The polymerization was allowed to proceed for 20 minutes while the internal temperature was kept at 60° C. and ethylene was supplied to maintain the pressure in the system at 0.75 MPa. Then, 20 ml of methanol was added to terminate the polymerization. After the pressure was released, a polymer was precipitated from the polymerization solution in 4 L of methanol and dried under vacuum at 130° C. for 12 hours. The resultant polymer weighed 102.5 g and had an MFR of 7.1 (g/10 min). The properties measured for the polymer obtained are shown in Table 1.

A required amount of the polymer was obtained by repeating this operation and melt-kneaded to use in Examples below.

TABLE 1

| | | | Propylene-based Polymer (A) | | | | Propylene/Ethylene/α-Olefin Polymer (B) | | | | Ethylene/α-Olefin Polymer | | |
|---|---|---|---|---|---|---|---|---|---|---|---|---|---|
| | | | (A-1) | (A-2) | (A-3) | (A-4) | (B-1) | (B-2) | (B-3) | (B-4) | (C-1) | (C-2) | (C-3) |
| Composition | (a) Propylene unit | (mol %) | 100.0 | 100.0 | 95.2 | 93.4 | 80.4 | 74.9 | 76.4 | 68.0 | 0.0 | 0.0 | 0.0 |
| | (b) Ethylene unit | (mol %) | 0.0 | 0.0 | 3.3 | 6.6 | 17.0 | 18.5 | 13.0 | 13.0 | 90.0 | 85.5 | 85.5 |
| | (c) α-Olefin unit | (mol %) | 0.0 | 0.0 | 1.5 | 0.0 | 2.6 | 6.6 | 10.6 | 19.0 | 10.0 | 14.5 | 14.5 |
| B-value | | | — | — | — | — | 1.1 | 1.0 | 1.1 | 1.1 | | | |
| mmmm | | (%) | 96.6 | 98.5 | — | — | — | — | — | — | — | — | — |
| mm | | (%) | — | — | — | — | 92.0 | 91.2 | 91.8 | 92.1 | — | — | — |
| MFR | | (g/10 min) | 24.9 | 55.3 | 7.3 | 0.5 | 0.6 | 0.7 | 0.6 | 7.0 | 3.9 | 4.0 | 0.5 |
| Mw/Mn | | | — | — | — | — | 2.1 | 2.1 | 2.2 | 2.1 | — | — | — |
| Melting Point Tm | | (° C.) | 161.0 | 166.0 | 138.5 | 137.2 | — | — | — | — | 71.8 | 56.1 | 56.1 |
| ΔH | | (mJ/mg) | 110 | 128 | 76 | 65 | — | — | — | — | 55 | 37 | 37 |
| Tg | | (° C.) | — | — | — | — | −28.8 | −30.0 | −28.8 | −29.0 | −46.9 | −52.8 | −51.8 |
| Tensile modulus | | (MPa) | 1485 | 1937 | 814 | 770 | 15 | 7 | 20 | 3 | 42.1 | 31.1 | 28.8 |
| M100 | | (MPa) | — | — | 18.0 | 15.0 | 2.2 | 0.9 | 2.6 | 0.8 | 5.2 | 4.4 | 4.5 |
| EL | | (%) | 11 | 5 | 910 | 1091 | 960 | 1104 | 903 | 1050 | 1038 | 1148 | 983 |
| TS | | (MPa) | 39.0 | 44.1 | 25.0 | 23.5 | 23.0 | 7.5 | 21.4 | 0.8 | 32.7 | 37.5 | 45.6 |
| Internal Haze (1 mmt) | | (%) | 89 | 78 | 71 | 67 | 2 | 1 | 2 | 2 | 5 | 5 | 4 |

The details of propylene-based polymers (A-1) to (A-4) and ethylene/α-olefin-based polymers (C-1) to (C-3) in Table 1 are as follows.

(A-1): Prime Polypro J106 (Manufactured by Prime Polymer Co., Ltd.)

(A-2): Prime Polypro J139 (Manufactured by Prime Polymer Co., Ltd.)

(A-3): Prime Polypro F327 (Manufactured by Prime Polymer Co., Ltd.)

(A-4): Prime Polypro B241 (Manufactured by Prime Polymer Co., Ltd.)

(C-1): Tafmer A4085 (Manufactured by Mitsui Chemicals, Inc.)

(C-2): Tafmer A4070 (Manufactured by Mitsui Chemicals, Inc.)

(C-3): Tafmer A0585X (Manufactured by Mitsui Chemicals, Inc.)

Example X1

80 parts by weight of propylene-based polymer (A-1) (MFR: 25 g/10 min) and 20 parts by weight of propylene/ethylene/butene copolymer (B-1) obtained in Polymerization Example 1 (100 parts by weight in total) are blended with 0.1 parts by weight of tri(2,4-di-t-butylphenyl)phosphate as a secondary antioxidant, 0.1 parts by weight of n-octadecyl 3-(4'-hydroxy-3',5'-di-t-butylphenyl)propionate as a heat resistant stabilizer, and 0.05 parts by weight of calcium stearate as a hydrochloric acid absorber. Further, 0.3 parts by weight of a phosphate ester-type nucleating agent (ADK STAB NA-21, manufactured by Asahi Denka Co., Ltd.) was blended into 100 parts by weight of said composition, and then the resultant was kneaded using a twin-screw extruder BT-30 (30 mmΦ, L/D=46, rotation in the same direction) manufactured by Plabor Co., Ltd. under the conditions of a preset temperature of 200° C., a resin extrusion speed of 60 g/min, and a revolution of 200 rpm to obtain a propylene-based polymer composition. Properties thereof are shown in Table 2. The composition is excellent in balance among transparency, impact resistance and rigidity.

Example X2

80 parts by weight of propylene-based polymer (A-2) (MFR: 55 g/10 min) and 20 parts by weight of propylene/ethylene/butene copolymer (B-2) obtained in Polymerization Example 2 (100 parts by weight in total) were blended with the secondary antioxidant, the heat resistant stabilizer, and the hydrochloric acid absorber in the same way as in Example X1. Further, 100 parts by weight of said composition was blended with 0.3 parts by weight of a phosphate ester-type nucleating agent (ADK STAB NA-21, manufactured by Asahi Denka Co., Ltd.), and then the resultant was kneaded under the same conditions as in Example X1 to obtain a propylene-based polymer composition. Properties thereof are shown in Table 2. The composition is excellent in balance among transparency, impact resistance, and rigidity.

Example X3

75 parts by weight of propylene-based polymer (A-2) (MFR: 55 g/10 min) and 25 parts by weight of propylene/ethylene/butene copolymer (B-2) obtained in Polymerization Example 2 (100 parts by weight in total) were blended with the secondary antioxidant, the heat resistant stabilizer, and the hydrochloric acid absorber in the same way as in Example X1. Further, 100 parts by weight of said composition was blended with 0.3 parts by weight of a phosphate ester-type nucleating agent (ADK STAB NA-21, manufactured by Asahi Denka Co., Ltd.), and then the resultant was kneaded under the same conditions as in Example X1 to obtain a propylene-based polymer composition. Properties thereof are shown in Table 2. The composition is excellent in balance among transparency, impact resistance, and rigidity.

Example X4

35 parts by weight of propylene-based polymer (A-3) (MFR: 7.3 g/10 min), 35 parts by weight of propylene-based polymer (A-4) (MFR: 0.5 g/10 min), and 30 parts by weight of propylene/ethylene/butene copolymer (B-2) obtained in Polymerization Example 2 (100 parts by weight in total) were blended with the secondary antioxidant, the heat resistant stabilizer, and the hydrochloric acid absorber in the same way as in Example X1, and the resultant was kneaded under the same conditions as in Example X1 to obtain a propylene-based polymer composition. Properties thereof are shown in Table 2. Properties thereof are shown in Table 2. The composition is excellent in balance among transparency, impact resistance, and flexibility.

Example X5

30 parts by weight of propylene-based polymer (A-3) (MFR: 7.3 g/10 min), 30 parts by weight of propylene-based polymer (A-4) (MFR: 0.5 g/10 min) and 40 parts by weight of propylene/ethylene/butene copolymer (B-1) obtained in Polymerization Example 1 (100 parts by weight in total) were blended with the secondary antioxidant, the heat resistant stabilizer, and the hydrochloric acid absorber in the same way as in Example X1, and the resultant was kneaded under the same conditions as in Example X1 to obtain a propylene-based polymer composition. Properties thereof are shown in Table 2. Properties thereof are shown in Table 2. The composition is excellent in balance among transparency, impact resistance, and flexibility.

Example X6

30 parts by weight of propylene-based polymer (A-3) (MFR: 7.3 g/10 min), 30 parts by weight of propylene-based polymer (A-4) (MFR: 0.5 g/10 min), and 40 parts by weight of propylene/ethylene/butene copolymer (B-2) obtained in Polymerization Example 2 (100 parts by weight in total) were blended with the secondary antioxidant, the heat resistant stabilizer, and the hydrochloric acid absorber in the same way as in Example X1, and the resultant was kneaded under the same conditions as in Example X1 to obtain a propylene-based polymer composition. Properties thereof are shown in Table 2. Properties thereof are shown in Table 2. The composition is excellent in balance among transparency, impact resistance, and flexibility.

Comparative Example X1

80 parts by weight of propylene-based polymer (A-1) (MFR: 25 g/1 min) and 20 parts by weight of propylene/ethylene/butene copolymer (B-3) obtained in Polymerization Example 3 (100 parts by weight in total) were blended with the secondary antioxidant, the heat resistant stabilizer, and the hydrochloric acid absorber in the same way as in Example X1. Further, 100 parts by weight of said composition was blended with 0.3 parts by weight of a phosphate ester-type nucleating agent (ADK STAB NA-21, manufactured by Asahi Denka Co., Ltd.), and the resultant was kneaded under the same conditions as in Example X1 to obtain a propylene-based polymer composition. Properties thereof are shown in Table 2. The composition is inferior in impact resistance and its Izod impact strength is almost the same as that of Comparative Example X5 (random polypropylene) described later.

Comparative Example X2

80 parts by weight of propylene-based polymer (A-2) (MFR: 55 g/10 min) and 20 parts by weight of propylene/ethylene/butene copolymer (B-4) obtained in Polymerization Example 4 (100 parts by weight in total) were blended with the secondary antioxidant, the heat resistant stabilizer, and the hydrochloric acid absorber in the same way as in Example X1. Further, 100 parts by weight of said composition was blended with 0.3 parts by weight of a phosphate ester-type nucleating agent (ADK STAB NA-21, manufactured by Asahi Denka Co., Ltd.), and the resultant was kneaded under the same conditions as in Example X1 to obtain a propylene-based polymer composition. Properties thereof are shown in Table 2. The composition is inferior in impact resistance and its Izod impact strength is almost the same as that of Comparative Example X5 (random polypropylene) described later.

Comparative Example X3

80 parts by weight of propylene-based polymer (A-1) (MFR: 25 g/10 min) and 20 parts by weight of ethylene/butene copolymer (C-2) (100 parts by weight in total) were blended with the secondary antioxidant, the heat resistant stabilizer, and the hydrochloric acid absorber in the same way as in Example X1. Further, 100 parts by weight of said composition was blended with 0.3 parts by weight of a phosphate ester-type nucleating agent (ADK STAB NA-21, manufactured by Asahi Denka Co., Ltd.), and the resultant was kneaded under the same conditions as in Example X1 to obtain a propylene-based polymer composition. Properties thereof are shown in Table 2. The composition is inferior in transparency.

Comparative Example X4

10 parts by weight of propylene-based polymer (A-3) (MFR: 7.3 g/10 min) and 90 parts by weight of propylene/ethylene/butene copolymer (B-1) obtained in Polymerization Example 1 (100 parts by weight in total) were blended with the secondary antioxidant, the heat resistant stabilizer, and the hydrochloric acid absorber in the same way as in Example X1, and the resultant was kneaded by a twin-screw extruder at 200° C. to obtain a propylene-based polymer composition. Properties thereof are shown in Table 2. The composition is inferior in heat resistance.

Comparative Example X5

The properties of propylene-based polymer (A-3) (MFR: 7.3 g/10 min) are shown in Table 2. It is inferior in impact resistance and transparency.

TABLE 2

| | | Examples | | | | | | Comparative Examples | | | | |
|---|---|---|---|---|---|---|---|---|---|---|---|---|
| | | X1 | X2 | X3 | X4 | X5 | X6 | X1 | X2 | X3 | X4 | X5 |
| Polymer (A) | | (A-1) | (A-2) | (A-2) | (A-3)/(A-4) | (A-3)/(A-4) | (A-3)/(A-4) | (A-1) | (A-2) | (A-1) | (A-3) | (A-3) |
| Copolymer (B) or (C) | | (B-1) | (B-2) | (B-2) | (B-2) | (B-1) | (B-2) | (B-3) | (B-4) | (C-2) | (B-1) | — |
| Ratio (wt %) (A)/(B) or (C) | | 80/20 | 80/20 | 75/25 | 35/35/30 | 30/30/40 | 30/30/40 | 80/20 | 80/20 | 80/20 | 10/90 | 100/0 |
| Tensile modulus | (MPa) | 1029 | 1145 | 945 | 234 | 211 | 160 | 1021 | 1115 | 1250 | 5 | 814 |
| Izod (0° C.) | (J/m) | 37 | 36 | 40 | 855 | 819 | 711 | 21 | 21 | 85 | — | 19 |
| Internal Haze(1 mmt) | (%) | — | — | — | 43 | 46 | 36 | — | — | — | 3 | |
| Internal Haze (2 mmt) | (%) | 64 | 41 | 43 | — | — | — | 38 | 46 | 92 | — | 73 |
| Internal Haze after annealing at 120° C. | (%) | — | — | — | 45 | 50 | 40 | — | — | — | 4 | |
| Internal Haze after annealing at 120° C. | (%) | 67 | 45 | 46 | — | — | — | 42 | 50 | 92 | — | 75 |
| Penetration Temperature (TMA) | (° C.) | 162 | 165 | 165 | 138 | 137 | 137 | 162 | 165 | 162 | 103 | 135 |
| Presence of phase separation structure | | Yes | Yes | Yes | Not Measured | Yes | Yes | No | No | Yes | No | No |
| Dispersion particle size | (μm) | 0.3 | 0.2 | 0.2 | Not Measured | — | — | — | — | 1.5 | — | — |
| Composition (a) Propylene unit | (mol %) | 95.9 | 94.8 | 93.5 | 88.2 | 88.4 | 86.4 | 95.4 | 93.6 | 75.3 | 82.0 | 95.2 |
| (b) Ethylene unit | (mol %) | 3.6 | 3.9 | 4.8 | 9.2 | 10.1 | 10.5 | 2.5 | 2.6 | 21.1 | 15.6 | 3.3 |
| (c) α-Olefin unit | (mol %) | 0.5 | 1.3 | 1.7 | 2.6 | 1.5 | 3.1 | 2.1 | 3.8 | 3.6 | 2.4 | 1.5 |

Example X7

20 parts by weight of propylene-based polymer (A-2) (MFR: 55 g/10 min) and 80 parts by weight of propylene/ethylene/butene copolymer (B-2) obtained in Polymerization Example 2 (100 parts by weight in total) were blended with the secondary antioxidant, the heat resistant stabilizer, and the hydrochloric acid absorber in the same way as in Example X1, and the resultant was kneaded under the same conditions as in Example X1 to obtain a propylene-based polymer composition pellet (B-5). The results of blocking test of the pellet are shown in Table 3.

Example X8

20 parts by weight of propylene-based polymer (A-3) (MFR: 7.3 g/10 min) and 80 parts by weight of propylene/ ethylene/butene copolymer (B-2) obtained in Polymerization Example 2 (100 parts by weight in total) were blended with the secondary antioxidant, the heat resistant stabilizer, and the hydrochloric acid absorber in the same way as in Example X1, and the resultant was kneaded under the same conditions as in Example X1 to obtain a propylene-based polymer composition pellet (B-6). The results of blocking test of the pellet are shown in Table 3.

Comparative Example X6

100 parts by weight of propylene/ethylene/butene copolymer (B-2) obtained in Polymerization Example 2 was blended with the secondary antioxidant, the heat resistant stabilizer, and the hydrochloric acid absorber in the same way as in Example X1, and the resultant was kneaded under the same conditions as in Example X1 to obtain a propylene-based polymer composition pellet. The results of blocking test of the pellet are shown in Table 3.

TABLE 3

|  | Examples | | Comp. Example |
|---|---|---|---|
|  | X7 | X8 | X6 |
| Polymer (A) | (A-2) | (A-3) | — |
| Copolymer (B) | (B-2) | (B-2) | (B-2) |
| Ratio (wt %) of (A)/(B) or (C) | 20/80 | 20/80 | 0/100 |
| Pellet Blacking Test | AA (B-5) | AA (B-6) | CC — |

Example X9

69 parts by weight of propylene-based polymer (A-2) (MFR: 55 g/10 min) and 31 parts by weight of propylene-based polymer composition pellet (B-5) obtained in Example X7 (100 parts by weight in total) were blended with the secondary antioxidant, the heat resistant stabilizer, and the hydrochloric acid absorber in the same way as in Example X1. Further, 100 parts by weight of said composition was blended with 0.3 parts by weight of a phosphate ester-type nucleating agent (ADK STAB NA-21, manufactured by Asahi Denka Co., Ltd.), and the resultant was kneaded under the same conditions as in Example X1 to obtain a propylene-based polymer composition. Properties thereof are shown in Table 4. The composition exhibits properties similar to those in Example X2.

Example X10

20 parts by weight of propylene-based polymer (A-3) (MFR: 7.3 g/10 min), 30 parts by weight of propylene-based polymer (A-4) (MFR: 0.5), and 50 parts by weight of propylene-based polymer composition pellet (B-6) obtained in Example X8 (100 parts by weight in total) were blended with the secondary antioxidant, the heat resistant stabilizer, and the hydrochloric acid absorber in the same way as in Example X1, and the resultant was kneaded under the same conditions as in Example X1 to obtain a propylene-based polymer composition. Properties thereof are shown in Table 4. The composition exhibits properties similar to those in Example X6.

Example X11

A propylene-based polymer composition was obtained by the same method as in Example 2 except that the nucleating agent in Example 2 was replaced by the nucleating agent below.

A dibenzylidenesorbitol-type nucleating agent, Gelall Md., manufactured by New Japan Chemical Co., Ltd. (FM=1120 MPa, Izod=50 J/m, Internal Haze=34, Haze after annealing=38)

TABLE 4

|  |  | Examples | |
|---|---|---|---|
|  |  | X9 | X10 |
| Polymer (A) |  | (A-2) | (A-3)/(A-4) |
| Copolymer (B) |  | (B-5) | (B-6) |
| Ratio (wt %) (A)/(B) or (C) |  | 69/31 | 20/30/50 |
| Tensile modulus | (MPa) | 930 | 155 |
| Izod (0° C.) | (J/m) | 41 | 720 |
| Internal Haze (1 mmt) | (%) | — | 35 |
| Internal Haze (2 mmt) | (%) | 42 | — |
| Internal Haze after annealing at 120° C. | (%) | — | 39 |
| Internal Haze after annealing at 120° C. | (%) | 44 | — |
| Probe penetration temperature (TMA) | (° C.) | 165 | 137 |
| Presence of phase separation structure |  | Yes | Yes |
| Dispersion particle size or Characteristic length | (μm) | 0.2 | 0.7 |
| Composition (a) Propylene unit | (mol %) | 93.5 | 86.4 |
| (b) Ethylene unit | (mol %) | 4.8 | 10.5 |
| (c) α-Olefin unit | (mol %) | 1.7 | 3.1 |

Example P1

88 parts by weight of propylene polymer (A-1) (MFR: 25 g/10 min) and 12 parts by weight of propylene/ethylene/butene copolymer (B-1) obtained in Polymerization Example 1 (100 parts by weight in total) were blended with 0.1 parts by weight of tri(2,4-di-t-butylphenyl)phosphate as a secondary antioxidant, 0.1 parts by weight of n-octadecyl 3-(4'-hydroxy-3',5'-di-t-butylphenyl)propionate as a heat resistant stabilizer, and 0.05 parts by weight of calcium stearate as a hydrochloric acid absorber. Further, 18 parts by weight of ethylene/butene copolymer (C-1) and 0.3 parts by weight (relative to said composition) of a phosphate ester-type nucleating agent (ADK STAB NA-21, manufactured by Asahi Denka Co., Ltd.) were blended thereinto, and the resultant was kneaded using a twin-screw extruder BT-30 (30 mmΦ, L/D=46, rotation in the same direction) manufactured by Plabor Co., Ltd. under the conditions of a preset temperature of 200° C., a resin extrusion speed of 60 g/min, and a revolution of 200 rpm to obtain a propylene-based polymer composition. Properties are shown in Table 5. The composition is excellent in balance among transparency, impact resistance and rigidity.

Example P2

88 parts by weight of propylene-based polymer (A-2) (MFR: 55 g/10 min) and 12 parts by weight of propylene/ethylene/butene copolymer (B-2) obtained in Polymerization Example 2 (100 parts by weight in total) were blended with the secondary antioxidant, the heat resistant stabilizer, and the hydrochloric acid absorber in the same way as in Example P1. Further, 18 parts by weight of ethylene/butene copolymer (C-1) and 0.3 parts by weight (relative to said composition) of a phosphate ester-type nucleating agent (ADK STAB NA-21, manufactured by Asahi Denka Co., Ltd.) were blended thereinto, and the resultant was kneaded under the same conditions as in Example P1 to obtain a propylene-based polymer composition. Properties thereof are shown in Table 5. The composition is excellent in balance among transparency, impact resistance and rigidity.

Example P3

88 parts by weight of a propylene-based polymer (A-2) (MFR: 55 g/10 min) and 12 parts by weight of propylene/ethylene/butene copolymer (B-2) obtained in Polymerization Example 2 (100 parts by weight in total) were blended with the secondary antioxidant, the heat resistant stabilizer, and the hydrochloric acid absorber in the same way as in Example P1. Further, 25 parts by weight of ethylene/butene copolymer (C-2) and 0.3 parts by weight (relative to said composition) of a phosphate ester-type nucleating agent (ADK STAB NA-21, manufactured by Asahi Denka Co., Ltd.) were blended thereinto, and the resultant was kneaded under the same conditions as in Example P1 to obtain a propylene-based polymer composition. Properties thereof are shown in Table 5. The composition is excellent in balance among transparency, impact resistance, and rigidity.

Example P4

37 parts by weight of propylene-based polymer (A-3) (MFR: 7.3 g/10 min), 37 parts by weight of propylene-based polymer (A-4) (MFR: 0.5 g/10 min), and 26 parts by weight of propylene/ethylene/butene copolymer (B-2) obtained in Polymerization Example 2 (100 parts by weight in total) and 25 parts by weight of ethylene/butene copolymer (C-3), and, in the same way as in Example P1, the secondary antioxidant, the heat resistant stabilizer and the hydrochloric acid absorber were blended, and the resultant was kneaded under the same conditions as in Example P1 to obtain a propylene-based polymer composition. Properties thereof are shown in Table 5. Properties thereof are shown in Table 5. The composition is excellent in balance among transparency, impact resistance, and flexibility.

Example P5

33 parts by weight of propylene-based polymer (A-3) (MFR: 7.3 g/10 min), 33 parts by weight of propylene-based polymer (A-4) (MFR: 0.5 g/10 min), 26 parts by weight of propylene/ethylene/butene copolymer (B-2) obtained in Polymerization Example 2 (100 parts by weight in total) and 67 parts by weight of ethylene/butene copolymer (C-3), and, in the same way as in Example P1, the secondary antioxidant, the heat resistant stabilizer and the hydrochloric acid absorber were blended, and the resultant was kneaded under the same conditions as in Example P1 to obtain a propylene-based polymer composition. Properties thereof are shown in Table 5. Properties thereof are shown in Table 5. The composition is excellent in balance among transparency, impact resistance, and flexibility.

Comparative Example P1

The properties of propylene-based polymer (A-3) (MFR: 7.3 g/10 min) are shown in Table 5. It is inferior in impact resistance and transparency.

Comparative Example P2

100 parts by weight of propylene-based polymer (A-1) (MFR: 25 g/10 min), 20 parts by weight of ethylene/butene copolymer (C-1) and 0.3 parts by weight (relative to said composition) of a phosphate ester-type nucleating agent (ADK STAB NA-21, manufactured by Asahi Denka Co., Ltd.) were blended, and the resultant was kneaded under the same conditions as in Example P1 to obtain a propylene-based polymer composition. Properties thereof are shown in Table 5. The composition is inferior in transparency.

Comparative Example P3

95 parts by weight of propylene-based polymer (A-2) (MFR: 55 g/10 min) and 5 parts by weight of propylene/ethylene/butene copolymer (B-3) obtained in Polymerization Example 2 (100 parts by weight in total) were blended with the secondary antioxidant, the heat resistant stabilizer, and the hydrochloric acid absorber in the same way as in Example P1. Further, 5 parts by weight of ethylene-butene copolymer (C-2) and 0.3 parts by weight (relative to said composition) of a phosphate ester-type nucleating agent (ADK STAB NA-21, manufactured by Asahi Denka Co., Ltd.) were blended thereinto, and the resultant was kneaded under the same conditions as in Example P1 to obtain a propylene-based polymer composition. Properties thereof are shown in Table 5. The composition is inferior in transparency and impact resistance.

Comparative Example P4

100 parts by weight of propylene-based polymer (A-4) (MFR: 0.5 g/10 min) and 67 parts by weight of ethylene/butene copolymer (C-3), and, in the same way as in Example P1, the secondary antioxidant, the heat resistant stabilizer and the hydrochloric acid absorber were blended, and the resultant was kneaded under the same conditions as in Example P1 to obtain a propylene-based polymer composition. Properties thereof are shown in Table 5. The composition is inferior in transparency.

Comparative Example P5

70 parts by weight of propylene-based polymer (A-4) (MFR: 0.5 g/10 min), 30 parts by weight of propylene/ethylene/butene copolymer (B-4) obtained in Polymerization Example 4 (100 parts by weight in total) were blended with the secondary antioxidant, the heat resistant stabilizer, and the hydrochloric acid absorber in the same way as in Example P1, and the resultant was kneaded by a twin-screw extruder at 200° C. to obtain a propylene-based polymer composition. Properties thereof are shown in Table 5. The composition is inferior in impact resistance.

TABLE 5

|  |  | Examples | | | | | Comparative Examples | | | | |
|---|---|---|---|---|---|---|---|---|---|---|---|
|  |  | P1 | P2 | P3 | P4 | P5 | P1 | P2 | P3 | P4 | P5 |
| Polymer (A) |  | (A-1) | (A-2) | (A-2) | (A-3)/(A-4) | (A-3)/(A-4) | (A-3) | (A-2) | (A-2) | (A-4) | (A-4) |
| Copolymer (B) |  | (B-1) | (B-2) | (B-2) | (B-2) | (B-2) | — | — | (B-3) | — | (B-4) |
| Copolymer (C) |  | (C-1) | (C-1) | (C-2) | (C-3) | (C-3) | — | (C-1) | (C-2) | (C-3) | — |
| Ratio (wt %) (A)/(B) or (C) |  | 88/12/88 | 88/12/88 | 88/12/25 | (37/37)/26/25 | (33/33)/34/67 | 100/0/0 | 100/0/20 | 95/5/5 | 100/0/67 | 70/30/0 |
| Tensile modulus | (MPa) | 1115 | 1300 | 1001 | 249 | 142 | 814 | 1562 | 1720 | 450 | 370 |
| Izod (° C.) | (J/m) | 37 | 45 | 375 | 822 | N.B. | 19 | 35 | 22 | 880 | 177 |
| Internal Haze (1 mmt) | (%) | — | — | — | 37 | 37 |  |  | — | 92 | 59 |
| Internal Haze (2 mmt) | (%) | 35 | 45 | 48 | — | — | 73 | 93 | 82 | — | — |
| Internal Haze after annealing at 120° C. | (%) | — | — | — | 38 | 38 |  |  | — | 92 | 62 |
| Internal Haze after annealing at 120° C. | (%) | 38 | 42 | 50 | — | — | 75 | 93 | 85 | — | — |
| Probe Penetration Temperature (TMA) | (° C.) | 166 | 167 | 167 | 138 | 138 | 135 | 167 | 167 | 141 | 141 |
| Composition (a) Propylene unit | (mol %) | 78.7 | 78.2 | 72.3 | 67.7 | 47.4 | 95.2 | 74.6 | 92.7 | 50.3 | 83.5 |
| (b) Ethylene unit | (mol %) | 19.1 | 19.3 | 24.5 | 27.1 | 44.5 | 3.3 | 22.9 | 5.9 | 43.0 | 9.1 |
| (c) α-Olefin unit | (mol %) | 2.2 | 2.5 | 3.2 | 5.2 | 8.1 | 1.5 | 2.5 | 1.4 | 6.7 | 7.4 |

Production Example P1

20 parts by weight of propylene-based polymer (A-2) (MFR: 55 g/10 min), 80 parts by weight of propylene/ethylene/butene copolymer (B-2) obtained in Polymerization Example 2 (100 parts by weight in total) were blended with the secondary antioxidant, the heat resistant stabilizer, and the hydrochloric acid absorber in the same way as in Example P1, and the resultant was kneaded under the same condition as in Example P1 to obtain propylene-based polymer composition pellet (B-5). The results of blocking test for the pellet are shown in Table 6.

Production Example P2

20 parts by weight of propylene-based polymer (A-3) (MFR: 7.3 g/10 min), 80 parts by weight of propylene/ethylene/butene copolymer (B-2) obtained in Polymerization Example 2 (100 parts by weight in total) were blended with the secondary antioxidant, the heat resistant stabilizer, and the hydrochloric acid absorber in the same way as in Example P1, and the resultant was kneaded under the same condition as in Example P1 to obtain propylene-based polymer composition pellet (B-6). The results of blocking test for the pellet are shown in Table 6.

Comparative Production Example P1

100 parts by weight of propylene/ethylene/butene copolymer (B-2) obtained in Polymerization Example 2 was blended with the secondary antioxidant, the heat resistant stabilizer, and the hydrochloric acid absorber in the same way as in Example P1, and the resultant was kneaded under the same condition as in Example P1 to obtain a propylene-based polymer composition pellet. The results of blocking test for the pellet are shown in Table 6.

TABLE 6

|  | Production Examples | | Comp. Production Example |
|---|---|---|---|
|  | P1 | P2 | P1 |
| Polymer (A) | (A-2) | (A-3) | — |
| Copolymer (B) | (B-2) | (B-2) | (B-2) |
| Ratio (Wt %) (A)/(B) or (C) | 20/80 | 20/80 | 0/100 |
| Pellet blocking test | AA | AA | CC |
|  | (B-5) | (B-6) | — |

Example P6

85 parts by weight of propylene-based polymer (A-2) (MFR: 55 g/10 min), 15 parts by weight of propylene-based polymer composition pellet (B-5) obtained in Production Example 1 (100 parts by weight in total), and ethylene-butene copolymer (C-1) were blended with the secondary antioxidant, the heat resistant stabilizer, and the hydrochloric acid absorber in the same way as in Example P1. Further, 0.3 parts by weight (relative to said composition) of a phosphate ester-type nucleating agent (ADK STAB NA-21, manufactured by Asahi Denka Co., Ltd.) were blended thereinto, and the resultant was kneaded under the same conditions as in Example P1 to obtain a propylene-based polymer composition. Properties thereof are shown in Table 7. The composition exhibits properties similar to those in Example P2.

Example P7

31 parts by weight of propylene-based polymer (A-3) (MFR: 7.3 g/10 min), 38 parts by weight of propylene-based polymer (A-4) (MFR: 0.5 g/10 min), 31 parts by weight of propylene-based polymer composition pellet (B-6) obtained in Production Example 2 (100 parts by weight in total), and 25 parts by weight of ethylene/butene copolymer (C-3) were blended with the secondary antioxidant, the heat resistant stabilizer, and the hydrochloric acid absorber in the same way as in Example P1, and the resultant was kneaded under the same conditions as in Example P1 to obtain a propylene-based polymer composition. Properties thereof are shown in Table 7. The composition exhibits properties similar to those in Example P4.

Example P8

37 parts by weight of propylene-based polymer (A-3) (MFR: 7.3 g/10 min), 37 parts by weight of propylene-based polymer (A-4) (MFR: 0.5 g/10 min), 26 parts by weight of propylene/ethylene/butene copolymer (B-2) obtained in Polymerization Example 2 (100 parts by weight in total), and 25 parts by weight of ethylene/butene copolymer (C-4) [EVOLUE SP0510 (MFR(190° C., 2 kg load)=1.0 g/10 min), density=905 kg/m3, comonomer=1-hexene], manufactured by Prime Polymer Co., Ltd.] were blended with the secondary antioxidant, the heat resistant stabilizer, and the hydrochloric acid absorber in the same way as in Example P1, and the resultant was kneaded under the same conditions as in Example P1 to obtain a propylene-based polymer composition. The properties of the propylene-based polymer composition were as follows.

Tensile modulus: 275 MPa
Izod (0° C.): 851 J/m
Internal Haze: 37%
Internal Haze after annealing: 38%
Probe Penetration Temperature (TMA): 138° C.

TABLE 7

|  |  | Examples | |
|  |  | P6 | P7 |
| --- | --- | --- | --- |
| Polymer (A) |  | (A-2) | (A-3)/(A-4) |
| Copolymer (B) |  | (B-5) | (B-6) |
| Copolymer (C) |  | (C-1) | (C-3) |
| Ratio (wt %): (A)/(B) or (C) |  | 85/15/18 | (31/38)/31/25 |
| Tensile Modulus | (MPa) | 128 | 233 |
| Izod (0° C.) | (J/m) | 43 | 833 |
| Internal Haze (1 mmt) | (%) | — | 36 |
| Internal Haze (2 mmt) | (%) | 44 | — |
| Internal Haze after annealing at 120° C. | (%) | — | 37 |
| Internal Haze after annealing at 120° C. | (%) | 45 | — |
| Penetration Temperature (TMA) | (° C.) | 166 | 138 |
| Composition (a) Propylene unit | (mol %) | 78.2 | 67.7 |
| (b) Ethylene unit | (mol %) | 19.3 | 27.1 |
| (c) α-Olefin unit | (mol %) | 2.5 | 5.2 |

A comparison between Examples P1 to 5 and Comparative Example P3 particularly shows that, among the present invention, more preferable is polyethylene-based polymer composition (P) that contains 41 to 95 parts by weight of the propylene-based polymer (A), 59 to 5 parts by weight (provided that the total of (A) and (B) is 100 parts by weight) of the propylene/ethylene/α-olefin copolymer (B) containing 84.0 to 50.0 mol % of constitutional units derived from propylene, 15.0 to 30.0 mol % of constitutional units derived from ethylene, and 1.0 to 10.0 mol % of constitutional units derived from an α-olefin having 4 to 20 carbon atoms; and the ethylene/α-olefin copolymer (C) containing 50 to 99 mol % of constitutional units derived from ethylene and 1 to 50 mol % of constitutional units derived from an α-olefin having 3 to 20 carbon atoms (provided that the total of ethylene and the α-olefin is 100 mol %) in an amount of 5 to 95 parts by weight relative to 100 parts by weight of the total of (A) and (B).

INDUSTRIAL APPLICABILITY

The polypropylene-based polymer composition of the present invention is excellent in transparency, low-temperature impact resistance, and mechanical properties (flexibility or rigidity, etc.) and also excellent in heat resistance. The molded article of the present invention is excellent in transparency, low-temperature impact resistance, flexibility, and the like and also excellent in heat resistance.

The pellet of the present invention is excellent in workability because it comprises a specific propylene-based polymer composition. In addition, when the pellet is used as a modifier for thermoplastic polymers, the resultant resin composition is excellent in transparency, impact resistance, mechanical properties, (flexibility or rigidity, etc.), and heat resistance. According to the method for producing thermoplastic polymer compositions of the present invention, there can be produced with high productivity a thermoplastic polymer composition excellent in transparency, impact resistance, mechanical properties (flexibility or rigidity, etc.), and heat resistance.

The invention claimed is:

1. A propylene-based polymer composition (P) comprising:
   66 to 88 parts by weight of a propylene-based polymer (A) that contains 93.4 to 100 mol % of constitutional units derived from propylene and 0 to 6.6 mol % of constitutional units derived from an α-olefin having 4 to 20 carbon atoms and/or ethylene, provided that the total of propylene and ethylene and/or the α-olefin is 100 mol %, wherein (A) has a Tm measured by DSC of not less than 120° C. and not more than 170° C.,
   12 to 34 parts by weight of a propylene/ethylene/α-olefin copolymer (B) that contains 61.0 to 74.9 mol % of constitutional units derived from propylene, 17.0 to 18.5 mol % of constitutional units derived from ethylene, and 3.0 to 7.0 mol % of constitutional units derived from an α-olefin having 4 to 20 carbon atoms, provided that the total of propylene, ethylene, and α-olefin is 100 mol %, wherein the copolymer (B) has an isotactic triad fraction (mm fraction) measured by NMR of not less than 85% and has a B-value, which is defined below, of not less than 0.9 and not more than 1.1,
   25 to 88 parts by weight relative to 100 parts by weight of the total of (A) and (B) of an ethylene/α-olefin copolymer (C) that contains 82 to 92 mol % of constitutional units derived from ethylene and 8 to 18 mol % of constitutional units derived from an α-olefin having 3 to 20 carbon atoms, provided that the total of ethylene and the α-olefin is 100 mol %, wherein (C) has a density of 850 to 920 kg/m$^3$ and an MFR (ASTM D1238, 190° C. load of 2.16 kg) of 0.1 to 10 g/10 min, $$B = M_{OE}/(2M_O \cdot M_E),$$

wherein $M_{OE}$ is the molar fraction of the total of propylene-ethylene dyad sequences and α-olefin having 4 or more carbon atoms-ethylene dyad sequences to all the dyad sequences, Mo is the total of the molar fractions of propylene and the α-olefin having 4 or more carbon atoms, and $M_E$ is the molar fraction of ethylene, and an internal haze of the composition after annealing at 120° C. is not more than 50%.

2. The propylene-based polymer composition (P) according to claim 1, wherein the propylene-based polymer (A) is an isotactic propylene-based polymer.

3. The propylene-based polymer composition (P) according to claim 2, wherein the isotactic propylene-based polymer has an isotactic pentad fraction determined from $^{13}$C-NMR of 90% or more.

4. The propylene-based polymer composition (P) according to claim 1, wherein the MFR (ASTM D1238, 230° C., load of 2.16 kg) of the propylene-based polymer (A) is in the range of 0.01 to 100 g/10 min.

5. The propylene-based polymer composition (P) according to claim 1, wherein the propylene/ethylene/α-olefin copolymer (B) is a copolymer having a molecular weight distribution (Mw/Mn, Mw: weight average molecular weight, Mn: number average molecular weight, both relative to polystyrene) measured by GPC of not more than 3.5.

6. The propylene-based polymer composition (P) according to claim 1, wherein the propylene/ethylene/α-olefin copolymer (B) is a copolymer having a glass transition temperature (Tg) measured by DSC of not more than 0° C.

7. The propylene-based polymer composition (P) according to claim 1, wherein the propylene/ethylene/α-olefin copolymer (B) is a copolymer of which the melting point is not more than 100° C. or not observed when measured by DSC.

8. The propylene-based polymer composition (P) according to claim 1, has a tensile modulus of not less than 700 MPa, an Izod impact strength at 0° C. of not less than 30 J/m, and a softening point determined by TMA of not less than 140° C.

9. The propylene-based polymer composition (P) according to claim 1, which has an Izod impact strength at 0° C. of not less than 500 J/m, and a softening point determined by TMA of not less than 135° C.

10. The propylene-based polymer composition (P) according to claim 1, which has a tensile modulus is not less than 700 MPa.

* * * * *